Figure 1:
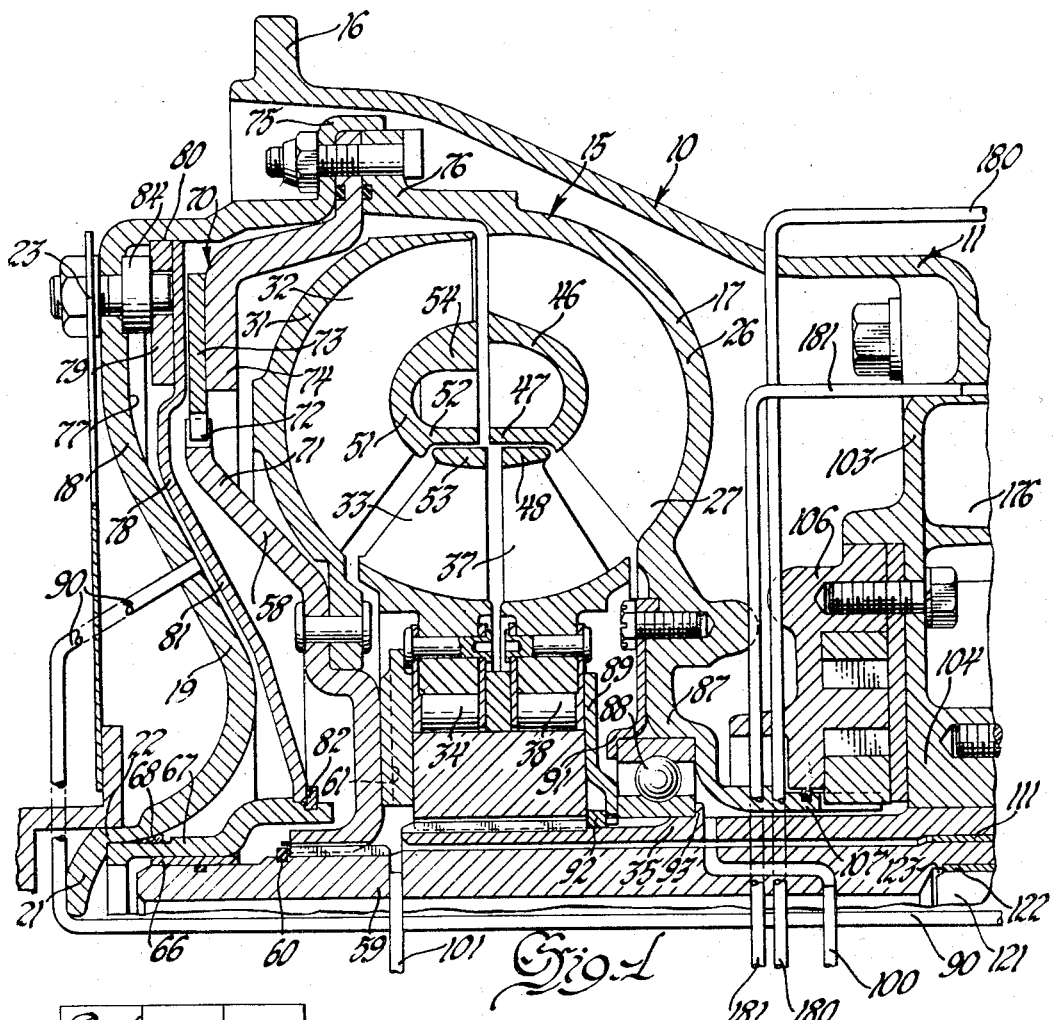

INVENTORS
Howard W. Christenson,
Edward I. Mabley &
Mark E. Fisher
By T. L. Chisholm
Attorney

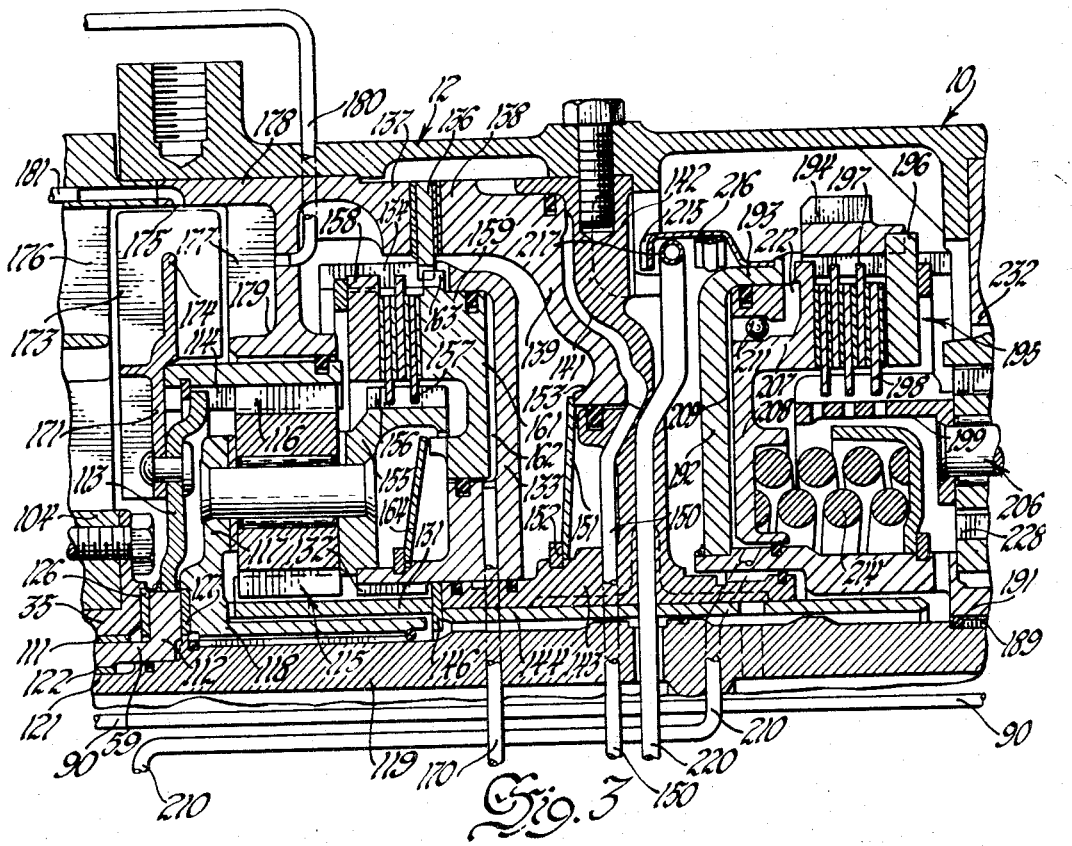

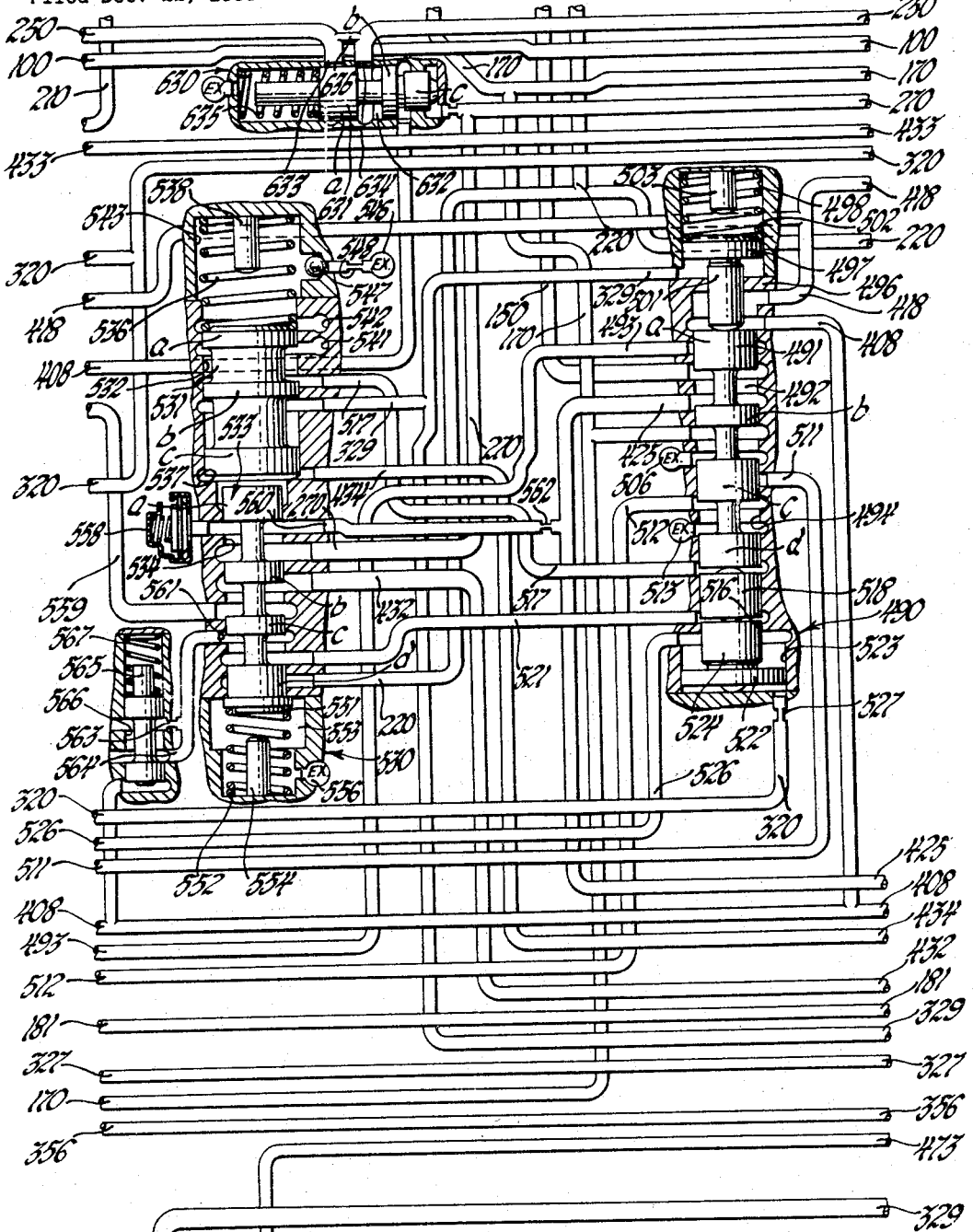

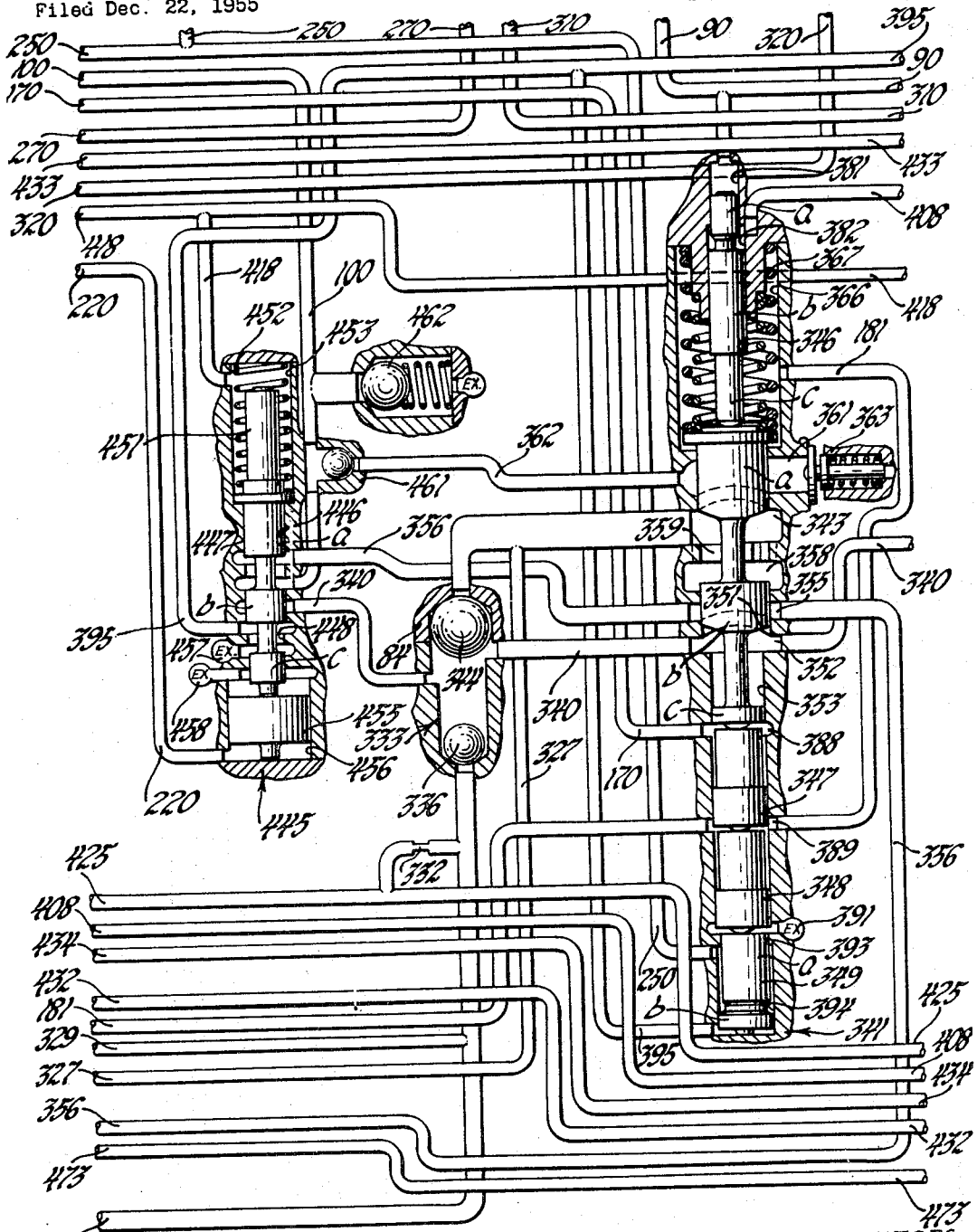

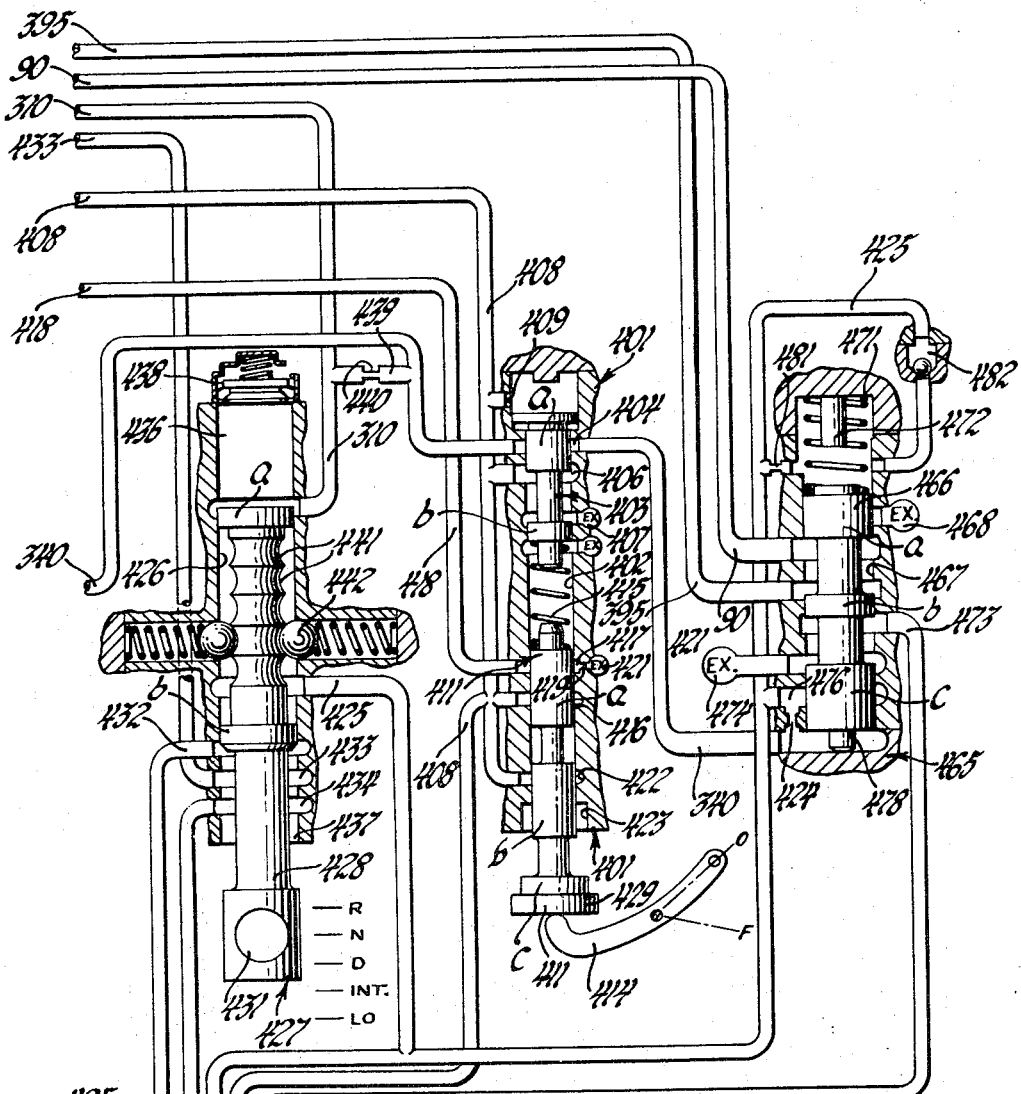
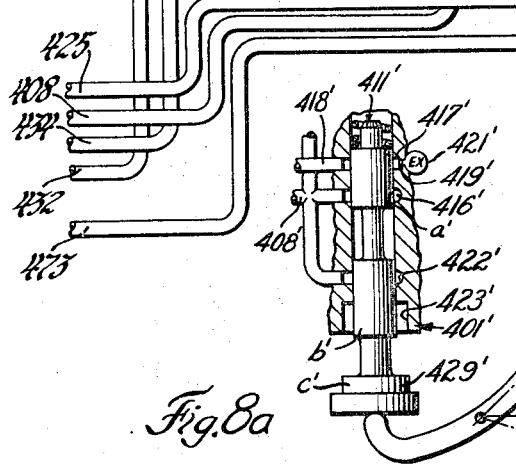

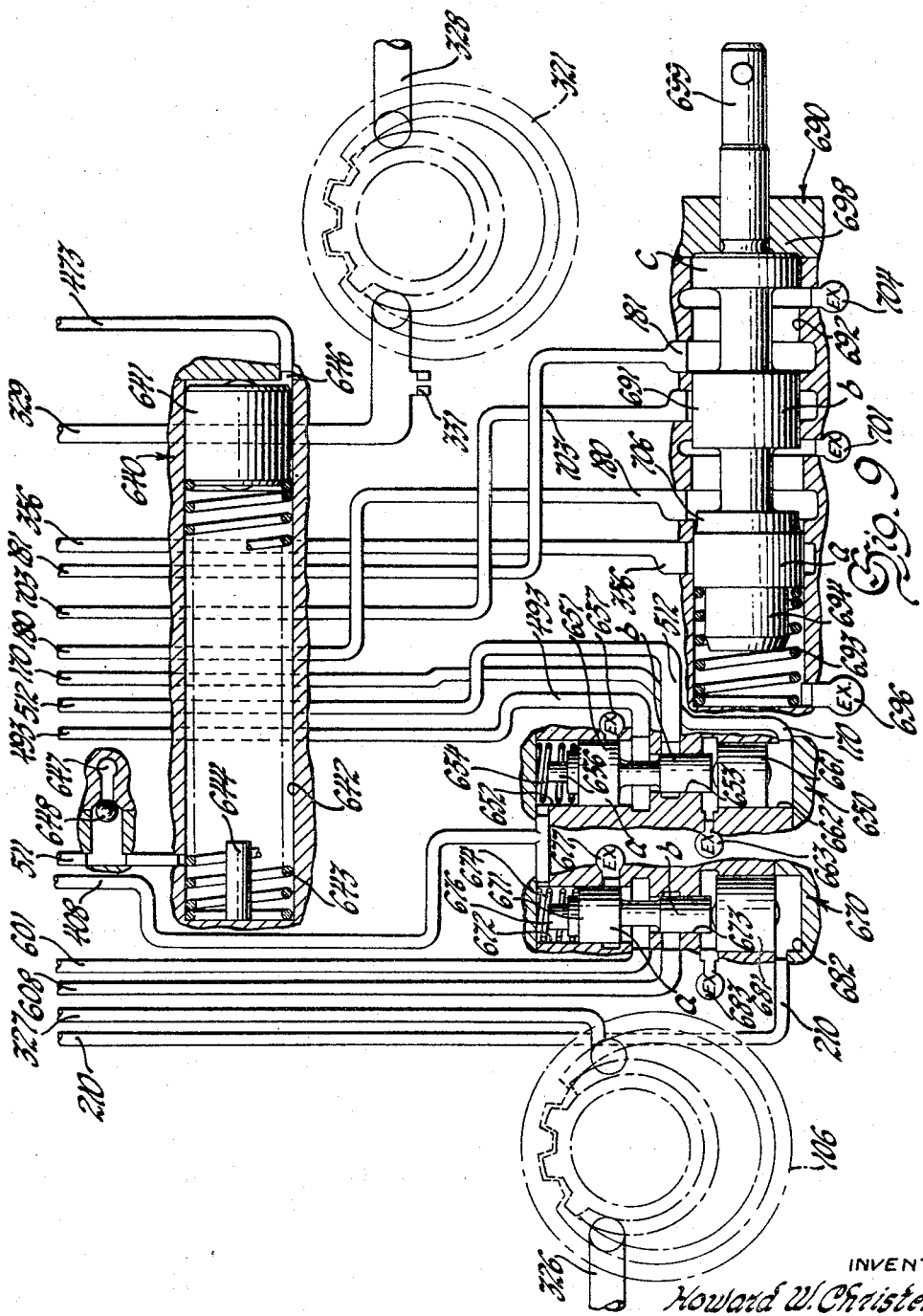

June 14, 1966  H. W. CHRISTENSON ETAL  3,255,642
TRANSMISSION
Filed Dec. 22, 1955  10 Sheets-Sheet 9

INVENTORS
Howard W. Christenson,
Edward T. Mabley, &
By  Mark E. Fisher
T. L. Chisholm
Attorney

3,255,642
TRANSMISSION

Howard W. Christenson and Edward T. Mabley, Indianapolis, and Mark E. Fisher, Carmel, Ind., assignors to General Motors Corporation, Detroit, Mich., a corporation of Delaware
Filed Dec. 22, 1955, Ser. No. 554,866
76 Claims. (Cl. 74—645)

This invention relates to a multiratio transmission and a manual and automatic control system for varying the ratio of the transmission and more particularly a transmission control system having manual range controls and automatic controls actuated by transmission speed and engine throttle conditions.

The transmission employing a torque converter, a lockup clutch and six ratio gear transmission provides a wide range of torque multiplication particularly adapted for use on heavy trucks. The engine driven tansmission input member is connected alternatively through either a hydrokinetic torque converter to provide torque multiplication or through a lockup clutch to provide direct drive to the transmission gearing consisting of a splitter gear unit providing two ratios and a three ratio gear unit providing three forward ratios and reverse. The converter and lockup clutch output shaft is connected to the splitter unit which provides splitter low, an underdrive, and splitter high, a direct drive. The splitter unit is connected to the three ratio unit which provides low, intermediate and high forward ratios and reverse. The splitter low and splitter high of the splitter unit in combination with each of the three forward ratios of the three ratio unit provide six forward ratios. The gearing is controlled so that low in the three ratio unit in combination with splitter low and splitter high provides first and second ratio, respectively, that intermediate of the three ratio unit in combination with splitter low and high provides third and fourth ratio, respectively, and that high of the three ratio unit in combination with splitter low and splitter high of the splitter unit provide fifth and sixth ratio, respectively. One ratio is provided in reverse since the splitter unit will not upshift because rear pump pressure does not condition the control valve for a shift. Any one of three forward ranges or reverse, to wit, drive range "D," providing automatic shifting from the third through the sixth ratio, intermediate range "INT," providing automatic shifting between third and fourth ratios, low range "LO," providing automatic shifting between first and second ratios and reverse "R," providing reverse may be selected by a manual control valve.

When the vehicle is started in first ratio, the low range starting gear or third ratio, the intermediate and high range starting gear, the converter lockup clutch is automatically controlled by the speed of the vehicle and the throttle pedal position to engage the clutch when converter torque multiplication is no longer necessary and before a shift to second or fourth ratio is made. The lockup clutch is also disengaged during each ratio change interval under either manual or automatic control, to connect the drive through the converter which will, due to the slip and the torque multiplication, reduce shock and smooth out the ratio change in the gearing. The lockup clutch control also reduces the pressure in the torque converter and ratio clutches when the lockup clutch is engaged. Thus when the lockup clutch is disengaged during shifting, the converter provides a smooth shift.

The hydraulic control system is conditioned by positioning the manual selector valve for operation in reverse, providing reverse, neutral, drive range providing automatic control between third and sixth ratios, intermediate range providing automatic control between third and fourth ratios and low range providing automatic control between first and second ratios. In the low range, the manual valve hydraulically positions the low intermediate shift valve to direct fluid to the low clutch to engage low ratio in the three speed unit and disables the intermediate high shift valve. In the intermediate range the manual valve permits a spring to position the low intermediate shift valve to connect the line pressure through the intermediate high shift valve, which is hydraulically held in intermediate position by the manual valve, to the intermediate clutch. In high range the manual valve releases the intermediate high shift valve for automatic shifting under the influence of vehicle speed and throttle position to high gear. The splitter shift valve, which controls the ratio of the splitter unit in all forward ranges, after being conditioned for an upshift by vehicle movement, is controlled by a throttle force and three different speed governor forces to provide splitter low or high, the first speed force to provide either first or second ratio in low range when the three ratio unit is in low gear, the second to provide either third or fourth ratio in intermediate and high range when the three ratio unit is in intermediate gear, and the third to provide either fifth or sixth ratio in high range when the three ratio unit is in high gear. The splitter shift valve and the intermediate high shift valves, though normally positioned by a spring when inactive, are conditioned for automatic operation by disabling the spring, so they function during the automatic control period as a rateless valve actuated only by throttle and speed forces.

The exhaust, from the splitter low clutch line, is connected to an exhaust control valve which delays the disengagement of this clutch and maintains a controlled pressure in this clutch motor during disengagement substantially inversely proportional to the pressure in the splitter high clutch motor during engagement to provide a controlled overlap during the shift. The throttle pressure which is proportional to the throttle pedal position acts on the exhaust control valve to increase the exhaust pressure with increasing throttle pedal position to provide greater overlap for open throttle upshifts than for closed throttle upshifts. A limited quantity of make-up oil is available during the ratio change interval to maintain or increase the exhaust pressure to make up for leakage. When the higher ratio clutch is engaged, the pressure in that clutch line increases, and acts on the exhaust control valve to connect the exhaust line to the sump. The exhaust from the intermediate clutch on a shift to high gear is similarly controlled. The downshift timing valve, on high throttle upshifts from low to intermediate ratio in the three ratio unit, provides a rapid application of the intermediate clutch to prevent engine runaway, on low throttle upshifts from low to intermediate, provides a restricted or slow application of the intermediate clutch for a smooth shift, and on a downshift from high to intermediate, provides a restricted or slow application of the intermediate clutch to permit the engine to increase speed before clutch engagement.

The manually actuated hydraulic control system for shifting into first ratio and reverse is always maintained full of oil so that first ratio and reverse can be quickly engaged to rock the vehicle for traction in snow, mud, etc.

A hydrodynamic brake having vanes mounted on the converter output shaft and rotates between fixed reaction vanes in a brake chamber. A brake control valve controls the amount of oil in the chamber to obtain the proper degree of braking. The brake outlet pressure which is high due to the centrifugal action of the brake acts on a pressure regulator valve unit for the transmission control system to increase the pressure and engaging force on the ratio motors.

The object of the invention is to provide an automatic transmission having a wide range of torque conversion including a torque converter and a converter lockup clutch alternately driving a two ratio planetary splitter gear unit which drives a three ratio and reverse planetary gear unit to provide drive through the torque converter or lockup clutch and one of six forward ratios or reverse provided by the gear units.

Another object of the invention is to provide in an automatic transmission having a torque converter, a two ratio splitter gear unit, and a three ratio gear unit, a lockup clutch which is automatically controlled in response to a governor pressure proportional to the speed of the output shaft of the two ratio gear unit.

Another object of the invention is to provide in a transmission having a two ratio splitter gear unit and a three ratio gear unit, an automatic control system for the splitter unit and a manual and automatic control system for the three ratio unit having means to set the gear ratio in a three ratio unit and to modify the action of the automatic control to shift the splitter unit at different vehicle speeds.

Another object of the invention is to provide in a transmission having a two ratio splitter gear unit and a three ratio gear unit, an automatic control for shifting the splitter unit, a manual control for shifting between low and intermediate in the three ratio unit and at the same time changing the shift points in the automatic control for the splitter unit, and also settable to position the three ratio unit in intermediate and provide an automatic shift between intermediate and high and change the shift points of the automatic control of the splitter unit.

Another object of the invention is to provide a transmission shift control system having a shift valve to control the supply of fluid under pressure to the ratio motors for establishing the drive ratios and a valve to control the pressure in one motor during the disestablishing of a ratio to obtain the proper degree of overlap during a shift.

Another object of the invention is to provide an automatic transmission shift control to control the pressure of the exhaust from the motor for the ratio clutch being released in relation to the engine throttle position and the pressure in the motor for the ratio clutch being applied to control the clutch engagement overlap during shifting to modify the overlap with engine throttle.

Another object of the invention is to provide in a multiple ratio transmission having an automatic control for the exhaust pressure from the motor for the ratio clutch being released depending upon other operating conditions of the vehicle and transmission, a make-up fluid feed of limited volume supplied during the time period when another servo motor for a ratio clutch is being applied to maintain the proper overlap controlled by vehicle and transmission conditions to eliminate variations due to changes in leakage.

Another object of the invention is to provide in a multiple ratio transmission having automatic and manual controls for a plurality of gear units, a control to effect a downshift from one ratio to another of one of the gear units and at the same time to momentarily inhibit a downshift of the other gear unit.

Another object of the invention is to provide in an automatic control system for a multiratio transmission, a shift valve for controlling clutch motors wherein the exhaust of one motor is applied to the shift valve to increase the hysteresis to prevent a return shift before the other motor is applied and pressure in the other motor supplies the hysteresis.

Another object of the invention is to provide in a transmission control system for a plurality of ratios, a timing control to provide fast establishment of one ratio after a second ratio has been established and slow establishment of the one ratio after a third ratio has been established.

Another object of the invention is to provide in an automatic multiratio transmission having a torque converter and a converter lockup clutch alternatively connected to multiratio gearing, a control system having a pressure regulator valve and a lockup clutch control valve which effects engagement of the lockup clutch and at times reduces pressure in the main line.

Another object of the invention is to provide in a multiratio transmission having a torque converter and a converter lockup clutch alternatively connected to multiratio gearing, a lockup clutch control to engage the lockup clutch to transmit torque and to reduce the pressure in the torque converter.

Another object of the invention is to provide a transmission shift control system having a shift valve to control the supply of fluid under pressure to the ratio motors for establishing drive ratios and a valve to retard the disengagement of a ratio operating a control to move the shift valve for disengagement of that ratio.

Another object of the invention is to provide in a multiratio transmission having low, intermediate and high ratio motors, a control to freely supply the intermediate motor on an upshift and to restrict the supply to the intermediate motor on a downshift.

Another object of the invention is to provide in an automatic transmission control, a rateless shift valve responsive to speed and throttle position having a spring holding the valve in the one position and a vehicle speed control activating the valve for control by speed and throttle position.

Another object of the invention is to provide in a transmission shift control system, a shift valve for controlling the supply of fluid to ratio motors for the engagement of ratio drives and fluid pressure control to keep the exhausted fluid motor filled at low pressure insufficient to actuate the motor.

Another object of the invention is to provide in combination with an engine having a governed maximum speed and an automatic transmission having a speed governor and throttle position controlled automatic shift, an additional throttle range providing a higher force to prevent a shift except at engine speeds above the governed maximum speed.

These and other objects of the invention will be apparent from the following description and drawings in which:

FIGS. 1 and 3 to 9, when arranged in accordance with the showing in FIG. 2, constitute a composite drawing of the transmission and the hydraulic control system.

FIG. 8a shows a portion of a modified form of throttle valve unit.

Figure 10:
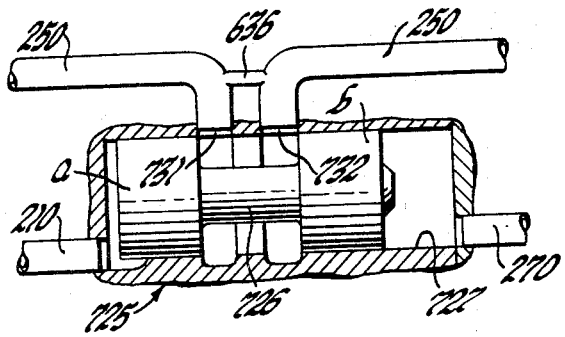

FIG. 10 diagramatically shows a modified downshift timing valve.

Figure 11:
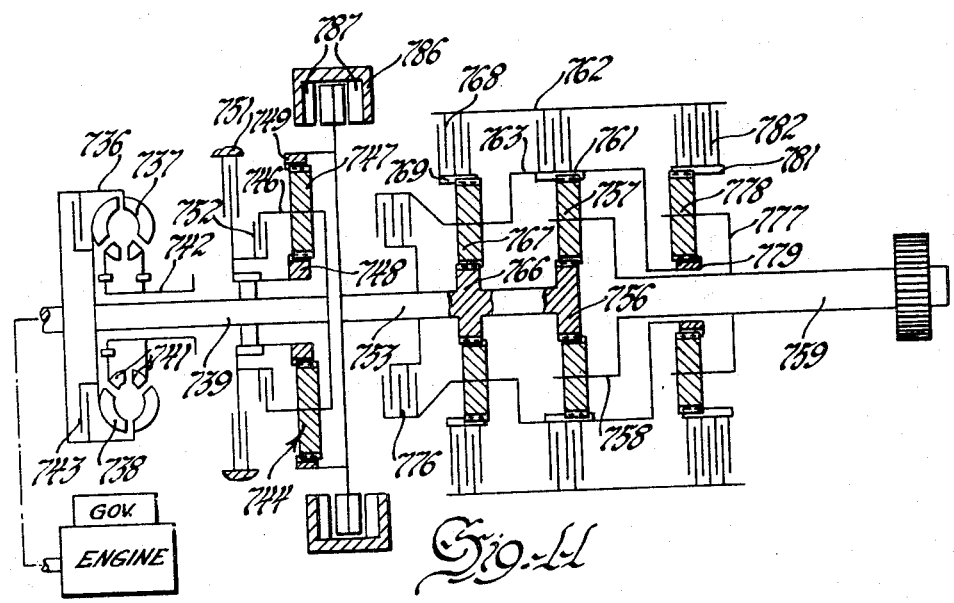

FIG. 11 diagrammatically shows a modified transmission gearing employing an overdrive splitter gear.

Figure 12:
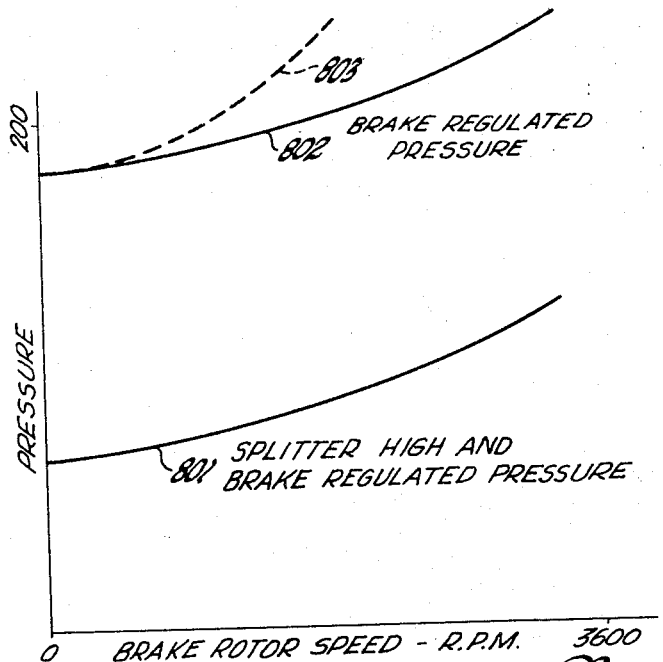

FIG. 12 compares graphically the brake outlet pressure with varying brake rotor speed.

Figure 13:
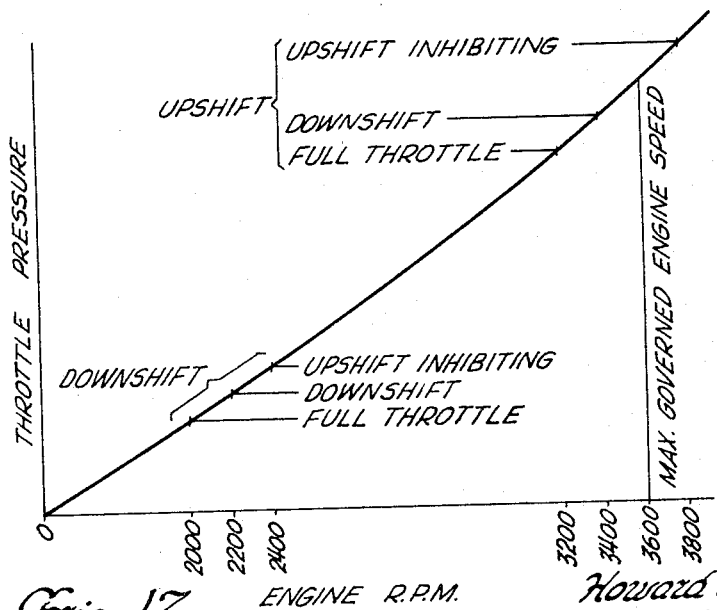

FIG. 13 illustrates the pressure output of the transmission governor, either front or rear, plotted as a function of engine speed in r.p.m. and throttle pressure or throttle opening with the upshift and downshift points for the three ranges of throttle pressure for any ratio change.

The transmission has a power train consisting of a torque converter 15 or a converter lockup or direct drive clutch 70 which alternatively connect the engine to the gearing, and the gearing which consists of a two ratio splitter planetary gear unit 115 and a three forward ratio and reverse planetary unit 190, which provides six forward ratios and reverse, and a hydraulic control system which functions in Reverse (R), Neutral (N), Drive Range (D), Intermediate Range (INT) and Low Range (LO) as set by the manual selector valve to manually and automatically condition the power train for drive in the proper ratio.

Figure 4:
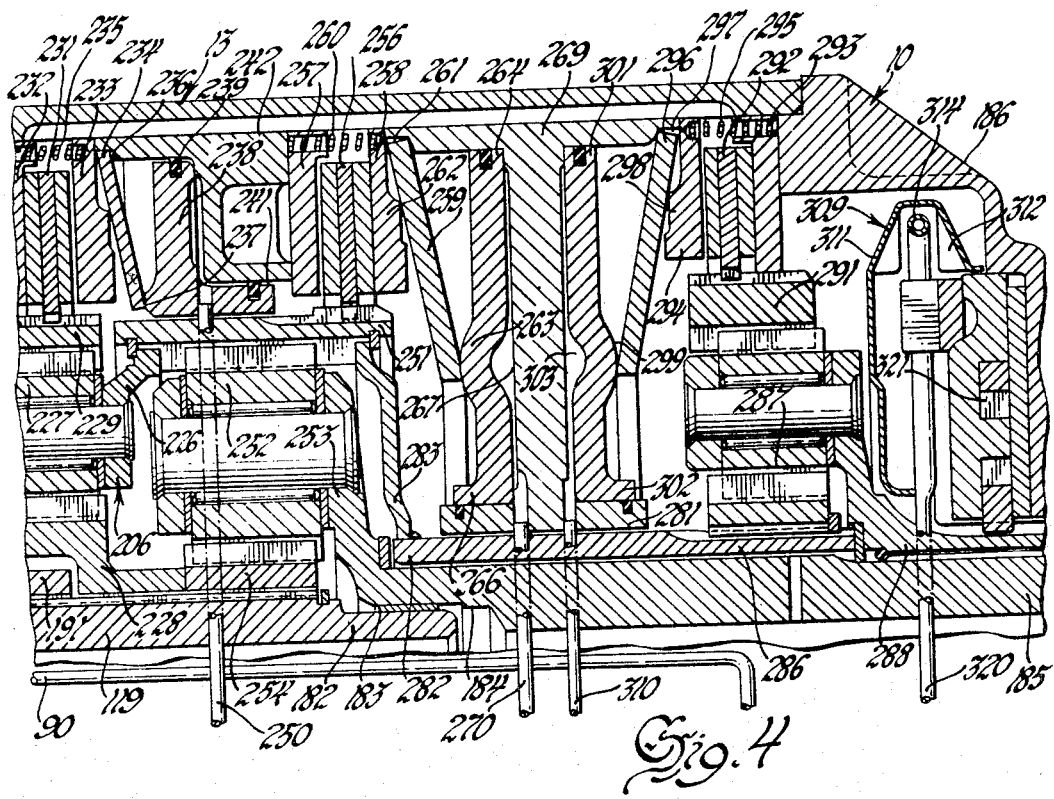

The structural features of the torque converter 15, lockup clutch 70, gearing, ratio clutches and the hydrodynamic brake are illustrated in the upper portion of composite drawing consisting of FIGS. 1, 3 and 4. The transmission housing 10 consists of a converter portion 11, a churn brake and splitter gear portion 12 and a three ratio gear unit portion 13.

CONVERTER

The converter portion 11 (FIG. 1) of the housing encloses the torque converter 15 and is open at the forward end and may be secured by flange 16 to the flywheel housing at the rear of an engine. The converter impeller housing 17 which encloses the converter 15 and lockup clutch 70 has a disk-like forward wall 18 having an annular depression 19 around the centrally located forwardly extending pilot tube 21. The pilot tube 21 has a bearing 22 which fits in a bore at the rear end of an engine shaft (not shown). The engine shaft is drivingly connected to the impeller housing 17 by an annular flex plate 23 secured to the engine shaft flange and wall 18. The wall 18 has a rearwardly extending portion terminating in flange 75 which is secured to flange 76 of the impeller 26.

The rear portion of the impeller housing 17 provides an impeller shell 26 which carries a plurality of blades 27. The impeller drives a turbine 31 which carries a plurality of blades 32. The dual stator consists of a first bladed stator 33 mounted by one-way clutch 34 on the ground sleeve 35 and a second bladed stator 37 mounted by one-way clutch 38 on the ground sleeve 35. The impeller 26 has an inner shroud 46 having at its lower edge a horizontal extension 47 extending over the shroud 48 of the second stator 37. The turbine 31 has a shroud 51 having at the lower edge a horizontal portion 52 extending over the shroud 53 of the first stator 33. Also, the space between the horizontal portions and the stator shrouds are offset to further reduce leakage out of the converter torus chamber. The shroud 51 has an annular bulbous portion 54 at the upper side to provide removable metal to balance the turbine blading. The turbine 31 is secured to the mid-portion of disk 58 which is splined to the converter output shaft 59 and axially fixed by split ring 60 and thrust washer 61.

The forward end of the converter output shaft 59 is rotatably mounted in bushing 66 mounted in the support sleeve 67 which is secured by suitable means such as weld 68 within the pilot tube 21 of wall 18. The disk 58 has an outer portion 71 which is connected by spline 72 to the driven disk 73 of the lockup or direct drive clutch 70. The fixed driving plate 74 of the lockup clutch has an outer flange located and bolted between the securing flange 75 of the forward wall 18 and the flange 76 of the impeller shell 26 of the converter impeller housing 17. The wall 18 and support sleeve 67 form the cylinder 77 in which the piston 78 is located. The piston 78 has an annular stiffening plate 79 secured to annular spring disk 81 positioned and sealed at its inner diameter on the support 67 by ring 82. The piston portion 79 has recesses for pins 84 on studs 23 which prevent relative rotation of the piston. The outer edge of the piston 78 has a sliding seal with a cooperating surface 80 on wall 18 shaped to contact the piston during movement. Fluid to move the piston 78 to the right to engage the lockup clutch is supplied by lockup clutch line 90 to the cylinder 77. The spring disk 81 and converter pressure release the lockup clutch.

The converter impeller housing 17 has at the inner edge a radial extension providing a bearing support 87 to rotatably mount the housing 17 on thrust bearing 88 which is secured by retainer 91 to support 87 and secured by ring 92 and spacer 89 against a shoulder on ground sleeve 35. Spacer 89 locates the one-way clutches 34 and 38. The converter inlet line 100 is connected through the ground sleeve 35 and delivers oil through the bearing 88 and the space between the second stator 37 and the impeller 27 to the converter chamber. The converter oil flows out through the space between the turbine 31 and the first stator 33 and slots in washer 61 to the outlet line 101. The partition 103 between the torque converter portion 11 and splitter gear portion 12 of the transmission housing 10 has a support ring 104 to which the ground sleeve 35 is secured. The front pump 106 secured to the converter side of the partition 103 is of the internal external gear type and is driven by sleeve 107 formed as an extension of support portion 87 of the impeller 26.

TRANSMISSION GEARING SPLITTER GEAR UNIT

The converter output shaft 59 is supported by a bearing 111 in the ground sleeve 35 and has a radial flange 112 at the end (FIG. 3) secured to the driving disk 113 which is connected by suitable gear splines at its outer edge to the input ring gear 114 of the front planetary splitter gear unit 115. The ring gear 114 meshes with pinions 116 mounted on the output carrier 117 which has a rearward portion 118 splined and longitudinally positioned by a ring to the intermediate shaft 119 which is the output from splitter unit 115. The intermediate shaft 119 has at its forward end a pilot portion 121 which is rotatably supported in the bearing 122 in bore 123 in the end of the converter shaft 59. The thrust bearing or washer 126 is located between the faces on the ground sleeve 35 and flange 112 of converter shaft 59 and a thrust washer 127 between flange 112 and the hub 118 of carrier 117 limits forward movement of shaft 119.

Planetary pinions 116 mesh with sun gear 131 which is connected by splines 132 to the control housing 133 which has an outer cylindrical portion consisting of splines 134. The splitter low reaction brake 136 has a plate connected by the splines to the control housing and located between a fixed abutment portion 137 and face 138 of the annular piston 139. The piston 139 of the splitter low motor reciprocates in the annular cylinder 141 formed in the partition 142 of the transmission housing located between the splitter portion 12 and the three ratio portion 13. The partition 142 has a central support sleeve portion 143 for sleeve bearing 144 for the intermediate shaft 119. The sun gear 131 is axially located between a thrust washer engaging the hub 118 of carrier 117 and thrust washer 146 engaging sleeve 143. The Belleville spring 151 is anchored by a split ring 152 to the support 143 and has an outer edge engaging abutment ring 153 at the inner edge of piston 139 to retract the piston. Splitter low line 150 supplies oil to cylinder 141 to engage brake 136 and spring 151 releases it. The carrier 117 has a rearwardly extending portion 155 having splines 156 connected to alternate plates of splitter high clutch 157. The intermediate plates of clutch 157 are connected by splines 134 to control housing 133 and are axially movable on the splines and located between the fixed abutment 158 fixed on the splines 134 and the axially movable face 159 on the splitter low motor piston 161 located in cylinder 162. Splines 163 on piston 161 engage splines 134 to rotate the piston with the cylinder. The cylinder is supplied with the oil by splitter high clutch line 170 to engage clutch 157 to lock carrier 117 and sun 131 together for splitter high or direct drive and released by Belleville spring 164.

HYDRODYNAMIC BRAKE

The brake rotor 171 is secured to the driving disk 113 mounted on the torque converter output shaft 59. The rotor 171 having an annular series of blades 173 and a central stiffening rib 174 is mounted for rotation in cavity 175 between fixed blades 176 on the rear side of the partition 103 and fixed blades 177 on housing member 178. The brake inlet line 180 enters this chamber about midway between the inner and outer diameter of fixed blades 177. The brake outlet line 181 is connected to the brake cavity by a tangential port located in radial alignment with rotor blade 173 and at the radial outermost portion of the brake cavity 175.

THREE RATIO UNIT

The intermediate shaft 119 which connects the splitter unit 115 to the three ratio and reverse planetary unit 190 (FIGS. 3 and 4) terminates in a pilot portion 182 rotatably mounted in bearing 183 in the pilot bore 184 of the final drive shaft 185. Final drive shaft 185 is rotatably mounted and axially located in a thrust bearing (not shown) in the rear wall 186 of the transmission housing. The drive sleeve 191 for the high ratio clutch 195 is mounted on shaft 119 by splines 189 and extends forward over sleeves 143 and 144. The drive sleeve 191 is connected at its forward end to the radial disk 192 which drives the splined clutch driving drum 193. The driving drum 193, the supporting disk 192 and sleeve 191 are secured as a unit to the intermediate shaft 119 and provide an annular cylinder 209. A power take-off gear 194 is mounted on the external surface of drum 193. The axially fixed clutch abutment 196 and the axialy movable clutch driving plates 197 are splined on the internal surface of drum 193. Clutch driven plates 198 are splined to the driven drum 199 mounted on the carrier assembly 206. Movable clutch face 207 is formed on the annular high clutch piston 208 located in the cylinder 209.

The high clutch cylinder 209 is engaged by fluid supplied by high clutch line 210 and released by spring 214. A centrifugal dump ball valve 211 closed by pressure and opened by centrifugal force is located in a passage 212 in the piston 208 extending from the cylinder 209, through the piston to the sump for fast clutch release.

The front governor 215 consists of an annular oil trough 216 secured to clutch drum 193 which is filled with oil from port 715 in partition 142 and Pitot tube 217 secured on partition 142 which is connected to front governor line 220. The trough 216 rotates the oil at intermediate shaft or splitter gear output speed past the Pitot tube 217 to provide a pressure in the front governor line 220 proportional to intermediate shaft speed.

The clutch driven drum 199 is formed as a portion of the carrier assembly 206 which also has a portion 226 (FIG. 4) for the intermediate planetary pinions 227 which mesh with the intermediate sun gear 228 splined to the intermediate shaft 119 and the intermediate reaction ring gear 229. The reaction brake plate 231 may be integral with or splined to the gear 229 and is located between the fixed brake abutment 232 formed as a portion of the housing and a brake pressure plate 233. The pressure plate 233 is released by spring 235 and engaged by the Belleville spring lever 234 which pivots at its outer diameter in an annular bore 236 in the housing, engages at its mid-portion on an annular fulcrum ridge on the pressure plate 233 and engages at its inner edge the annular ring 237 on the piston 238 of the intermediate motor. It will be noted that the annular piston 238 is L-shaped with the radially disposed portion sealed to an internal cylindrical bore 239 in the housing and the axially disposed cylindrical portion sealed to the smaller bore 241 on the abutment 242.

Carrier assembly 206 also has a ring gear 251 splined to carrier 226 and meshing with pinions 252 on the output carrier 253 on the output shaft 185. Pinions 252 mesh with the sun gear 254 splined on intermediate shaft 119. The ring gear 251 has splined thereto the low ratio reaction brake plate 256 located between fixed abutment 257 and pressure plate 258. Pressure plate is released by springs 260 and engaged by a Belleville spring 259 acting as an apply lever having an outer diameter pivoted in bore 261, a central portion engaging an annular fulcrum ridge 262 on the pressure plate 258, and an inner portion engaging an annular abutment 263 on the piston 264. The low motor consists of piston 264 located in the annular cylinder 267 formed in partition 269 and is supplied wth fluid by low line 270 to apply the low brake.

The partition 269 of the transmission housing between the three ratio gearing and the reverse gearing centrally supports a bearing sleeve 281 which rotatably supports the reverse sun gear sleeve shaft 282 which is connected by the driving disk 283 to ring gear 251 and thus to carrier assembly 206. The sleeve shaft 282 has at its rear end a sun gear 286 meshing with planetary pinions 287 mounted on carrier 288 splined to final drive shaft 185. Pinions 287 also mesh with the reaction ring gear 291 which is secured to a reaction brake plate 292 located between a fixed abutment 293 on the housing and a movable pressure plate 294. The pressure plate is released by springs 295 and engaged by an annular lever spring 296 having its outer edge pivoted in a bore 297 in the transmission housing, an intermediate portion engaging an abutment ring 298 on the pressure plate 294, and an inner portion engaging an abutment 299 on the piston 301. The piston 301 of the reverse motor fits in an annular cylinder 303 and is fed by fluid through the reverse line 310 to apply the reverse brake. The sun gear sleeve shaft 282 is axially located between forward carrier 253 and reverse carrier 288 on the final drive shaft 185, and also locates carrier assembly 206, which is fixed by disk 283 to the sleeve shaft 282.

The rear governor 309 has an annular can 311, mounted on the reverse carrier 288 so that it revolves with the final drive shaft 185, has stamped indentations 312 extending around the periphery to form fins to cause the oil supplied by orifice 331 (FIG. 9) in line 329 in the pump body to rotate substantially at output shaft speed. The Pitot tube 314, faces toward the approaching rotating fluid, and provides a pressure proportional to the speed of revolution of the final drive shaft and is connected to the rear governor line 320. The rear pump 321 of the internal external gear type has the internal gear splined to the sleeve portion of carrier 288 on output shaft 185.

CONTROLS

The hydraulic control and lubrication system for this transmission is supplied with oil under pressure by the front pump 106 and rear pump 321 (FIG. 9). The front pump 106 draws the fluid such as oil via inlet line 326 from the transmission sump and is connected to deliver oil through the front pump line 327. The rear pump 321 draws oil from the sump through the inlet line 328 and is connected to deliver oil to the rear pump line 329. An orifice bleed 331 in line 329 feeds the rear governor can 311 and regulates the pressure in the rear pump line 329 so that it is proportional to pump speed and thus output shaft or vehicle speed to provide a second output speed responsive governor pressure. The rear pump 321 is primed by an orificed connection 332 between a front pump, such as ratio change line 425 and rear pump line 329.

Referring to FIG. 7 the front pump line 327 is connected through ball check valve 334 to the bore of dual check valve 333 and the rear pump line 329 is connected through ball check valve 336 to the bore of valve 333 which is connected to main line 340 to permit either pump to supply oil to the control system. The pressure in main line 340 is regulated by pressure control unit 341.

PRESSURE CONTROL UNIT

The pressure control unit 341 consists of a regulator valve 343 which is controlled by a throttle and lockup clutch pressure regulator plug 346, brake regulator plugs 347 and 348 and lockup knockdown plug 349. Regulator valve 343 has a large land $a$ at the upper or exhaust end, a large central land $b$ and a smaller land $c$ at the other end. The lands $a$ and $b$ fit in the large diameter portion 351 of the valve bore located above the port 352 for main line 340. The land $c$ fits in the smaller diameter bore portion 353 located below the port 352. The main line 340 is always open through the port 352 through the valve. When the valve is in the closed position, as illustrated in FIG. 7, the land *b* closes port 355 for the secondary line 356 which feeds the converter and hydrodynamic brake. The main line 340 fills the space between the unbalanced lands *b* and *c* and the oil tends to move the valve up to uncover the port 355 to supply oil to the line 356. The port 358 located between the balanced lands *a* and *b* of valve 343 is connected to the front pump line 327. The port 358 is long and has intermediate its length a guide 359 which has slots to provide fluid communication between the two portions of the port. The oil in port 358 acts on the balanced areas *a* and *b* and thus does not tend to move the valve. With the valve in the closed position shown, the exhaust port 361 is covered by land *a*. The exhaust from port 361 is connected to low pressure line 362 to provide a low pressure feed for the converter when the converter is not multiplying torque and the lockup valve 445 (FIG. 7) has moved to engage the lockup clutch 70. A low pressure is maintained in the port 361 by the pressure relief valve 363 which controls the exhaust from port 361. In valve unit 341 above regulator valve 343 there is a spring chamber 366 which provides an abutment at one end for dual spring 367 acting upon the free end of the land 343*a* to urge the valve 343 toward the closed position against the fluid force acting on the unbalanced area of lands *b* and *c*.

When the oil in main line 340 between the unbalanced areas between lands *b* and *c* raises valve 343, the first increment of movement permits flow of oil to port 355 and secondary line 356. When the pressure in the main and secondary lines has reached a desired value, the valve will raise and land *a* opens the port 361 and connects the front pump line 327 through port 358 directly to exhaust port 361 to supply the low pressure feed line 362 and exhaust excess oil through the pressure relief valve 363 to sump.

The regulated pressure in main line 340 is increased by the hydrodynamic brake pressure, the throttle valve pressure and the lockup clutch pressure. The brake outlet pressure which is proportional to the torque being absorbed by the brake, is conveyed by line 181 to spring chamber 366 and acts on the free end of a land *a* of valve 343 to assist the spring 367 to increase the regulated line pressure. The throttle and lockup clutch plug 346 has a small end portion *a* fitting into the small end bore portion 381 of the valve bore which communicates at its end with the lockup clutch line 90 which is controlled by the lockup valve unit 445 and the lockup cut-off valve unit 465. The plug 346 also has a central land *b* of larger diameter fitting in the adjacent larger diameter bore portion 382. The throttle pressure, which is a pressure proportional to the throttle pedal position as explained below in the description of the throttle valve unit 401 (FIG. 8), is supplied by line 408 to the larger diameter portion 382 adjacent the small diameter portion 381 to act on the shoulder of the large land *b* to act downwardly on the pressure regulator valve 343 assisting spring 367 and thus increasing the pressure in main line 340. The lockup clutch and TV plug 346 has at the lower end an extension *c* engaging valve 343 which conveys the force on the parts *a* and *b* to the regulator valve 343. The plug 346 provides a stop to limit the upward movement of valve 343. The lockup clutch pressure acting on land *a* of plug 346 and throttle pressure acting on land *b* of the plug 346 both tend to increase the regulated pressure in line 340. When the brake pressure supplied by line 181 to spring cavity 366 increases the regulated pressure in line 340 by acting in a downward direction on the free end of land *a* of valve 343, the brake pressure also acts upwardly on the land *b* of plug 346 and partially or fully counteracts the pressure increasing effect due to the lockup clutch and throttle pressure on plug 346 to prevent an excessive increase in main line pressure. However during normal operation, the throttle will be closed when the brake is applied so there will not be any throttle pressure. As explained below, the brake pressure also acts on the smaller area of plug 347 to decrease the main line pressure providing a net pressure increasing effect of a small value without employing a small land.

The main line pressure is reduced by the splitter high clutch pressure, brake pressure and the lockup pressure from the governor and throttle controlled lockup valve unit 490 (FIG. 6). With valve 343 illustrated in the closed position in FIG. 7, the bore 353 has a port 388, immediately below the land *c*, connected to the splitter high line 170. The brake regulator plug 347 is located between the port 388 and the port 389 connected to brake outlet line 181. The brake regulator sealing plug 348 is located below plug 347 between port 389 and exhaust port 391. The lockup knockdown plug 349 below the plug 348 has a small diameter land *a* abutting the sealing plug 348 and a larger diameter land *b* at the other end. The bore 353 has a seal 393 adjacent the exhaust port 391 engaging the small diameter land 349*a* and a large diameter bore portion 394 in which the land 349*b* slides. The intermediate line 250 is connected to the bore 394 below seal 393 to act down on the large land *b* to urge the plug 349 down to the inactive position. The controlled lockup clutch oil in line 395 is connected to the closed end of the large bore 394 to act upon the free end of land *b* of plug 349.

The splitter high clutch pressure in line 170 acts on the land *c* of regulator valve 343 to oppose spring 367 and lower the regulated main line (340) pressure. The brake outlet pressure in line 181 acts upon the lower end face of plug 347 to oppose the spring 367 and reduce the regulated pressure. As pointed out above, the brake pressure simultaneously acts on the larger area of land 243*a* and the smaller area of plug 347 to provide a net increase of main line pressure. This differential arrangement reduces the effect of high brake pressure on valve 343 without employing an extremely small valve plug. The governor controlled lockup clutch pressure in feed line 395 acts up on the lower face of plug 349 against the spring 367 to reduce line pressure. Thus each of these pressures acts against the spring 367 and to lower main line pressure. Since the plugs are arranged in series, the effective force on the regulator valve 343 to move it toward the open position against the spring 366 will only be as large as the largest of these three fluid forces acting on their respective plugs. The intermediate pressure in line 250 acts on the plug 349 with the spring 367 but is only effective to oppose the pressure in feed line 395 acting up on plug 349 to partially reduce the effect of this pressure so that the governor controlled lockup pressure will not reduce the regulated line pressure as much in intermediate ratio as in other ratios. The reduction in main line pressure by the controlled lockup pressure in line 395 is also counteracted by the pressure in lockup clutch line to provide a higher pressure when the lockup clutch is engaged and a lower pressure when the lockup clutch is disengaged to soften the ratio changes.

THROTTLE VALVE UNIT

The throttle valve unit 401 (FIG. 8) supplies a throttle pressure and a downshift pressure responsive to the throttle pedal position to control the shift valves. The throttle valve unit 401 is located in bore 402 in the valve body and includes a throttle regulator valve 403 and a downshift valve 411. When the engine fuel feed control, such as a throttle pedal, is in the closed position, the valve unit 401 is in the closed position illustrated. Then the throttle valve 403 having lands *a* and *b* is located in the bore 402 so that the upper land 403*a* blocks flow of oil from the main line 340 via main line port 404 to the bore 402, but port 404 provides an annular passage around the land 403*a* and always connects the main line 340 to the lockup cut-off valve unit 465. When the valve is in the closed position the land b is located below throttle port 406 and exhaust port 407 and the space between the lands connects the throttle line port 406 and the exhaust port 407 to exhaust the throttle pressure in line 408. The throttle line 408 is also connected to the port 409 adjacent the closed end of the bore 402 so that the throttle pressure acts down on land a.

The downshift valve 411 has lands a and b of equal diameter spaced from one another and located in the bore 402 and a land c of larger diameter at the other end spaced from land b and located in bore 423. The throttle valve unit 401 is controlled by the accelerator pedal (not shown) which is connected by a linkage including lever 414 which engages the end face of land c to move the downshift valve 411 into the bore 402 and increase the pressure exerted through spring 415 on the throttle regulator valve 403. Valves 403 and 411 have extensions projecting within the coil spring 415 which provide a locating device for the coil spring and a stop means to prevent the spring being compressed beyond its elastic limit. The throttle line 408 is also connected to port 416 which is normally closed by the land a of valve 411 when the throttle pedal is in the closed position O shown or an intermediate position. When the valve 411 reaches the downshift position which may be full throttle or just beyond full throttle F, the space between the lands a and b connects throttle pressure line 408 via port 416 to port 417 which provides throttle pressure, now at a maximum but less than line pressure, to the downshift line 418. The port 417 is also connected through an orifice 419 to an exhaust port 421. The orifice is small so that when the regulated line pressure is open to line 418, the pressure is not materially reduced and downshifts the shift valves. However, when the detent line 418 is closed by the land a of valve 411, the trapped oil will drain through orifice 419 to exhaust 421 to prevent oil being locked in line 418 and interfering with the action of the shift valves. At the same time or just before the throttle pressure line 408 is connected to the downshift line 418, the port 422 connected to throttle line 408, now at line pressure is open to the space between land b and c and the oil tends to flow into the large open portion 423 of bore 402 and, substantially simultaneously, the large land c of downshift valve 411 enters bore 423 to provide a fluid detent action. It will thus be seen that further movement of the valve 411 requires an additional force to overcome the force of the pressure in throttle line 408 acting on the unbalanced area between the lands b and c of valve 411. Thus the operator will be required to exert an extra force on the throttle pedal to energize the downshift line 418 to effect a downshift. The shoulder 429 on land c limits movement of the valve 411. The throttle valve unit 401 provides throttle pressure in line 408 directly proportional to the throttle pedal position and a downshift pressure in line 418 effective at a certain point of throttle movement such as full throttle or slightly beyond full throttle to effect a downshift.

SPEED GOVERNORS

The transmission control system employs three governor pressures, the front governor pressure, proportional to the speed of the splitter gear unit output or intermediate shaft 119, and the rear governor and the rear pump pressures, proportional to the speed of the transmission output or final drive shaft 185 which is proportional to vehicle speed. The shaft 119 drives the front Pitot governor trough 216 (FIG. 3) to provide a governor pressure in line 220 proportional to the speed of intermediate shaft 119. The rear Pitot governor 309 (FIG. 4) has a trough 311 driven by the final drive shaft 185 and provides a pressure in line 320 proportional to the final drive shaft speed. As indicated above, the rear pump 321 and orifice 331 (FIG. 9) provide in line 329 a pressure proportional to the final drive shaft speed. These governor pressures and the above-described throttle pressure and downshift pressure are employed to control the automatic shift valves to control main line pressure to provide automatic speed ratio changes.

MANUAL VALVE

The operator positions the manual valve unit 427, FIG. 8, to select the range Reverse, R; Neutral, N; Drive, D; Intermediate, INT; or Low, LO; in which the transmission will be automatically controlled. The oil in main line 340 flows through orifice 424 or the lockup cut-off valve unit 465 (FIG. 8), as explained below, depending on the position of the lockup cut-off valve unit, to the ratio change line 425 which is connected to the bore 426 of manual valve unit 427. The valve 428 is slidably mounted in the bore 426 and has land 428a at the top end and land 428b at the center and an aperture 431 at the other end to connect the valve to the manual control linkage. With the valve in the neutral position illustrated, the controlled main line 425 enters the bore 426 and is confined between lands a and b. Upward movement of the valve 428 to the reverse position R will connect line 425 to reverse line 310. Movement of the valve 428 downwardly to the drive range position D connects the controlled main line 425 via the space between the lands a and b to the drive range line 432. Further movement of the valve 428 to the intermediate range position INT will similarly connect the control line 425 to both the drive range line 432 and the intermediate range line 433 and movement of the valve to the low position LO will connect controlled line 425 to the drive range line 432, the intermediate range line 433 and the low range line 434. When the valve 428 is in the neutral position, it will be seen that the reverse line 310 is connected to exhaust through the opening 436 at the adjacent end of the bore 426 having a reverse exhaust valve 438, and the lines 432, 433 and 434 for the various drive ranges are connected to a free exhaust at the adjacent end opening 437 of the bore 426.

The reverse exhaust valve 438 maintains a low pressure in the reverse line 310 and leakage is replaced through reverse make-up line 439 and orifice 440 which connects the regulated line 340 with reverse line 310. The orifice 440 limits the flow to the approximate quantity to make up for leakage in the reverse clutch motor.

When the valve 428 is in the drive range position, the intermediate range line 433 and the low range line 434 are connected to exhaust 437 and, in the intermediate position, low range line 434 is connected to exhaust 437. The valve 428 between the lands 428a and b has a series of annular grooves 441, one for each valve position, which cooperate with the spring-loaded ball detents 442 to resiliently hold the valve in the selected range positions.

LOCKUP VALVE UNIT

The lockup valve unit 445 (FIG. 7) automatically controls the lockup clutch 70 and the converter pressure. The main line 340 is connected through the dual check valve 333 to the lockup valve unit 445. The lockup valve unit 446 has an end land a, a central land b having the same diameter slidably mounted in a bore 447 in the valve body, and a land c adjacent the other end of smaller diameter which fits in a smaller diameter bore portion 448. The valve 446 has a stud 451 extending above land a which serves to limit the upward or opening movement of the valve 446 and locate spring 452 in the spring chamber 453. The spring 452 engages the end of chamber 453 and the valve to resiliently urge the valve 446 in a closing direction. The throttle pressure and forced downshift pressure are connected by the downshift line 418 to the spring chamber 453 to act on the free end of land 446a and close valve 446 to disengage the lockup clutch. The front governor pressure in line 220 act on the lower face of the lockup plug 455 located in an enlarged portion 456 of the bore 447 to move valve 446 toward open position. When the valve is in the closed position, illustrated in FIG. 7, the land $b$ blocks the main line 340 and the governor controlled lockup feed line 395 is connected between the unbalanced lands $b$ and $c$ to the exhaust 457. Between the land $c$ and the lockup plug 455, another exhaust 458 provides a drain between these valve members to prevent the accumulation of oil under pressure due to leakage. The secondary line 356 is connected between the lands $a$ and $b$ when the valve 446 is in the closed position to the converter inlet line 100. Thus when the converter is functioning and full regulated main line pressure is supplied to the secondary line 356, this pressure is connected to the converter inlet line 100. Due to the normal flow of oil in line 100 through the converter and cooler 711, the pressure in converter inlet line 100 is lower than main and secondary line pressure as controlled by the pressure control unit 341. However if flow in line 100 is restricted for example, by cold oil in the cooler 711, the converter charging pressure could rise to main line pressure which is too high. The converter pressure regulator valve 462 limits the converter charging pressure in line 100 at a value between normal converter charging pressure and main line pressure to prevent an excessive converter charging pressure.

The lockup valve 446 is controlled by spring 452 and the throttle pressure in line 408 acting via downshift line 418 to close the valve against the front governor pressure in line 220 acting to open the valve. When the governor pressure increases sufficiently due to the increase in the intermediate shaft speed to overcome the spring force and the throttle pressure, the valve 446 moves and land $b$ uncovers the main line 340 and permits oil under pressure to flow between lands 446$b$ and $c$ to act on the unbalanced area of lands $b$ and $c$ to tend to hold the valve 446 open to prevent hunting and to provide a hysteresis loss so that a downshift will only occur at a lower speed. With valve 446 in the open position, the main line 340 is connected to the lockup clutch feed line 395 which is connected to the lockup cut-off valve unit 465 which connects to the lockup clutch line 90 except during a shift as explained below. At this time the land $c$ closes exhaust port 457.

If desired the lockup valve 446 may be controlled by the spring 452 acting against the front governor pressure by disconnecting the downshift line 418 from the lockup valve unit 445 and connecting spring chamber 453 to exhaust.

Since the converter 15 is inoperative when the lockup clutch 70 is engaged, except during brief shift intervals, the lockup valve is used to reduce the converter pressure when valve 446 is opened to engage lockup clutch 70. When the lockup valve 446 is opened, the land $b$ closes the converter inlet line 100, and stops the flow of the oil from the secondary line 356 to the converter inlet line 100. The pressure in the converter thus drops until it reaches a lower value maintained in the low pressure line 362 by the pressure control unit 341. The exhaust from the regulator valve unit 341 in exhaust 361 is maintained at a controlled low pressure by the relief valve 363 and flows through check valve 461 and low pressure feed line 362 to the converter inlet line 100. Check valve 461 prevents flow from converter feed line 100 when high pressure is used to relief valve 363.

LOCKUP CUT-OFF VALVE UNIT

The lockup cut-off valve unit 465 (FIG. 8) which disengages the lockup clutch 70 during each ratio change interval includes a valve 466 having lands $a$, $b$ and $c$ located in a bore 467 of uniform diameter. With the valve in the normally open position, as illustrated, the governor controlled lockup feed line 395 enters the space between the lands $a$ and $b$ adjacent the land $b$, and the lockup cluch line 90 is connected to the space between the lands $a$ and $b$ adjacent the land $a$ to connect the lockup feed line 395 to the lockup clutch line 90. The exhaust port 468 for the lockup clutch line 90 is blocked by the land 466$a$. A spring 471 positioned in the end of bore 467 engages land 466$a$ to urge the valve 466 to opened position. A pin 472 mounted on the valve body locates and limits the compression of this spring. The actuator line 473, which supplies fluid to actuate the exhaust feed pump 640 as explained below, is connected to the bore 467 between the lands $b$ and $c$ to exhaust port 474. Main line 340 is connected to the end of bore 367 and by-pass passage 476 of the ratio change line 425 is connected opposite land $c$. The land $c$ has on its free face, a spacing stud 478 which spaces the valve 466 from the end of the bore 467. The main line oil is connected by line 340 to the bore 467 beneath the valve to act on the free end of land $c$. The oil flows through orifice 424 when cut-off valve 466 is closed and through by-pass 476 when valve 466 is open to the ratio change line 425 which is connected to supply the manual valve unit 427 and splitter shift valve unit 490 (FIG. 6) and to control the lockup cut-off valve 466. Line 425 is connected to control valve 466 to the bore 467 through both an orifice 481 and a check valve 482 to act on the end face of the land 466$a$.

The lockup cut-off valve unit 465 in its normal position is open to permit flow from the lockup valve unit 445 and controlled lockup feed line 395 to the lockup clutch line 90 and clutch 70 due to the action of spring 471 and the balanced opposing pressures in main line 340 and ratio change line 425 on the end faces of valve 466. Whenever the oil flows through ratio change line 425 to effect a change in ratio by filling one of the ratio motors, oil flows from the regulated main line 340 through the orifice 424 creating a pressure difference between the oil in the regulated main line 340 acting on the end face of land $c$ and the oil in ratio change line 425 which acts on the end face of land 466$a$. The higher pressure in line 340 raises valve 466 against spring 471 and connects lockup clutch line 90 to exhaust 468 and controlled feed line 395 to actuator line 473, and closes exhaust 474. An excessive difference in pressure between main line 340 and ratio change line 425 will raise valve 466 against spring 471 sufficiently to connect these lines momentarily via the by-pass 476 to reduce the pressure differential. Thus the normal main line pressure applied to the ratio clutch motors is reduced during each shift interval until the ratio motor is substantially filled and rapid flow stops. The point of engagement of the ratio clutch motor at which the pressure is increased and the lockup clutch engaged, is controlled by the force of spring 471. As the flow slows down, the pressure differential is reduced and at a certain low pressure differential spring 471 closes the valve 466. The orifice 481 and the check valve 482 connects line 425 in parallel to the spring chamber at the upper end of bore 467. The flow of oil from line 425 to the spring chamber is restricted by orifice 481 since oil cannot flow in through the check valve 482. The exhaust from the spring chamber of bore 467 flows freely through the check valve 482 and is not restricted by the orifice 481. Thus the valve 466 moves rapidly to disengage the lockup clutch 70 and returns slowly to the normal open position illustrated to engage the lockup clutch. When the system is initially supplied, the oil in line 340 will raise the valve to fill the system and equalize the pressure at both ends of valve 466 to permit the valve to return to the normally open position so quickly that this has no effect on the operation of the system. When the lockup valve unit 445 opens, the lockup cut-off valve unit 465 will be in the normally open position illustrated to engage the lockup clutch 70 but will close during each ratio change interval to disengage the lockup clutch 70.

SPLITTER VALVE UNIT

The splitter valve unit 490 (FIG. 6) automatically shifts to control the ratio of splitter gear unit 115 by actuating the splitter high clutch 157 to provide direct drive or by actuating the splitter low brake 136 to provide underdrive. The governor forces acting on the valve unit 490 are changed to shift the splitter unit at three different speeds, the first when in low, the second when in intermediate and the third when in high in the three ratio unit 190 to provide six drive ratios.

The splitter shift valve 491, located in bore 492, has lands $a$, $b$, $c$ and $d$ with intermediate spaces of lesser diameter. Lands $a$ and $b$ having an equal larger diameter fit in upper large bore 492 while lands $c$ and $d$ having an equal smaller diameter fit the lower small diameter bore 494. With the splitter valve 491 in the low position illustrated in FIG. 6, the main line 425, which is regulated by regulator unit 341 and shift controlled by lockup cut-off valve unit 465, is connected to the valve bore 492 between the lands $a$ and $b$ adjacent land $b$. The main line 425 is thus connected through the space between the lands $a$ and $b$ to the low line 150 which is connected to the bore 492 between the lands $a$ and $b$ adjacent land $a$. The controlled exhaust line 493 is connected to the bore 492 opposite land $a$ and is blocked. The throttle pressure in line 408 enters the bore 492 immediately adjacent the free end face of land $a$ of valve 491 and acts on the valve 491 to move it toward low position. The downshift pressure in line 418 enters the bore 492 adjacent the end wall 496 and acts upon the free end face of land $a$ of valve 491 to move it to low position. The splitter rear pump plug 497 is located in a bore 498 coaxially located with respect to bore 492. The rear pump plug 497 has a stem 501 of small diameter projecting through an aperture in wall 496 which divides bore 492 from plug bore 498 to act on land $a$ of valve 491. A spring 502 seated on the far end wall of the bore 498 acts on plug 497 to cause stem 501 to engage the valve 491 to urge it to low position. The rear pump line 329 enters the bore 498 above partition 496 and beneath the plug 497 to lift the plug 497 and eliminate the effect of spring 502 on the operation of valve 491. A stop 503 limits upward movement of the plug 497 and splitter valve 491. Thus the spring 502, unless made ineffective by pressure from the rear pump line 329, the throttle pressure from line 408 and the downshift pressure from line 418 tend to urge the splitter valve 491 down from high to low position.

With the valve 491 in the low position shown, the direct drive clutch line 170 located between large bore 492 and small bore 494 is adjacent the land $b$ and the exhaust port 506 adjacent the land $c$ connecting line 170 to the exhaust port 506 through the space between the lands $b$ and $c$ of valve 491. The limited feed line 511 from exhaust feed pump 640 (FIG. 9) is blocked by land $c$ of valve 491. The splitter low exhaust feed line 512 enters the bore 494 immediately adjacent the land $c$ and is connected by the space between the lands $c$ and $d$ to the exhaust port 513.

With the valve in the upper or high position, the main line 425 is connected between lands $b$ and $c$ to the high line 170 and the low clutch line 150 is connected to controlled exhaust 493 and the limited feed line 511 is connected to the splitter low exhaust feed line 412 to effect control of the splitter low exhaust valve unit 650 which is described below.

Since the splitter valve 491 shifts the splitter gear unit 115 between low and high ratio when the three speed gear unit is in each of the three ratios, low, intermediate and high, combinations of the three governor pressures, front governor pressure (line 220), rear governor pressure (line 320), and rear pump pressure (line 329) provide three separate shift points. With valve 491 in low position illustrated in FIG. 6, the relay controlled rear pump line 517 enters the bore 494 between the end face of land $d$ of valve 491 and the top face of the front governor splitter plug 518 which is located in bore 494 and engages land $d$. A low intermediate valve controlled front governor line 521 is connected to the valve bore 494 between the partition 516 and the end face of front governor plug 518. A rear governor splitter plug 522 is positioned in the large bore 523 located coaxially with respect to the bore 494. Plug 522 has a stem 524 having a diameter slightly smaller than plug 518 extending through an aperture in wall 516 to engage the lower face of front governor plug 518. The intermediate high controlled rear governor pressure in line 526 enters the bore 523 between the partition 516 and the plug 522 to urge the plug 522 down away from valve 491. The rear governor pressure in line 320 enters the end of the bore 523 via orifice 527 to act on the end face of plug 522 to urge the plug 522 and valve 491 up to high drive position. The rear governor pressure in line 320 acting on the lower face of plug 522 when the three ratio unit is in high and intermediate is opposed by the intermediate high controlled rear governor pressure in line 526 acting on the smaller upper face of rear governor plug 522 to provide a reduced governor force in intermediate ratio. The low intermediate controlled front governor pressure in line 521 acts in low range between the front governor plug 518 and the rear governor plug stem 524 to urge the valve 491 to direct drive position and hold stem 524 and plug 522 down. The intermediate high controlled rear pump pressure in line 517 acts, when an upshift or downshift between low and intermediate range is initiated, between land $d$ of valve 491 and front governor plug 518 to urge the valve 491 up toward direct drive position and hold plugs 518 and 522 down.

These three governor forces tending to move the valve 491 from low to high position are opposed by spring 502, until disabled by rear pump pressure, and throttle and downshift pressures tending to return the valve to low position. When valve 491 is in high position, the main line pressure acting via ratio change line 425 on the unbalanced area of lands 491$b$ and $c$ provides the hysteresis action by tending to hold the valve in high position.

LOW INTERMEDIATE VALVE UNIT

The low intermediate shift valve unit 530 is hydraulically controlled by manual valve unit 427 to shift the three ratio unit between low and intermediate ratio and to condition the splitter valve unit 490 to shift at the first or second shift point. This unit 530 consists of a splitter relay valve 531 located in a large bore 532 which to conveniently provide a low pressure oil supply is located beneath the sump oil level and low intermediate shift valve 533 located in a smaller diameter bore 334

The relay valve 531 has made $a$, $b$, and $c$ of equal diameter with intermediate spaced portions of reduced diameter providing flow spaces. In the intermediate and drive range position shown in FIG. 6, spring 536 located at the end of bore 532 holds the valve 531 on a shoulder 537 between the bore 532 and the bore 534. The low range line 434 is connected to bores 532 and 534 at the shoulder 537 and the oil acts on the end of land $c$ of valve 531 to raise it against the spring 536 to the low range position where land $a$ abuts stop pin 538. With relay valve 531 in the drive or intermediate range, as shown, the rear pump feed line 329 is connected to the bore 532 between the lands $b$ and $c$ adjacent the land $b$. The relay valve controlled rear pump line 517 is connected between the lands $a$ and $b$ adjacent the land $b$. A free exhaust port 541 is connected to the bore 532 between the lands $a$ and $b$ adjacent the land $a$. Immediately above land $a$ of valve 531, there is a free exhaust port 542 for bore 532. The end portion of the bore 532 is enlarged to provide a spring chamber 543 connected to exhaust passage 546 having a one-way check valve 547 and an orifice 548 extending to a point under the oil level in the sump to keep the chamber full of oil to cushion valve movement.

With relay valve 531 in the intermediate and high range position shown, the rear pump line 329 is blocked between lands 513$b$ and $c$, controlled rear pump line 517 is connected between lands 531$a$ and $b$ to exhaust 541 and spring chamber 543 is filled with oil. When the manual valve 427 is moved to low range, oil in line 434 tends to move relay valve 531 up. The first increment of movement, while free exhaust 542 is open, is fast and connects rear pump line 329 to controlled rear pump line 517. After land *a* closes exhaust 542, the oil in spring chamber, being retained by check valve 547, slows the valve 531 and only permits very slow movement due to slow leakage of oil past land 531*a* to exhaust 542. During this slow movement, the rear pump pressure in line 517 prevents a downshift of splitter valve unit 490. When land 531*a* enters the spring chamber and permits flow to exhaust 542, the valve 531 is substantially in low range position engaging stop 538, land *c* blocks rear pump line 329, and controlled rear pump line 517 is connected to exhaust 541 permitting normal downshift of splitter valve unit 490.

When the manual valve unit 427 is shifted from low range, low range line 434 is exhausted, spring 536 returns valve 531 and draws oil from the sump through exhaust line 546, orifice 548, and check valve 547 to replenish the oil in spring chamber 543. Though the return movement is faster, since orifice 548 permits a greater flow than the clearance at land 531*a*, rear pump pressure from line 329 is momentarily supplied to controlled rear pump line 517 to momentarily inhibit a downshift of the splitter valve unit 490 during the shift interval. When valve 531 reaches the intermediate and high range position shown, the rear pump line 329 is again blocked and line 517 connected to exhaust 541.

The low intermediate shift valve 533 located in bore 534 has lands *a*, *b*, *c* and *d* of equal diameter and intermediate portions of reduced diameter to provide intermediate flow spaces. The land *d* has a shoulder 551 which engages the valve body at the end of bore 534 and limits upward valve movement under the influence of the spring 552 in the intermediate high position, shown in FIG. 6, preventing contact with valve 531. The spring 552 seated in a larger diameter coaxial spring chamber 553 engages the valve 533 to urge the valve up. A stop 554 in chamber 553 limits downward movement of valve 533 in the low position. Spring chamber 553 has an exhaust port 556 to prevent fluid accumulating and blocking movement of the valve in the chamber.

When the low intermediate shift valve 533 is in the intermediate high position shown, the low exhaust port 557 is connected to the bore 534 between the lands 533*a* and *b* adjacent the land *a*. The low exhaust port 557 is connected through low pressure relief valve 558 to sump to maintain a low pressure in exhaust port 557 and low line 270. The low make-up line 560 having a orifice 562 connects the controlled main line 425 to the exhaust port 557 to supply leakage to keep the exhaust port 557 and connected low line 270 and the low clutch motor filled. The low line 270 is connected to the space between lands *a* and *b* adjacent the land *b*. The drive range supply line 432 supplies controlled and regulated main line pressure to the bore 543 between the lands *b* and *c* adjacent the land *b*. The intermediate high supply line 599 is connected to the bore 534 between the lands *b* and *c* adjacent the land *c*. An exhaust port 561 located between the lands *c* and *d* adjacent the land *c* is connected to sump through the orifice line 563 and the free line 564 which are connected in parallel to the intermediate low exhaust control valve 565. The valve 565 is normally held in bore 566 by spring 567 so that orificed line 563 and free line 564 are freely connected between the lands of valve 565 to sump. The throttle pressure line 408 is connected to the end of valve bore 566 opposite the spring 567 so that the throttle pressure can move valve 565 to block the free exhaust line 564 and restrict the intermediate to low exhaust. The controlled front governor line 521 is connected to bore 534 between lands *c* and *d* adjacent the land *d*. The front governor line 220 is connected to bore 534 opposite land *d*.

With the low intermediate shift valve 533 in the intermediate and high range position illustrated in FIG. 6, the drive range line 432 is connected between lands *b* and *c* to the intermediate high shift valve supply line 559. The low make-up line 560 connects the controlled main line 425 through orifice 562 to port 557 to replenish leakage and low relief valve 558 maintains a low pressure in exhaust port 557. The low line 270 is connected between lands *a* and *b* to the low pressure exhaust port 557 which maintains low pressure oil in low clutch line 270 to keep the low motor filled. The controlled front governor line 521 is connected between lands *c* and *d* to exhaust 561.

When pressure in the low range line 434 acts between land *c* on valve 531 and land *a* on valve 533, to separate the valves, the relay valve 531 moves up as explained above and the valve 533 moves down to the low range position where the drive range line 432 is connected between the lands *a* and *b* to the low range clutch line 270 and low exhaust 557 is blocked by land *a*. The intermediate high supply line 559 is connected by the space between the lands *b* and *c* to exhaust through port 561. Under low to medium throttle, exhaust 561 is freely connected by line 564 to sump and under high throttle, exhaust 561 is connected by orifice line 563 to sump by valve 565 to provide more overlap on a high throttle shift. The front governor line 220 is connected between the lands *c* and *d* to the controlled front governor line 521 to provide front governor pressure on splitter plug 518 for a first to second ratio shift in low range when the three ratio unit 190 is in low.

INTERMEDIATE HIGH SHIFT VALVE UNIT

The intermediate high shift valve unit 570 (FIG. 5) automatically controls the intermediate high shift and the governor pressure acting on the splitter valve 490. The intermediate high shift valve 572 located in bore 571 has large diameter lands *a* and *b* located in a large bore portion 573 and small diameter lands *c*, *d* and *e* located in a small bore portion 574 and intermediate portions of smaller diameter between the lands. At the upper end of the bore 571, the wall 581 has a smaller diameter bore for the stem 582 of the intermediate high blocker plug 583 which has stepped lands *a* and *b* with the small land adjacent the stem 582 fitting in the intermediate size coaxial bore 586 and a second land *b* at the end located in the large coaxial bore 587. Spring 591 engages the end wall of bore 587 and the upper face of land *b* of plug 583 to urge the blocked plug 583 and shift valve 572 toward the intermediate position. A stud 592 fixed on the end wall of bore 587 limits upward movement, in the high position of valve unit 570. The intermediate range line 433 energized by manual valve unit 427 is connected to bore 587 near the end wall. At the shoulder between the bores 587 and 586, there is an exhaust port 594 to drain leakage oil. The rear governor line 320 is connected by port 593 to the bore 586 adjacent the wall 581 so that rear governor oil acts on the face of land *a* adjacent the stem 582 to move plug 583 up against spring 591. The downshift pressure supplied by the throttle valve unit 427 is connected by downshift line 418 to bore 573 adjacent wall 581 and acts to raise the stem 582 and plug 583 and to act on the end face of the land *a* of valve 572 to move the valve down toward intermediate position. The throttle pressure in line 508 enters bore 573 just above the land *a* of valve 572 and tends to move the valve 572 down toward intermediate position and to move the plug 583 away from the valve 572. On upshift of the valve 572 to the high position, the land *a* will close the port of throttle line 408.

Figure 5:
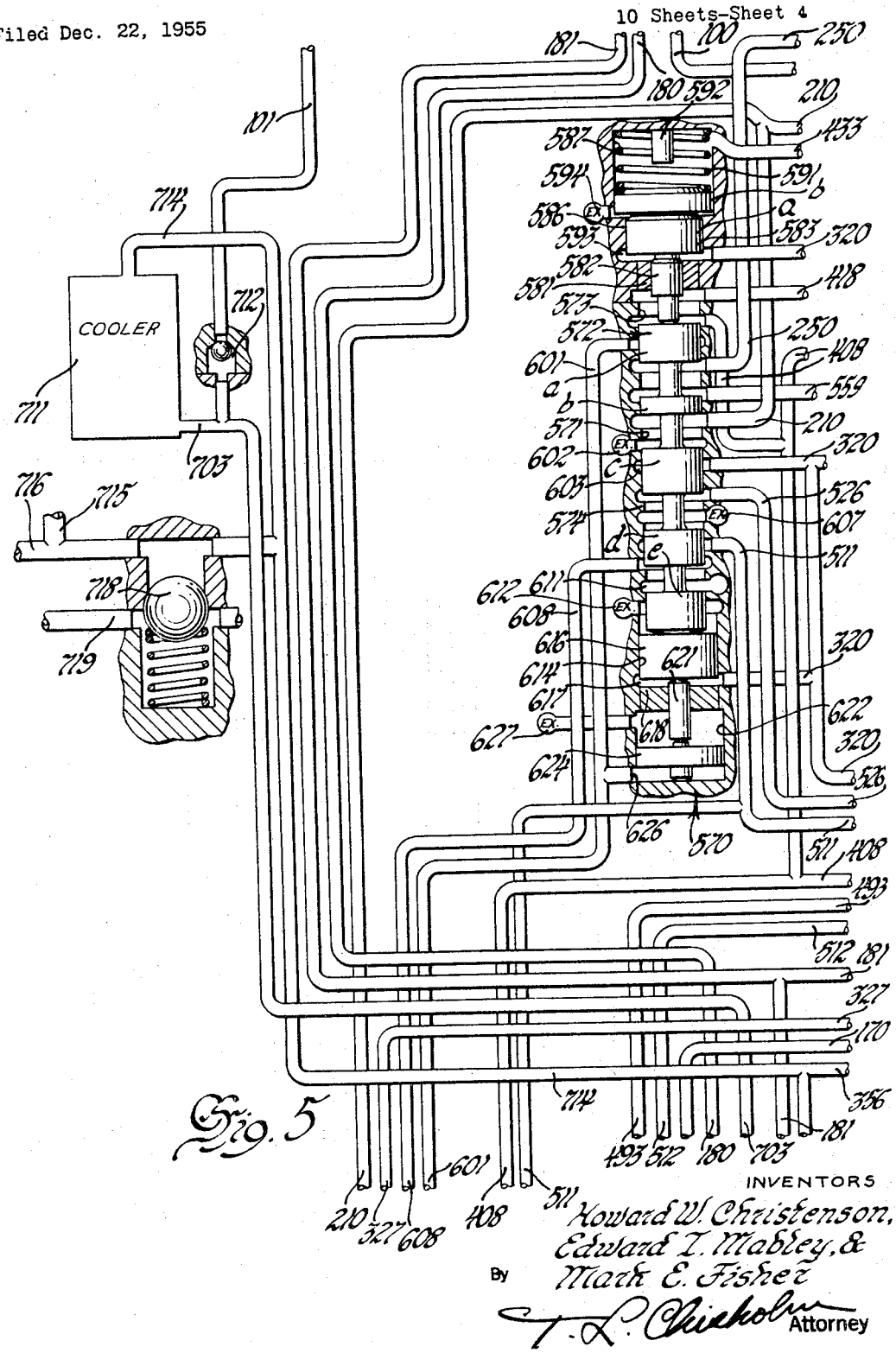

With valve 572 in the intermediate position illustrated in FIG. 5 the intermediate ratio brake is engaged, and the controlled intermediate exhaust line 601 is blocked by land *a*. The intermedaite line 250 is connected to the bore 573 between the lands *a* and *b* adjacent land *a* of the valve 572. The intermediate high supply line 559 is connected to the bore 563 between the lands *a* and *b* adjacent land *d*. The high clutch line 210 is connected to the bore 573 between the lands b and c adjacent land b. Exhaust port 602 is connected to the bore 574 between the lands b and c adjacent land c. The rear governor line 320 is connected to a port 603 which is blocked by the land c. The controlled rear governor line 526 is connected to the bore 574 between land c and d adjacent the land c. An exhaust port 607 is connected to the bore 574 between land c and d adjacent land d. The limited feed line 511 is blocked by the land d. The intermediate exhaust feed line 608 is connected to the bore 574 between lands d and e adjacent land d. An exhaust port 611 is located between lands d and e adjacent land e. An exhaust port 612 is located adjacent the end face of the land d of valve 572.

At the end of shift valve 572, bore 571 has a large portion 614 for the intermediate high plug 616 which engages land e of valve 572 and stem 621. A port 617 in bore 614 adjacent the end wall 618 is connected to the rear governor 320 so that the rear governor pressure acts on the lower face of plug 616 to urge the valve 572 up to high position. A transfer stem 621 extends through an aperture in wall 618 to a larger bore 622 located coaxially with respect to the main bore 571. The intermediate high accelerator plug 624 is located in bore 622 and acts through the stem 621 and the governor plug 616 on valve 572 to raise it toward high position. The controlled intermediate exhaust in line 601 is connected by port 626 to the lower end of bore 622 to act on the free end face of plug 624 to tend to move the valve assembly toward high position. Bore 622 between plug 624 and wall 618 is drained by exhaust 627.

The intermediate high shift valve 572 is urged to the intermediate position illustrated in FIG. 5 by the spring 591 acting through the intermediate high blocker plug 583 unless rear governor pressure in line 320 lifts the plug to disable the spring, by the pressure in intermediate range line 433 on plug 583 which is effective in intermediate and low ranges regardless of rear governor pressure, and by downshift pressure in line 418 and throttle pressure in line 408 acting on end face of land 572a. If one or more of these downshift forces overcome the upshift forces valve 572 is in the intermediate position and the intermediate high supply line 559 is connected between lands a and b to intermediate clutch line 250. The high clutch line 210 is connected between lands b and c to exhaust 602. Rear governor line 320 is blocked by land c and controlled rear governor line 526 is connected between lands c and d to exhaust 607. The limited control feed line 511 is blocked by land d and the intermediate exhaust feed line 608 is vented between lands d and e to exhaust 611.

In high range when intermediate range line 433 is exhausted, the valve 572 is conditioned by governor line 320 supplying oil under pressure to port 593 to raise blocker plug 586 and spring 591 out of engagement with valve 572 to provide a rateless valve. The rear governor pressure at port 617 then acts on the outer end of governor plug 616 against throttle pressure acting on land a to upshift valve 572. When valve 572 is upshifted to high position, the intermediate line 250 is connected between lands a and b to the controlled intermediate exhaust line 601 which is also connected below the accelerator plug 624 to urge valve 572 to high position during the controlled intermediate exhaust period to provide hysteresis before the high clutch pressure has built up sufficiently to provide hysteresis on the unbalanced area of the shift valve. The intermediate high supply line 559 is connected between unbalanced lands b and c providing hysteresis to high clutch line 210 to engage the high clutch. Rear governor line 320 is connected via port 603 between lands c and d to the controlled rear governor line 526. The limited controlled feed line 511 is connected between lands d and e to the intermediate exhaust feed line 608 and exhaust 607 and 611 are blocked by lands d and e.

DOWNSHIFT TIMING VALVE

Referring to the top of FIG. 6, the downshift timing valve unit 630, which controls the engagement of the intermediate brake has a valve member 631 with lands a and b of equal diameter connected by an intermediate portion of reduced diameter to provide a flow space and an end land c of smaller diameter located in a stepped bore 632. Spring 635 located in the vented end of bore 632 normally holds valve 631 in the closed position shown. Throttle oil in line 408 is connected to the bore 632 to act on the end face of land b and low oil in line 270 is connected through an orifice to bore 632 to act on the end face of land c to open the valve 631. The valve 631 normally closed by spring 635 and opened only by both low pressure and throttle pressure between one-half and wide open throttle. The portion of the intermediate line 250 from the intermediate shift valve unit 570 is connected to the port 633 and the other portion of the intermediate line 250 leading to the brake motor 238 is connected to port 634. With the valve 631 in the open position ports 633 and 634 are connected between lands a and b to freely connect the two portions of line 250. With the valve member 631 in the closed position shown, the land c engages the end of the bore to limit movement, and land a will block port 633 to cause the oil to flow through the orifice 636 connecting the two portions of line 250 to provide a slow feed for the intermediate motor.

The valve 631 will be in open position when the oil in the low line 270 applies low ratio brake and the throttle is open, preferably one-half or more, there will be free flow through the valve 631 and line 250 permitting a quick application of the intermediate brake on a high throttle shift from low. When either the low line is exhausted or throttle pressure is low, preferably below half throttle, the valve is closed to block port 633, the oil flows through the restricting orifice 636 in line 250 to effect a slow application of the intermediate brake. Thus on a low throttle upshift from low to intermediate, and on all downshifts from high to intermediate, the intermediate brake is slowly applied through restricting orifice 636.

EXHAUST FEED PUMP

The exhaust feed pump 640 (FIG. 9) which supplies a limited volume of make-up oil during a limited time interval to the exhaust control valve units 650 and 670, has a piston 641 located in bore 642 of uniform diameter having end walls. A spring 643 resiliently moves the piston 641 through the intake stroke to the right or retracted position. The pump is hydraulically actuated by actuator line 473 which provides line pressure supplied by the lockup shift valve unit 465 to lockup feed line 395 when the lockup cut-off valve unit 465 is in cut-off position. The oil from line 473, which is available only when the converter lockup clutch, after being engaged by the lockup shift valve unit 445, is disengaged by the lockup cut-off valve unit 465, enters the right end of bore 642 at port 646 to act on and will move the piston 641 through a pumping stroke to compress spring 643 and move the oil out of the bore 642 through limited feed line 511 when either the low or intermediate exhaust valve unit 650 or 670 requires make-up oil. The limited feed line 511 will require oil when it is connected by either splitter valve unit 490 or intermediate high shift valve unit 570 to the low exhaust valve unit 650 or the intermediate exhaust valve unit 670, respectively, and exhaust valve unit which is connected requires make-up oil to increase the exhaust pressure from the ratio establishing clutches and brakes as more fully explained below in connection with the exhaust control units.

The stop pin 644 limits the piston 641 pump in stroke to prevent blocking line 511 and fully compressing spring 643. When the lockup cut-off valve unit 465 is open, the exhaust control line 473 is discontinued from the fluid supply line 395 and connected to exhaust 474, and spring 643 returns piston 641 and oil is drawn through the sump line 647, check valve 648 and line 511 to the bore 642 to recharge the bore 642 or exhaust feed pump cylinder. Since the pump 640 makes only one stroke during a shift interval, the volume is limited and since actuator line 473 is exhausted when the shift is completed, the duration is limited.

EXHAUST VALVE UNITS

The splitter low exhaust valve unit 650 (FIG. 9) provides overlap in the splitter gear upshift and consists of a splitter low exhaust valve 651 having a land *a* of large diameter located in a large bore portion 652, a small land *b* located in the small diameter bore portion 653 and a smaller intermediate portion providing a flow space. The spring 654 is located in the end of bore 652 and the throttle line 408 is connected to the end of bore 652 so that both the spring 654 and the throttle pressure always urge the valve down toward the exhaust pressure increasing position. With the valve in the neutral or balanced position shown, the exhaust port 657 is just closed by the land *a* and the splitter low exhaust feed line is closed by the land *b*. The exhaust from the splitter low servo, via low line 150, splitter low valve unit 490, and splitter low exhaust line 493 is connected to the valve bore between the large and small bores 652 and 653 and enters the space between the lands *a* and *b* of valve 651 to act upon the unbalanced area of land *a* to oppose the force of the spring 654 and throttle pressure. The splitter low exhaust plug 661 is positioned in large bore 662 coaxially located at the end of bore 653. The remote end of the closed bore 662 is connected to the direct drive clutch line 170 so that the oil in the direct drive clutch servo urges the shift valve upwardly with the exhaust from splitter low line 150 against the spring and throttle pressure toward the pressure decreasing position. The vent port 663 located between the bores 653 and 662 prevents fluid acting on the adjacent faces of valve 651 and plug 661.

The low exhaust valve 651 will remain in the balanced position shown when the forces acting upwardly, the splitter low exhaust acting on the unbalanced area and the direct drive line 170 acting on plug 661, balances the forces acting downwardly, the spring and throttle pressure on land 651*a*. An increase in the forces acting upwardly or a decrease in the forces acting downwardly will move the valve 651 up to open exhaust port 657 and decrease the pressure in splitter low exhaust line 493 and low line 150. A decrease in forces acting up or an increase in forces acting down moves valve 651 down to connect low exhaust feed line 512 to low exhaust line 493 to increase the pressure in splitter low line 150. Under constant throttle conditions for a brief period after the splitter valve unit 490 shifts from low to high drive, the pressure in the splitter low line 150 and splitter low exhaust line 493 is maintained at a reduced value regulated by the throttle pressure line 408 and spring 654. Since the leakage in the motors and controls of the transmissions vary, a limited amount of make-up oil is available from feed pump 640 to maintain this reduced pressure if needed because of leakage. Then as the splitter high servo fills and the pressure in the splitter high clutch line 170 builds up, its acts on plug 662 of low exhaust valve 651 to connect line 493 to exhaust 657 to reduced the pressure. An increase in throttle pressure will increase the splitter low controlled exhaust pressure. When the make-up fluid from exhaust feed pump 640 is exhausted or the lockup cut-off valve unit 465 moves to engage the lockup clutch and disable the exhaust feed pump 640, there is no pressure in splitter low exhaust feed line 512 and the low exhaust valve unit 650 ceases to regulate.

This valve provides overlap on a low to high shift of the splitter gear by holding splitter low pressure at a reduced or partial value until splitter high pressure increases to engage the splitter high clutch. With increasing throttle the overlap is increased since a higher splitter high pressure is required to exhaust the splitter low motor.

The intermediate exhaust valve unit 670, which controls the exhaust from the intermediate brake of the three ratio unit, is like low exhaust valve unit 650 and consists of a valve 671 having a large land *a* located in a large bore 672 and a spaced small land *b* located in a small diameter bore 673.

Spring 674 which abuts against the end of bore 672 and the throttle pressure connected by line 408 to bore 672 both act on the end face of land *a* of valve 671 to urge the valve down to the pressure increasing position. The stud 676 secured to free face of land *a* of the valve 671 limits upward movement of the valve.

With valve 671 in the neutral position as illustrated in FIG. 9, the exhaust port 677 is blocked by the land *a*. The controlled intermediate exhaust pressure in line 601 is connected to the exhaust valve unit 670 at the shoulder between bores 673 and 672 to act on the unbalanced area of lands *a* and *b* of valve 671. The intermediate exhaust feed line 608 which is supplied through the intermediate shift valve unit 570 from the limited feed line 511 is connected to bore 673 and blocked by the land *b*. The intermediate exhaust plug 681 is located in a bore 682 of larger diameter located coaxially with bore 673 and engages land *b*. The high clutch servo oil in line 210 connected to the end of bore 682 acts upon the end face of plug 681, and the controlled exhaust from line 601 acts on the unbalanced lands, to raise the valve toward the open or pressure decreasing position against the spring 674 and throttle pressure acting down to increase the pressure. An exhaust 683 connected to the bore 682 between the land *b* of valve 671 and the plug 681 prevents a pressure build-up due to leakage.

The intermediate exhaust valve unit 670 controls the overlap in the intermediate to high upshift by delaying the exhaust from the intermediate line 250 in the same way as the splitter low exhaust valve unit 650 controls the splitter low line 150. Increasing throttle pressure in line 408 will increase the controlled intermediate exhaust pressure in line 601. When the shift valve unit 570 initiates the intermediate high shift, the intermediate pressure in line 250 is maintained by exhaust control valve unit 670 at a reduced value to provide overlap. Then the increasing high clutch pressure will further decrease the intermediate pressure control overlap and when the high clutch is substantially engaged, exhaust intermediate pressure to terminate overlap. As the throttle pressure increases the reduction of the intermediate oil in lines 250 and 601 will be delayed to provide more overlap.

HYDRODYNAMIC BRAKE CONTROL VALVE UNIT

The brake control valve unit 690 which controls the action of the hydrodynamic brake, illustrated in FIG. 9, consists of a valve 691 having lands *a*, *b* and *c* of equal diameter separated by portions of smaller diameter to provide flow spaces in bore 692. The spring 693, seated in the closed end of the bore, engages the end of face of land *a* which has a stud 694 which positions the spring and provides a stop to limit movement of the valve 691. The spring chamber portion of bore 692 has an exhaust port 696 adjacent the end. At the other end of bore 692 there is a wall 698 apertured to slidably receive the operating stem 699 which is connected by a suitable linkage to the brake operating mechanism.

With the valve 691 in the brake-off position shown, the secondary line 356 which supplies oil to the brake from the pressure control unit 341 via line 356 and from the cooler outlet line 714 is blocked by the land *a*. The brake inlet line 180 is connected to the space between the lands *a* and *b* adjacent land *a* and the exhaust port 701 is located between the lands *a* and *b* and adjacent nd b. The cooler inlet line 703 is connected to the bore 2 at a point blocked by the land b. Brake outlet line 81 is connected in a space between the lands b and c adjacent land b and vent 704 is connected between the lands b and c adjacent land c.

The land a of valve 691 has a tapered shoulder 706 adjacent the brake inlet line 180. When the brake is applied the valve 691 is moved into the valve bore 692 compressing spring 693. This movement uncovers the secondary line 356 gradually due to the tapered shoulder 706 and provides a gradually increasing flow from the secondary line 356 between lands a and b to the brake inlet line 180. At the same time, the brake outlet line 181 connected between lands b and c to cooler feed line 703 and exhaust ports 701 and 704 are closed. The degree of movement of valve 691 regulates the volume of oil supplied in line 356 to the brake and thus controls the braking effort of the brake. Increasing flow of oil increases the quantity of oil in the brake chamber and the braking effort.

The converter outlet line 101 (FIG. 1) is connected through one-way check valve 712 and cooler inlet line 703 to a cooler 711. Check valve 712 prevents brake outlet oil flowing to the converter. The cooler outlet oil in line 714 flows to secondary line 356 to supply the brake, to the lubricating lines 716 and to front Pitot governor feed 715. The pressure in the lubrication line 716 is regulated by the pressure relief valve 718 and the excess oil is by-passed via line 719 to the sump.

OPERATION.—GEARING

The transmission drive train has a torque converter 15 and a lockup clutch 70 which are used alternatively in conjunction with the transmission gearing, a two ratio splitter unit 115 and a three ratio and reverse unit 190, to provide six forward ratios and reverse. The engine is connected by a conventional flex plate to drive the impeller housing 17 having impeller blades 27 which hydrokinetically drives the turbine 31 having blades 32 and the converter output shaft 59. The stator is the dual type having stator blades 33 and 37 mounted by means of one-way clutches 34 and 38 respectively on ground sleeve 35 provides the reaction for this torque multiplying converter. A converter having a 2.8-to-1 stall ratio is preferred.

The lockup clutch 70 has driving plates 74-79 on the impeller housing 17 and a driven plate 73 connected by disk 58 to converter output shaft 59. When the torque multiplying effect of the torque converter 15 is no longer necessary, the lockup clutch 70 is hydraulically engaged by the motor including cylinder 77 and piston 78 to connect the rotary torque converter 17 to the converter output shaft 59 to provide a direct drive without the slippage and resultant loss of efficiency of a hydrokinetic torque converter. The belleville spring piston 78 retracts the motor and disengages the lockup clutch 70 when pressure in line 90 is released.

The torque converter output shaft 59 drives the ring gear 114 of the splitter gear unit 115. The planetary pinions 116 and carrier 117 are mounted on the intermediate shaft 119. The splitter gear unit provides low, an underdrive ratio, when the sun gear 131 is held stationary by brake 136 which is engaged by splitter low motor consisting of piston 139 and cylinder 141 and high, a direct drive, when the sun gear 131 and the carrier 117 are fixed to rotate together by the clutch 157 which is engaged by the splitter high motor consisting of cylinder 162 and piston 161.

The splitter gear unit 115 is connected by intermediate shaft 119 to drive the three ratio gear unit which provides high, intermediate, low and reverse ratios. In low ratio, the intermediate shaft 119 drives the sun gear 254 which drives the pinions 252 mounted on the carrier 253 which drives the pinions 252 mounted on the carrier 253. The pinions 252 mesh with the fixed reaction ring gear 251 which is held stationary when the low brake 256 is engaged by low motor consisting of piston 264 and cylinder 267 to drive the final drive shaft 185 in low ratio. In the intermediate ratio drive which employs the double planetary drive, the intermediate shaft 119 drives sun gears 254 and 228. The low brake 256 is released and the intermediate brake 231 applied by intermediate motor including piston 238 and cylinder 239 to hold reaction ring gear 229 which meshes with planetary pinions 227. Sun gear 228 also meshes with pinions 227 and as the sun gear rotates forwardly, the pinions planetate forwardly and rotate the carrier assembly 206 and the ring gear 251 at a slow forward speed. Then the drive from sun gear 254 to pinions 252 and carrier 253 rotates final drive shaft 185 at an intermediate speed due to the fact that the ring gear 251 which was stationary in low is rotating slowly. The high ratio is obtained when the high clutch 195 is engaged by the high motor consisting of piston 208 and cylinder 209 to directly connect the intermediate shaft 119 to the carrier assembly 206 to rotate together and thus lock up the three ratio unit 190 to provide direct drive or high. The reverse gear is provided by brake 292 which is engaged by a reverse motor consisting of piston 301 and cylinder 303 to stop the reaction ring gear 291 which meshes with the planetary pinions 287 on the carrier 288 fixed to the final drive shaft 185. Planetary pinions 287 are driven by sun gear 286 and sleeve 282 connected to the carrier assembly 206. The intermediate shaft 119 through pinions 252 drives the carrier assembly 206 backward which causes sun gear 286 on the carrier assembly to rotate backwards and impart backward rotation to pinions 287 and final drive shaft 185 for reverse. In the three ratio unit 190 when the clutch or brake establishing a ratio is engaged the others are released.

This combination of gearing provides six forward ratios, the first, third and fifth ratios are provided by splitter low of the splitter gear unit in combination with low, intermediate and high ratio of the three ratio unit while the second, fourth and sixth ratios are provided by splitter high of the splitter gear unit in combination with the low, intermediate and high ratios of the three ratio unit. Reverse is provided by splitter low and reverse in the three speed unit. In neutral, though splitter low is engaged, there is no drive through the three speed unit.

HYDRAULIC CONTROLS

The manual control unit 427 is employed by the operator to select one of three automatic ranges, low, intermediate and drive ranges, reverse or neutral. In low range, where the three ratio unit 190 is in low, either first or second ratio is automatically provided, depending on whether the splitter gear unit 115 is automatically positioned in splitter low or high by the governor and throttle actuated splitter shift valve unit 490. When the manual selector valve is positioned in the intermediate range, either third or fourth ratio is automatically provided by a second shift point of the splitter shift valve unit 490 which shifts again under the influence of a different governor control and throttle control to provide either splitter low or high drive in conjunction with intermediate speed in the three ratio unit. In the drive range position of the manual valve, the automatic control provides third and fourth ratios previously available in intermediate range and, in addition, fifth and sixth ratios which are obtained by an automatic shift of the three ratio unit 190 from intermediate to high and a third shift of the splitter shift valve from splitter low to high at a higher speed under the influence of another governor and the throttle pressure.

In the table below, "X" shows the ratios available in each range and the gear ratio of both the splitter and three ratio unit that is engaged to provide the six transmission ratios. The approximate numerical value of each ratio in converter and lockup drive is also shown.

| Ratio | Gear Ratio Conv. | Lockup | Neutral | Lo Rge. | Int. Rge. | Drive Rge. | Splitter Gear | | 3 Speed Unit | | | |
|---|---|---|---|---|---|---|---|---|---|---|---|---|
| | | | | | | | Under-Drive | Direct Drive | Lo | I | H | R |
| N | | | X | | | | X | | | | | |
| 1 | 14 | 5 | | X | | | X | | X | | | |
| 2 | 12 | 4 | | X | | | | X | X | | | |
| 3 | 8 | 3 | | | X | X | X | | | X | | |
| 4 | | 2 | | | X | X | | X | | X | | |
| 5 | | 1.5 | | | | X | X | | | | X | |
| 6 | | 1 | | | | X | | X | | | X | |
| R | 17 | 6 | | | | | X | | | | | X |

When the vehicle starts from a standing start, the drive is transmitted through the torque converter which provides additional torque multiplication until a certain speed, preferably the speed at which the converter acts as a fluid coupling, and while the transmission is in first ratio, is reached. At this speed the lockup valve unit 445 (FIG. 7) moves under the influence of vehicle speed and throttle position to engage the lockup clutch 70 to provide a direct drive by-passing the torque converter. The lockup clutch is also disengaged by the lockup cut-off valve unit 465 each time a change in the gear ratio is made in the six ratio unit so the fluid drive of the converter smooths the gear ratio change.

NEUTRAL

When the vehicle is at rest and the engine is started and the manual valve unit 427 is in neutral, the engine drives the converter impeller housing 17 which is connected by the pump drive sleeve 107 to drive the front pump 106. Front pump 106 (FIG. 9) supplies oil under pressure via front pump line 327 through ball check valve 334 (FIG. 7) to the dual check valve 333 and main line 340. The ball check valve 336 prevents oil exhausting through rear pump line 329 and rear pump 321 which is now inactive. Main line (340) oil is blocked at lockup valve unit 445 by land 446a and flows to throttle valve unit 401 to provide throttle pressure in line 408 if the throttle is advanced but will flow, at closed throttle, around the throttle valve 403 in the annular passage 404 around land 403a to the lockup cut-off valve unit 465. Due to the initial filling of some ratio motors, there is a pressure drop between main line 340 across the orifice 424 to the ratio change line 425, and the lockup cut-off valve 466 is momentarily raised supplying oil via by-pass 476 until the flow ceases and the pressure is equalized in these lines. The line 425 conveys oil at main line pressure to the manual valve unit 427 which, in the neutral position illustrated, blocks the line 425 between lands a and b of valve 428 preventing engagement of any ratio in the three speed unit 190 and to the splitter valve unit 490 which in the initial position shown in FIG. 6 connects line 425 between lands 491a and b to the splitter low line 150 to engage the splitter low brake 136 to place the splitter unit in low. The transmission gearing remains in neutral since the three ratio unit is not engaged in any gear ratio.

When the selector valve 427 is in neutral, the low and reverse lines 270 and 310 (FIG. 4) are maintained full of oil so that a rapid shift can be made between these gears for "rocking" the vehicle. Oil is supplied to reverse line 310 by orificed reverse make-up line 439 and limited to a low pressure only sufficient to fill but not actuate the reverse motor by the reverse relief valve 439 in exhaust 436. The low line 270 and low motor is similarly filled with oil by the orificed low make-up line 560 (FIG. 6) which is limited to a pressure insufficient to engage the low brake by the low relief valve 558 at exhaust 557. The intermediate line 250 is connected to exhaust through intermediate high shift valve unit 570, line 559, low intermediate shift valve unit 530, line 432 and manual valve unit 427 to exhaust 437. High clutch line 210 is connected at intermediate high shift unit 570 (FIG. 5) to exhaust 602. The splitter high clutch line 170 is connected by the splitter shift valve 491 (FIG. 6) between the lands b and c to the exhaust 506.

At this time the pressure in main line 340 is regulated solely by the main line pressure acting on the unbalanced area of lands b and c and opposing the action of spring 367, on valve 343 of pressure control unit 341 (FIG. 7) to provide a constant pressure. It will be noted that the lower edge of the lands 343a and b may have tapered flats on opposite sides so that each half of the land presents in a transverse plane a sloped edge and that the cooperating lands have sloped edges which will provide a small opening when the valve initially opens and an increasing opening when the valve moves further toward the open position. This valve construction prevents hunting and vibration caused by the initial valve opening providing an excessive flow.

When the pressure in main line 340 reaches the level controlled by the spring 367, valve 343 is raised until the land b permits the flow of oil to the secondary line 356. The right portion of the line 356 is connected to the brake control valve unit 690 to supply oil for the brake and the left portion of line 356 is connected to the lockup valve unit 445.

When the transmission manual valve unit 427 is in neutral or any drive position and the lockup valve 445 in disengaged position, the secondary line 356 is connected between lands a and b of lockup valve member 446 to quickly fill the converter. The check valve 461 prevents flow from converter inlet line 100 through the low pressure line 362. Relief valve 462 in line 100 will be inactive in neutral, since it is set to unload at a higher pressure which is supplied by the main line 340 and the secondary line 356, only when the regulated pressure is raised by a control pressure such as the brake out pressure in line 181.

The oil will flow out of the converter through the converter outlet line 101, check valve 712, cooler 711 and cooler outlet line 714, to the front Pitot feed 715 and the lubricating system 716. The pressure in the converter is regulated by the regulating valve unit 341 which normally regulates the same pressure in the secondary line 356 and the main line 340. When there is an excess of oil for these lines, the regulator valve 343 moves up toward the exhaust position and vents the front pump line 327 directly past the land a to the low pressure exhaust port 361. At this time, since there is full regulated line pressure in converter inlet line 100, the oil in port 361 cannot flow through line 362 and will exhaust through the low pressure relief valve 363.

When the converter 15 is filled and the splitter low brake 136 engaged in neutral, the converter and splitter low drives the intermediate shaft 119 which drives the front governor 215 and provides a low front governor pressure in line 220. The front governor line 220 is connected to the lockup valve unit 445 where it is opposed, when starting the vehicle, by greater spring and throttle forces to prevent lockup in neutral. Though racing the engine could upshift valve unit 445 to engage the lockup clutch, it would be disengaged by the lockup cut-off valve unit 465 when a ratio in the three ratio unit 190 is engaged to start the vehicle and then load would reduce the engine speed to downshift the lockup shaft valve unit 445. The front governor line 220 is also blocked by land b of the low intermediate shift valve 533 and thus cannot act on splitter shift valve 491. The splitter shift valve 491 and the intermediate high shift valve 572 are held by their springs in the downshift position and the relay valve 531 and low intermediate shift valve 533 are held in the upshift position by their springs.

LOW RANGE

When the vehicle is standing with the engine idling, and the manual valve unit 427 is moved to the low range position "LO," the main line 425 remains connected by splitter shift valve unit 490 (FIG. 6) to engage the splitter low brake and is connected between the lands a and b to the drive range line 432, the intermediate range line 433 and the low range line 434. The low range oil in line 434 is connected to the low intermediate shift valve unit 530 between the splitter relay valve 531 and the low intermediate shift valve 533 to move these valves apart against the springs toward the ends of their respective bores to the low range position. Since there is no rear pump pressure in line 329 because the vehicle is standing, the relay valve 531 does not connect the rear pump by line 517 to upshift the splitter valve. The intermediate range oil in line 433 which is connected to the intermediate high shift valve unit 570 (FIG. 5) in spring chamber or large bore 587 acts on intermediate high blocker plug 583 and holds the intermediate high shift valve 582 in the intermediate position. The drive range line 432 is connected by the space between the lands a and b of the low intermediate shift valve 533 when in the low range position to the low line 270 and is blocked from the intermediate high supply line 559 to prevent filling of the intermediate line 250 and high clutch line 210. Since low make-up line 560 and relief valve 558 keep low line 270 full, the movement of the manual valve 427 to low range places the transmission in first ratio very quickly by supplying oil to raise the pressure in low line 270 and engaging brake 256 to place the three ratio unit in low ratio. The splitter gear unit having been in splitter low when the engine was started with the selector valve unit in neutral remains in splitter low. The transmission is in first ratio but with the engine at idling speed there is sufficient slip in the torque converter so that no drive is transmitted. As the driver advances the throttle and increases the engine speed, torque is transmitted and multiplied in the converter and the vehicle starts to move. The pressure in the converter chamber is controlled by valve 462 when the lockup clutch is disengaged and drive is transmitted through the converter. At the same time, the throttle linkage connected through lever 414 (FIG. 8) acts on the throttle valve unit 401 to move the downshift valve 411 which through the springs 415 moves the throttle valve 403. As the throttle is advanced, the land a of valve 403 uncovers the regulated line 340 so that oil flows between lands a and b to throttle line 408 which is also connected to the end of valve 403 to act on an unbalanced area of the valve and provide increased throttle pressure in line 408 with increasing throttle pedal position.

When the converter reaches the coupling stage, front governor pressure in line 220 acting on lockup plug 455 moves the valve 446 (FIG. 7) up at about four miles per hour to lockup position against spring 452 and throttle pressure in downshift line 418 acting on land a. Throttle pressure from line 408 is present in downshift line 418 except in sixth ratio since these lines are interconnected at the splitter shaft valve unit 490 and the intermediate high shift valve unit 570 when these valve units are in the downshift position. When the valve 446 is moved to lockup position, the lockup feed line 395 is disconnected from exhaust 457 and connected between lands b and c to main line 340 which acts on the unbalanced area of lands b and c to provide hysteresis so that the lockup clutch is disengaged at a lower speed.

Lockup feed line 395 is connected (FIG. 8) between lands a and b and lockup cut-off valve 466 to the lockup clutch line 90. The lockup feed line 395 conveys oil to the pressure control unit 341 at the lower face of land b of knockdown plug 349 to reduce the pressure in main line 340 and secondary line 356. The lockup clutch line 90 is also connected to the upper end of the throttle and lockup plug 346 of the pressure control unit 341 to increase the pressure in the main and secondary lines. Since lockup clutch line 90 is exhausted during each shift, the pressure functions to reduce main line pressure during each shift. The main line pressure is always increased with increasing throttle pressure in line 408 and brake pressure in line 181 as explained in the above description of the pressure control unit 341.

When the lockup valve unit 445 is in lockup position directing engagement of the lockup clutch, the secondary line 356 is blocked by land b of valve 446 and cannot supply the converter inlet line 100. As the pressure in the converter decreases due to leakage, the low pressure exhaust from the pressure control unit 341 at port 361 will flow through the line 362 and check valve 461 to the converter inlet line 100 and provide a low pressure feed at the pressure regulated by the relief valve 363.

As the vehicle accelerates, the front Pitot pressure 220, the rear governor pressure 320, and the rear pump pressure in line 329 having orifice 331, increases in proportion with the rear wheel speed.

Splitter shift valve unit 490 in low range, is initially held by spring 502 to connect the ratio change line 425 to the splitter low line 150 and then conditioned for an automatic shift by rear pump oil which disables the spring when the vehicle moves and then is automatically shifted by throttle and governor pressures to connect the splitter low line 150 to the splitter low exhaust line 493 and connect the ratio change line 425 to the splitter high clutch line 170. When the vehicle is standing, the splitter valve 491 is held in the lower or splitter low position by the spring 502. When the vehicle starts to move the rear pump pressure in line 329 acts on the lower face of rear pump plug 497 to lift spring to free the valve 491 so that rateless valve control is obtained. The throttle pressure in line 408 is connected to the end of the bore 492, which is closed by stem 501 and end wall 496, and acts on the end face valve 491 toward the splitter low position. Though throttle pressure line 408 is connected in bore 492 to downshift line 418 which is exhausted through orifice 419 (FIG. 8), the small orifice 419 does not reduce this pressure enough to affect the operation. The governor pressures proportional to speed act to move the splitter valve 491 up to splitter high position. The low intermediate valve 533 now in low range position connects front governor line 220 to relay controlled front governor line 521 and disconnects it from controlled exhausts 561. Front governor line 521 is connected to splitter valve unit 490 to act on the lower face of front governor plug 518. The lower pressure rear governor oil in line 320, though acting on the lower face of the rear governor plug 522 is ineffective, since it is not high enough to overcome front governor pressure acting down on the plug. The intermediate high controlled rear governor line 526 is connected to exhaust at the intermediate high valve unit 570. The rear pump line 329 is connected to the relay valve 531 which in the low range position is raised and disconnects line 329 and connects controlled rear pump line 517 to exhaust 541. The splitter valve 491 is thus controlled by the throttle pressure which tends to move the valve toward splitter low position and the front governor pressure acting via relay controlled line 521 to move the valve up to the splitter high position at about 12 miles per hour depending on throttle position. The splitter shift valve 491 which in first ratio connects the main line and ratio change line to splitter low line 150 and splitter high clutch line 170 to exhaust 506, shifts up for second ratio to connect ratio change line 425 between lands b and c to splitter high clutch line 170 and splitter low line 150 between lands a and b to splitter low exhaust line 493 which regulates overlap as explained below.

When the ratio change line 425 is connected to splitter high clutch line 170, the flow to fill the splitter high cylinder 162, from line 340 across orifice 424 reduces the pressure acting on land a of lockup cut-off valve 466 to upshift the valve so that lockup clutch line 90 is connected to exhaust 468 to disengage the lockup clutch 70 and the lockup clutch feed line 395 is connected to actuator line 473. Thus during the short interval that the splitter high clutch motor cylinder 162 is being filled, the lockup clutch 70 is disengaged and fluid under pressure is supplied by the exhaust control line 473 to the exhaust feed pump 640 (FIG. 9). The exhaust feed pump unit 640 will supply a limited volume of oil via the limited feed line 511 which is connected when the splitter valve 491 is in splitter high position, between the lands c and d of valve 491 to the splitter low exhaust feed line 512 and splitter low exhaust control valve unit 650 (FIG. 9).

When the splitter shaft valve 491 first moves to splitter high position, the splitter low line 150 is connected to the splitter low exhaust line 493 which is initially blocked between the lands a and b of valve 651 of the low exhaust control valve unit 650. With throttle pressure 408 and the spring 654 normally urging the valve 651 down, the splitter low exhaust line 493 and connected splitter low line 150 are normally closed at valve 651. As the pressure line 493 builds up due to the splitter low clutch retraction spring 151, this exhaust pressure acts on the unbalanced area of lands a and b and raises the valve to connect the controlled exhaust line 493 to exhaust port 657 to control the splitter low exhaust at an intermediate pressure to provide the proper overlap during this shift. The throttle pressure acts on valve 651 to increase the overlap with increased throttle. If during the time interval when the splitter high clutch motor is being filled, there is excessive leakage from the splitter low motor, or there is an increase in throttle pressure, the valve will be lowered to connect the splitter low feed line 512 to the splitter low exhaust line 493 to increase the controlled exhaust pressure of the controlled exhaust from the splitter low motor. Then as the splitter high clutch line 170 and motor fill up and the pressure increases, this pressure acts beneath the splitter low exhaust plug 661 to raise low exhaust valve 651 to connect the splitter low exhaust line 493 to exhaust 657 to gradually reduce splitter low exhaust pressure for disengagement at the time splitter high is engaged.

As soon as the splitter high clutch cylinder 162 is filled and the flow ceases in controlled line 425, the pressure equalizes across orifice 424 of the lockup cut-off valve unit 465 and the valve 466 is returned to its normal position by spring 471 connecting the lockup feed line 395 to the lockup clutch line 90 to reengage the lockup clutch and connecting the actuator line 473 to exhaust 474 to stop the pumping stroke of exhaust feed pump 640. Then the spring 643 of exhaust feed pump 640 returns piston 641 and draws another charge through check valve 648 into cylinder 642 to be available to control another shift.

If the vehicle speed is decreased to about 11 miles per hour so that the relay controlled front governor pressure line 521 with the assistance of the direct clutch pressure in line 170 acting on the unbalanced area of lands 491b and c cannot hold the valve up against the action throttle pressure in line 408 and downshift line 418, the splitter shift valve 491 will move down to the splitter low position. In low range the throttle pressure line 408 is connected by bore 573 of the intermediate high shift valve unit 570 to downshift line 418 so that throttle pressure always acts on splitter shift valve 491 even though land a blocks throttle pressure line 408 in upshift position.

In the splitter low position, the valve 491 connects the splitter high clutch line 170 to exhaust between lands b and c to exhaust 506 and the ratio change line 425 to the splitter low line 150. The controlled exhaust line 493 is blocked by land a, the limited feed line 511 is blocked by the land c and low exhaust feed line 512 is connected to exhaust 513.

It is also possible to manually downshift from splitter high to splitter low in low range by moving the throttle pedal to full throttle position or slightly beyond to move the downshift valve 411 toward the throttle valve 403 so that the throttle pressure in line 408 is equal to main line pressure. Then the throttle pressure line 408 is connected between lands a and b of valve 411 to the downshift line 418 which is connected (FIG. 6) to the upper end of bore 492 to act on land a to downshift splitter valve 491 to the splitter low position shown. The throttle line 408 is also connected to port 422 and the space between the lands b and c to act on the unbalanced area of the land c when land c enters the bore 423 to provide a hydraulic detent so the driver can feel when the downshift valve 411 reaches downshift position. When the accelerator pedal is returned from the downshift position to the normal driving range position, the land 411a blocks the throttle line 408 and downshift line 418 and downshift line 418 is exhausted by the annular port through the orifice 419 to the exhaust 421 to restore normal governor and throttle pressure operation of the shift valves. However the orifice 419 is small and does not interfere with the build-up of downshift pressure in the line 418 or the throttle pressure in line 408 which, as pointed out above, are interconnected at splitter shift valve 490.

When the splitter high valve unit 490 upshifts to high, the splitter high clutch line 170 is also connected to the space below land c of the regulator valve 343 to reduce main line pressure in converter drive. If the transmission is in lockup, lockup feed line 395 acting on land b of plug 349 reduces the main line pressure and the splitter high clutch pressure in line 170 does not further reduce the main line pressure.

In low range, first or second ratio, the high clutch line 210 is connected between lands b and c of intermediate high shift valve 572 to exhaust 602 and the intermediate line 250 is connected between lands a and b of intermediate high valve 572 to intermediate high supply line 559 which is connected between lands b and c of low intermediate valve 533 to controlled exhaust 561.

INTERMEDIATE RANGE

When the vehicle has reached the proper speed in second ratio and third ratio is desired, the transmission is shifted from low range to intermediate range by manually moving the manual valve unit 427 from low to intermediate position. In this position, the selector valve land 428b blocks the flow of oil from the ratio change line 425 to the low range line 434 but permits flow to continue to the drive range line 432 and the intermediate range line 433. When the supply to the low range line 434 is cut-off and the line 434 connected to exhaust port 437, the oil pressure between the relay valve 531 and the low intermediate valve 533 is relieved to permit the springs to return these valves to the central position.

The sequence of operation during a low to intermediate range manual shift described below, is the same as the third and fourth ratio operation for a low to drive range shift except that in the latter the intermediate range line 433 is exhausted permitting the intermediate high shift valve 572 to upshift to fifth and sixth ratio.

The spring 536 returns relay valve 531 at a moderate speed since a substantial flow is permitted from the sump through exhaust 546, orifice 548 and check valve 547 to spring chamber 543. As the relay valve 531 passes mid-position, the rear pump line 329 is momentarily connected to relay controlled rear pump line 517 which acts on land d of splitter shift valve 491, this has no effect to move the valve, since the valve 491 is in the splitter high position but delays downshifting of the valve 491 to insure engagement of the intermediate brake before the splitter low brake to provide a second to third ratio shift and prevent a 2nd, 1st, 3rd ratio shift.

When the spring 552 moves the low intermediate shift valve 533 to the intermediate position as illustrated in FIG. 6, the low line 270 is connected through low pressure relief valve 558 to exhaust 557 to keep the low motor full and the drive range line 432 is connected between the lands *b* and *c* to the intermediate high supply line 559. The front governor line 220 is blocked by the land *d* of valve 533 and thus disconnected from the controlled front governor line 521 which is connected to controlled exhaust 561. The intermediate high supply line 559 conveys main line oil from drive range line 432 to the intermediate high valve unit 570 between the lands *a* and *b* of valve 572 to the intermediate line 250 and through the downshift timing valve 630 to engage the intermediate brake. The downshift timing valve 630 will connect intermediate line 250 between lands 631*a* and *b* without restriction on a high throttle upshift but will provide a restriction on low throttle upshift.

Since the intermediaae range line 433, in intermediate range as in low range, is supplied with oil under pressure from controlled main line 425 by manual valve unit 427 and this line 433 enters spring chamber 587, the oil acts on the intermediate high blocker plug 583 to hold the intermediate high shift valve unit 570 in intermediate position regardless of vehicle speed. If the pressure on or the area of land *b* of blocker plug 583 is reduced, the governor forces acting on the intermediate high shift valve unit 570 will upshift the transmission to protect the engine against being run at excessive speeds. Since the brake is used to prevent excessive speeds, when the transmission is held in fourth ratio by the blocker plug, the blocker plug 583 will hold the intermediate high valve 572 in intermediate at any vehicle speed.

When, during the low to intermediate range shift, the low intermediate shift valve 533 moves up to intermediate position cutting off the front governor line 220 at land *d*, from the relay controlled front governor line 521, and the relay 531 after momentarily connecting the rear pump line 320 to the relay controlled rear pump line 517 during movement to delay shifting valve 491 as explained above reaches intermediate position cutting off the rear pump line 320 from the relay controlled rear pump line 517, the splitter valve 491 is conditioned for shifting in intermediate range. Since the controlled rear pump line 517 and the controlled front governor line 521 are cut off and do not act on the splitter valve 491 and the intermediate high controlled rear governor line 526 is exhausted at port 607, the only governor force acting on the splitter valve 491 is the rear governor line 320 which flows through orifice 527 and acts on the end face of rear governor splitter plug 522. The plug 522 is held in low range, in the downshift position shown by front governor pressure in line 521 acting on plug 524 which on a shift to intermediate is exhausted via valve 565. The rear pump pressure in line 329 continues to keep plug 497 and spring 502 free of valve 491, so the valve 491 is rateless. The orifice 527 is preferably sized so it only delays a downshift of the splitter valve 491 on a 5th to 4th ratio change as explained below and is large enough to permit sufficient flow from rear governor pressure line 320 to plug 522 to place valve 491 under throttle and rear governor control before valve 491 effects a shift of the spiltter gear unit. Thus when the low intermediate manual shift is made below the 3rd, 4th ratio upshift point which may be 24 miles per hour, the transmission will shift from 2nd to 3rd ratio until the normal 3rd, 4th ratio upshift occurs but if made about this speed the transmission will shift from 2nd directly to 4th ratio. However, the orifice 527 may be made smaller to delay the flow of rear governor oil from line 320 to plug 522 permitting throttle pressure acting on land 491*a* to downshift this valve against the hysteresis force. Then at all vehicle speeds, normal for this shift, when the manual valve is moved from low to intermediate range to effect a low to intermediate shift in three ratio unit 190, the splitter shift valve will, a moment later, downshift from splitter high to low position illustrated in FIG. 6 to effect a splitter high to low shift of the two speed unit 115 and the transmission will be in third ratio. If this 2nd–3rd ratio manual shift is made below the 3rd–4th ratio upshift speed which may be 24 miles per hour, the transmission will remain in 3rd ratio until the normal 3rd–4th ratio upshift occurs, but if it is made above this speed the transmission will shift to 4th ratio as soon as orifice 527 passes enough rear governor oil through line 320 to upshift splitter valve 491. At excessive speeds for this shift the small orifice would pass more oil and a direct shift to 4th ratio would occur.

If the lockup clutch 70 was engaged in low range by the lockup valve unit 445, the lockup clutch would be disengaged during the manual 2nd–3rd ratio shift. As during all shifts, the oil flowing on this shift from main line 340 through orifice 424 to ratio change line 425 to the intermediate and splitter low clutch motors actuates lockup cut-off valve unit 465 to disconnect lockup feed line 395 from lockup clutch line 90 to disengage the lockup clutch as long as flow continues. Though at this time the lockup feed line 395 is connected to the actuator line 473, the exhaust feed pump 640 is not used.

Under normal driving conditions, the vehicle will be started on substantially level ground under a moderate load in intermediate range. When the transmission is in neutral as described above in neutral range operation, the front pump 106 supplies oil to the regulator valve unit 341 which provides a regulated pressure in main line 340, secondary line 356 and ratio change line 425. With the vehicle at rest, the front governor pressure is low and the lockup valve unit 445 is in converter drive or lockup clutch disengaged position illustrated in FIG. 7 disconnecting lockup feed line 395 and connecting the line 356 to the converter inlet line 100. The splitter valve unit 490 is held in the underdrive position by spring 502 connecting the ratio change line 425 to the splitter low line 150 to place the splitter gear unit 115 in low. As in shifting from neutral to low range, the shift from neutral to intermediate range does not affect the splitter gear unit.

In neutral, as described above, the selector valve unit 427 connects the range lines 432, 433 and 434 to exhaust 437 and since oil is not supplied to the low, intermediate high gear, or reverse servo motor, the three ratio unit 190 is in neutral. When the manual valve unit 427 is moved from neutral to the intermediate position, the drive range line 432 and the intermediate range line 433 are energized while the low range line 434 remains connected to exhaust 437. The intermediate range line 433 is connected, as in low range, to intermediate high shift valve unit 570 at the upper end to act on land *b* of the intermediate high blocker plug 583 to hold the intermediate high shift valve 572 in intermediate position. The drive range line 432 conveys fluid from the ratio change line 425 to the low intermediate valve unit 530 which in intermediate range is held in the position shown by the spring 552 since low range line 434 is exhausted. In intermediate range the low intermediate valve 533 connects the drive range line 432 between lands *b* and *c* to the intermediate high supply line 559 which is connected between the lands *a* and *b* of the intermediate high shift valve 572 to the intermediate line 250 and downshift timing valve 630 to engage the intermediate clutch. On this manual shift into intermediate range, 3rd ratio, with the vehicle standing the downshift timing valve 630 is in the restricting position since the three ratio unit has not been in low ratio. The intermediate line 250 acts on lockup knockdown plug 349 to reduce the pressure decreasing effect of lockup feed pressure in line 395. The high clutch line 210 is connected between the lands *b* and *c* of the intermediate high shift valve 572 to exhaust 602. The low line 270 is connected between the lands *a* and *b* of the low intermediate shift valve 530 to the controlled exhaust 557 and valve 558 which keeps the low motor full. The reverse line 310 is connected through selector valve 427 to controlled exhaust 436 and valve 438 which keeps the reverse motor full. Relay valve 531 is also held in intermediate position by spring 536 since low range line 434 is exhausted, blocking rear pump line 329 and exhausting the controlled rear pump line 517 connected to the splitter valve.

Since the splitter valve unit 490 normally engages the splitter gear in low, the engagement of the intermediate gear of the three speed unit by shifting the manual valve unit 427 to intermediate range, places the transmission in third ratio converter drive. When the engine is idling no drive is transmitted but when it is accelerated the vehicle will move and the front governor line 220 provides a pressure proportionate to the rear wheel speed as modified by the intermediate gear ratio which acts on the lower face of the lockup plug 455 and tends to shift the lockup valve 446 against the opposing force of spring 452 and throttle pressure from line 418. When the vehicle has reached a speed at which torque multiplication is not required and the converter reaches the coupling stage, the lockup valve 446 will upshift as in low range operation to connect the main line 340 to the lockup feed line 395. The lockup feed line 395 is connected by the lockup cut-off valve 466 to the lockup clutch line 90. The upshift of the lockup valve unit 445 to engage the lockup clutch also moves land *b* to block flow from the secondary line 356 to the converter inlet line 100 to provide a low pressure converter feed from low pressure feed line 362 and exhaust 361 of the regulator valve 343, as explained above, in low range lockup. The lockup valve unit 445 may be set to upshift at 10 miles per hour and then due to the hysteresis effect on the unbalanced lands will downshift at about 8 miles per hour at full throttle. The throttle pressure line 408 is connected by downshift line 418 to the lockup valve 445 except in sixth ratio to provide throttle downshifts. A forced disengagement of the lockup clutch by the downshift pressure is provided. Thus high throttled and forced disengagement of the lockup clutch is provided in the first to fifth ratios and only forced disengagement in sixth ratio below certain engine speeds.

The splitter valve unit 490 is normally held in the underdrive position illustrated in FIG. 6 by the spring 502. As in low range, when the vehicle gets under way, the rear pump pressure, proportional to vehicle speed, is connected by line 329 beneath the rear pump splitter plug 497 to lift the plug so the spring 502 and plug 497 cannot act on the valve 491 which is thus rateless and conditioned for an upshift. In intermediate range throttle pressure from line 408 acts down on land 491*a* and the rear governor pressure in line 320 is connected to the end of large bore 523 to act up on the rear governor splitter plug to urge the valve to upshift position. The relay controlled rear pump line 517 is connected by relay valve 531 to exhaust 541 thus rear pump pressure does not act on splitter valve 491. The front governor pressure in line 521 does not act on the front governor splitter plug 518, since line 521 is disconnected from front governor line 220 by land *d* of the low intermediate shift valve 523 and connected to exhaust 561. Since intermediate high shift valve 572 is in intermediate position, rear governor line 320 is blocked by land *c* and controlled rear governor pressure in line 526 which in high ratio acts down on plug 524 of the splitter valve is connected to exhaust 607.

When the rear governor pressure overcomes the throttle pressure, at about 24 miles per hour, and upshifts splitter valve 491 to provide a 3rd to 4th ratio shift, the splitter high line 170 is disconnected from exhaust 506 and connected between lands *b* and *c* to ratio change line 425. The ratio change line 425 is disconnected from splitter low line 150 which is connected between the lands *a* and *b* to the splitter low exhaust line 493. The exhaust from the splitter low brake is conducted by line 150, valve 491 and splitter low exhaust line 493 to the low exhaust valve unit 650 to control the splitter low exhaust to provide the proper degree of overlap in the same way as fully explained above for the upshift of the splitter valve unit 490 in low range. Since the three ratio unit 190 is in intermediate ratio, the engagement of the splitter high clutch of the two ratio splitter unit 115 and the disengagement of the splitter low places the transmission in 4th ratio.

In the intermediate range when the splitter valve unit 490 shifts from splitter low or third ratio to splitter high or fourth ratio, there is flow from the line 425 to fill the direct drive clutch cylinder. In the same way as explained above in low range operation, the flow through line 425 and orifice 424 causes lockup cut-off valve unit 465 to disconnect the lockup feed line 395 from the lockup clutch line 90 to disengage lockup clutch and the lockup clutch line 395 is connected to actuator line 473 to provide the actuation pressure to the exhaust feed pump 640 to supply make-up oil for the splitter low exhaust control valve 650.

The splitter valve unit 490 (FIG. 6) may be downshifted from 4th ratio by an increase in the throttle pressure in line 408 and interconnected downshift line 418 due to increasing throttle pedal position or a decrease in rear governor pressure in line 320. Due to the hysteresis effect on the unbalanced area of the splitter valve 491, after a full throttle upshift at 24 miles per hour, the downshift due to a reduction in speed will occur at about 21 miles per hour at full throttle and somewhat lower at closed throttle. The splitter valve may also be downshifted when the throttle valve unit 401 is moved to downshift position by downshift pressure in line 418 which acts on land 491*a*. This 4th to 3rd ratio shift will actuate the lockup cut-off valve unit 465 to disengage the lockup clutch 70.

When the manual valve unit 427 is moved to the intermediate range and as in 3rd ratio with lockup shift valve 446 upshifted, the intermediate line 250 is energized and oil acts downwardly on the knockdown plug 349 of the pressure control unit 341 to reduce the pressure decreasing effect of the lockup feed oil in line 395 acting on the knockdown plug 349 to reduce the main line pressure which provides main line 340 a pressure slightly higher than in other ratios during lockup. When splitter high is engaged, as in 4th ratio, the splitter high clutch line 170 acts on land *c* of pressure regulator valve 342 to reduce the pressure in main line 340 to the same extent that lockup feed pressure in line 395 reduces the pressure. When the splitter gear is in high or the lockup valve 446 upshifted or both, the same reduction in regulated pressure in main line 340 is obtained except that in 3rd ratio, where the intermediate line increases the pressure when reduced only by valve 446. When the converter is operating in 1st and 3rd ratios, there is a much higher main line pressure in line 340. These main line pressures are also increased with increasing throttle pressure in line 408 and brake pressure in line 181. The main line pressure is also increased by connecting lockup clutch line 90 to the plug 346 of the regulator valve 343 to increase line pressure during lockup clutch engagement under the control of the lockup cut-off valve 465. Then when the valve 465 disengaged the lockup clutch during shift, the main line pressure is reduced to soften the clutch action during shifting.

In the intermediate range, the vehicle is started in third ratio and upshifts due to the upshift of the splitter valve unit 490 (FIG. 6) only to fourth ratio and cannot upshift to fifth ratio since the intermediate high valve unit 570 is held in the intermediate position by the intermediate range oil in line 433 and cannot downshift to 2nd ratio.

The transmission can be manually shifted from intermediate to low range by moving manual valve 427 from INT to LO position to provide a forced downshift from fourth or third ratio to second or first ratio. As explained above in low range, the manual valve in LO, energizes the high range line 432 to supply oil to the low intermediate valve unit, the intermediate range line 433 to hold the intermediate high valve unit 570 in intermediate position and the low range line 434 to move the relay valve 531 and the low intermediate valve 533 to low position.

Low range oil from line 434 downshifts low intermediate valve 533 to disconnect ratio change line 432 from intermediate high supply line 559 which is connected by intermediate high valve unit 570 to intermediate line 250 and to connect it to low line 270 to engage the low brake of the three speed unit 190. This brake will be quickly engaged since low relief valve 558 kept the lines and motor filled with oil. The intermediate motor is exhausted by line 250 which is connected through intermediate high valve to intermediate high feed line 559 which is connected between lands $b$ and $c$ of valve 533 to controlled exhaust 561. At closed to medium throttle, the intermediate brake is thus exhausted through free line 564 and above medium throttle, the throttle pressure moves valve 565 to close free line 564 and restrict intermediate exhaust through orifice line 563 to delay release of the intermediate brake to provide more overlap on a high throttle shift. Since low line 270 is exhausted when this 3rd–2nd shift is initiated, valve 630 is closed and intermediate exhaust is restricted by orifice 636, but since orifice line 563 provides a smaller restriction than orifice 636 orifice line 563 controls high throttle downshifts and orifice 636 controls low throttle downshifts. The movement of low intermediate valve 533 to low also connects front governor line 220 to controlled front governor line 521 to act on plug 518 of the splitter valve 490 to provide 1st to 2nd ratio shifts.

The low range oil in line 434 also acts on land $c$ of relay valve 531 and moves the valve up quickly until exhaust 541 is closed and the oil which always fills chamber 543 above the valve 531 slows further movement. This first movement of valve 531 connects rear pump line 329 to controlled rear pump line 517 which acts on land $d$ of splitter valve 491 for a limited time starting with the intermediate low shift to positively position the splitter valve in splitter high position. This insures a 4th to 2nd or 3rd to 2nd shift and prevents a 4th to 1st or a 3rd to 1st shift which would be rough. The low range oil continues to urge valve 531 up and there is sufficient leakage to permit very slow movement until the valve 531 engages stop 538 and land $c$ blocks rear pump line 329 and controlled rear pump line 517 is connected to exhaust 541. Then the splitter valve 491 functions as in low range operation to automatically control shifts between 1st and 2nd ratio as explained above. At very low speeds after a 3rd to 2nd manual shift, a 2nd to 1st automatic shift would occur substantially instantaneously to provide a smooth 3rd to 2nd to 1st shift.

DRIVE RANGE

When the transmission is placed in drive range by positioning the manual valve unit 427 in D position, the transmission starts in third ratio and automatically shifts between third, fourth, fifth and sixth ratios. The controls are the same as in intermediate range, except that the intermediate range line 433 is exhausted, so the intermediate high valve unit 570 (FIG. 5) is free to upshift under the influence of rear governor and throttle pressure. The rear governor pressure in line 320 is at low speeds insufficient to lift the blocker plug 583 and intermediate high valve 572 is held in intermediate by spring 591. The vehicle thus starts in 3rd ratio and will be automatically upshifted by splitter valve unit 490 to 4th ratio as in intermediate range. Since intermediate high valve 572 is free, when the speed increases in fourth ratio to the proper value, about 33 miles per hour, valve 572 will shift the three speed unit from intermedate to high and the splitter valve 491 will downshift the two speed unit from direct to underdrive for the 4th to 5th ratio shift.

When the transmission is operating in fourth ratio in the intermediate range and the manual valve unit 427 is manually shifted to drive range, the intermediate range line 433 is disconnected from the ratio change line 425 and connected to exhaust 437 to remove the line pressure from the end of land $b$ of the intermediate high blocker plug 583 and permit the intermediate high shift valve 572 to automatically shift from the intermediate position in which it was held during intermediate range drive to the high range position under the influence governor and throttle pressure. The operation of the splitter valve unit 490 and the low intermediate valve unit 530 are not changed by the movement of the manual valve from intermediate to drive range position, so the transmission is not manually shifted, but merely conditioned for automatic shifting between 3rd and 6th ratios and not held in the intermediate range limits of 3rd and 4th ratios. When a shift to high range is made from 3rd ratio, the splitter valve unit 490 will automatically upshift at the proper speed to provide 4th ratio as explained above in the intermediate range.

The 4th to 5th ratio shift is automatically controlled by intermediate high valve unit 570 under the control of throttle and rear governor pressure. The throttle pressure in line 408 is connected to the end of bore 573 of valve unit 570 below end wall 581 and the stud 582 to act upon the face of land $a$ of valve 572 to urge it in the downshift direction toward the intermediate position illustrated in FIG. 5. The rear governor pressure in line 320 is connected to the intermediate high valve unit 570 at the port 593 to act upwardly on blocker plug 583 against spring 591 to first move the blocker plug 583 up to free valve 572 to condition the valve for a rateless intermediate high shift and is connected at the port 617 to act upwardly on the lower face of the governor plug 616 to overcome the throttle pressure acting downwardly on valve 572 for an upshift. The intermediate high shift valve 572 in upshift position disconnects the intermediate high supply line 559 from the intermediate line 250 and high clutch line 210 from exhaust 602 and connects intermediate high supply line 559 to the high clutch line 210 and the intermediate line 250 to controlled intermediate exhaust line 601.

A hysteresis or spread between the upshift and downshift points is obtained partially due to the fact that the intermediate high supply line 559 is connected between unbalanced lands $b$ and $c$ to the high clutch line 210. The controlled intermediate exhaust line 601 is connected at port 626 to the end face of the accelerator plug 624 to act upwardly to provide an upshift force or additional hysteresis effect on the intermediate high valve 572 during the short interval that the intermediate exhaust valve unit 670 retains a pressure in the intermediate exhaust line 601. This connection of line 601 to plug 621 of shift valve 572 quickly provides an accelerating force to prevent a downshift until the high ratio clutch pressure in line 210 increases when the clutch is substantially engaged and thus prevents hunting of this shift valve.

The flow of oil to engage the high clutch closes the lockup cut-off valve unit 465 to disengage the converter lockup clutch 70 as in other ratio changes. When there is flow through the high clutch line 210 to fill the high clutch cylinder 209, there is also flow through the supply lines, the intermediate high supply line 559, the drive range line 432 and the ratio change line 425. The flow in ratio change line 425 passes through the orifice 424 and lowers the pressure below the pressure in main line 340 to raise the lockup clutch cut-off valve 466 to the cut-off position and disconnect the lockup feed line 395 from the lockup clutch line 90 and connect feed line 395 to actuator line 473 which provides a pressure to actuate the exhaust feed pump 640. The valve 466 moves up quickly to sharply disengage the lockup clutch. When the high clutch is substantially engaged, the pressure is substantially equalized across the orifice 424, and the spring opens the lockup cut-off valve 466 to disconnect actuator line 473 and reconnect lockup clutch feed line 395 to lockup clutch line 90. However this movement is slow, since an orifice 481 limits flow to the upper end of the bore 467.

On the intermediate to high shift the exhaust from the intermediate line 250 will be restricted by orifice 636 since the downshift timing valve unit 630 is closed due to the lack of pressure in low line 270. Since the intermediate exhaust control valve 670 restricts the intermediate exhaust more than orifice 636, the downshift timing valve unit 630 does not affect the intermediate exhaust.

During the short interval that the lockup clutch is disengaged and pressure is supplied by the lockup cut-off valve unit 465 via actuator line 473 to activate the exhaust feed pump 640, the exhaust feed pump 640 delivers oil to the limited feed line 511 which is connected to the valve unit 570 where it is blocked in intermediate position by land $d$ and connected in the high position to the intermediate exhaust feed line 608. The intermediate exhaust valve unit 670 is similar to the low exhaust valve unit 650 and provides overlap during the intermediate high shift. The controlled intermediate exhaust line 601 is connected between the unbalanced lands $a$ and $b$ of the valve 671 (FIG. 9) and tends to urge valve up to the exhaust position to connect line 601 to exhaust 677 to reduce the pressure. The spring 674 and the throttle pressure 408 act on the end face of land 671$a$ and tend to urge the valve down to close the exhaust 677 and open the intermediate exhaust feed line 608 which for the limited period when the lockup clutch is disengaged can supply a limited volume of oil to the intermediate exhaust controlled valve unit 670 to raise or maintain a low pressure in the intermediate exhaust line 601. If, during the shift period, leakage reduces the intermediate exhaust pressure or the throttle is depressed increasing throttle pressure in line 408, the valve 671 will open to increase the exhaust pressure from the intermediate brake. As the high clutch cylinder 209 is filled, and the clutch engaged, the pressure in the high clutch line 210 will increase and act upon the lower face of the intermediate exhaust plug 681 to move the intermediate exhaust valve 671 to the exhaust position and relieve the pressure in controlled intermediate exhaust line 601 and intermediate brake cylinder.

The intermediate exhaust control valve unit 670 provides a uniform overlap during the intermediate high shift. The intermediate exhaust is initially established at an intermediate level established by a balance between intermediate exhaust acting on the unbalanced area of valve 671 and spring 674. This initial pressure level is increased with increased throttle by connected throttle pressure in line 408 to act with spring 674 on valve 671. Then as the high clutch is being engaged and the pressure in line 210 gradually increases, the valve 671 controls an inversely proportional gradual decrease in intermediate line 250. If there is insuffcient leakage in the intermediate motor, the valve 671 will provide a connection to exhaust or if there is excessive leakage the valve 671 will add oil from feed line 608 to increase or hold intermediate pressure at the proper value. In this way the release of the intermediate brake is positively controlled by the engagement of the high clutch to provide the proper overlap regardless of factors such as leakage at the motor and shift valve which vary within manufacturing tolerances.

When the intermediate high shift valve unit 570 upshifts from the intermediate to the high position, it also connects the rear governor line 320 which in the intermediate position has been blocked by the land $c$ between the lands $c$ and $d$ to the controlled rear governor line 526. The line 526 is connected to large bore 523 of the splitter valve unit 490 and acts upon the upper face of the rear governor splitter plug 522 to partially oppose the rear governor pressure from line 320 acting on the larger lower face of this plug 522. This reduces the effective area on which the rear governor pressure acts. This reduction in the governor pressure force acting on the splitter valve unit 490 when the intermediate high valve unit 570 shifts from intermediate to high position is under normal conditions where the upshift occurs with the vehicle being accelerated under substantially constant throttle sufficient to cause the splitter valve 491 to downshift from the splitter high position to the splitter low position at a slow rate controlled by the exhaust of oil from bore 523 below plug 522 through orifice 527 to line 320. As explained above, this downshift of splitter valve 491 connects the splitter high clutch line 170 to exhaust 506 and the ratio change line 425 to supply the splitter low line 150 to downshift the splitter gear unit and blocks the limited control feed line 511.

The shift from intermediate to high and the downshift of the splitter unit from direct drive to underdrive occurs substantially simultaneously and provides the shift from fourth to fifth ratios at about 33 miles per hour at full throttle. The downshift of the splitter valve 491 is delayed by the orifice 527 to prevent a 4th to 3rd to 5th shift. It will be appreciated that during the interval that the high clutch cylinder 209 and the splitter low cylinder 141 are being filled that the lockup clutch 70 will be disconnected.

When the vehicle is on a downgrade or under light load, when an automatic intermediate to high shift is made under the control of the intermediate high valve unit 570 that due to a large decrease in throttle pressure or a large increase in rear governor pressure, that the splitter valve unit 490 will not downshift, but would remain in splitter high, then a fourth ratio to sixth ratio shift would be made.

After a 4th to 5th shift, a further increase in the rear governor pressure in line 320 due to an increase in vehicle speed will upshift the splitter valve unit 490 at about 46 miles per hour. The splitter high drive in the splitter unit 115 and high in the three speed unit 190 provide 6th ratio. As pointed out above when the intermediate high valve is in high, rear governor pressure in line 320 and line 526 acts on the plug 522 to provide a net upshift force on splitter valve 491. The relay controlled rear pump line 517 and controlled front governor line 521 are exhausted. The upshift of the splitter valve supplies oil to splitter high line 170 for splitter high drive and controls splitter low exhaust in line 150 similar to the previously described upshifts which occur in low and intermediate range. The flow of oil to the high line 170 disengages the lockup cluch 70 and provides make-up oil in line 512 to control the exhaust of splitter low line 150 by the splitter low exhaust valve unit 650.

Under a very light load or a downgrade, where the operator after accelerating would close the throttle, the transmission may automatically shift from 3rd ratio to either 5th or 6th ratio depending on the vehicle operating conditions speed and throttle opening.

When the transmission is in sixth ratio, throttle pressure does not act to downshift the shift valves, the high intermediate valve unit 570 or the splitter valve unit 490 or converter lockup valve unit 445 since the high intermediate valve unit 570 and splitter valve unit 490 are upshifted and block the connections between throttle line 408 and downshift line 418. However when the vehicle speed is reduced, the rear governor pressure in line 320 is reduced to permit spring 591 to act through blocker plug 583 to downshift the intermediate high valve unit 570 first to disconnect the high clutch line 210 and to connect the intermediate line 250 to intermediate high supply line 559 to slowly engage the intermediate brake through orifice 636. At this time the rear governor pressure has not reduced sufficiently to permit spring 502 to downshift the splitter valve unit 490 so there will be no 6th to 5th downshift. Since low line 270 is exhausted on a 6th–4th ratio shift, the downshift timing valve 631 is closed blocking the free by-pass so flow to the intermediate brake passes through orifice 636 to soften the engagement on these downshifts. When the intermediate high valve unit 570 downshifts, the land c blocks rear governor line 320 and connects controlled rear governor line 526 to exhaust 607 to increase the net area on which rear governor oil in line 320 acts on plug 522 of the splitter valve 490. The downshift of the intermediate high valve unit 570 also connects throttle line 408 and downshift line 418 so that throttle oil is connected by downshift line 418 to act down on splitter valve unit 490. This increase in net area on which the rear governor pressure acts will provide a 6th to 4th ratio shift which with falling vehicle speed or a high throttle pressure is followed by a downshift of the splitter valve unit 490 to provide a 4th to 3rd ratio shift. If vehicle speed is falling very rapidly or throttle pressure is high, these shifts may occur substantially simultaneously for a 6th to 3rd shift.

In 5th ratio, throttle oil from line 408 is connected at the splitter valve unit 490 to downshift line 418 and thus acts on all shift valves. In this ratio, a downshift occurs when throttle pressure increases or rear governor pressure decreases. The intermediate high valve unit 570 first downshifts to disconnect high clutch line 210 and to connect intermediate line 250 to engage intermediate ratio of the three speed unit. This downshift also vents the controlled rear governor line 526 to increase the area of plug 522 on which rear governor oil acts in splitter valve unit 40 to tend to upshift the splitter valve 491 to connect the ratio change line 425 to direct drive clutch line 170 to engage the splitter high clutch to place the transmission in 4th ratio. As in other splitter gear upshifts the underdrive clutch exhaust is controlled by low exhaust control valve unit 650. If the vehicle speed is falling fast and is insufficient to upshift the splitter gear unit, a 5th to 3rd ratio shift will occur. In 4th ratio, throttle line 408 and downshift line 418 are connected at the intermediate high shift valve unit 570, to provide with high throttle or low speed a downshift of splitter valve unit 490 for 3rd ratio.

Since the throttle line 408 is disconnected from the shift valves in 6th ratio, the normal downshift is a forced full throttle or detent downshift. This occurs at full throttle when the throttle valve unit 401, connects maximum throttle pressure, which is preferably less than line pressure but could be equal to line pressure, between lands 411a and b to downshift line 418. When line 418 is connected to lockup valve unit 445, the lockup clutch will be disengaged and the converter will provide torque multiplication. At low vehicle speeds, the intermediate high valve unit 570 and the splitter valve unit 490 will both downshift under the influence of downshift oil in line 418 to provide a 6th to 3rd ratio downshift. At moderate vehicle speeds, the rear governor oil will exert a force on plug 522 of the splitter valve unit 490 to prevent a downshift of the splitter valve so that when downshift oil in line 418 downshifts the intermediate high valve unit 570, the transmission shifts from 6th to 4th ratio. Since the downshift of the intermediate high valve unit 570 on the 6th to 4th shift increases the net area on which rear governor pressure in line 320 acts on the splitter valve unit 490, the 6th to 4th shift is at moderate speeds followed by a 4th to 3rd shift. At high vehicle speeds, only the splitter valve unit 490 will downshift to provide a 6th to 5th downshift. At very high vehicle speeds the downshift pressure will be insufficient to provide a downshift. If the transmission is in 5th ratio, which only occurs at substantially full throttle, the oil in line 418 will downshift the intermediate high shift valve unit 570. Since the vehicle is in 5th ratio only at substantially full throttle and thus high speeds, the downshift of the intermediate high valve unit 570 will increase the area on which rear governor oil in line 320 acts on the splitter valve unit 490 and normally upshift the splitter valve 491 to provide a 5th to 4th ratio shift. However with falling speed a 5th to 3rd downshift could occur. At moderate speeds a 4th to 3rd forced downshift may be obtained. On these 6-5, 6-4, 6-3, 5-4 and 5-3 forced downshifts, the downshift timing valve unit 630 is closed since low line 270 is exhausted and intermediate oil in line 250 passes through orifice 636 to slowly apply the intermediate brake.

The transmission may be manually downshifted from high range to intermediate range which may provide a 6th to 4th or 5th to 4th or a 6th to 3rd ratio shift depending on vehicle speed. The movement of manual valve unit 427 from high range to intermediate range applies intermediate range oil in line 433 to blocker plug 583 to downshift the intermediate high valve unit 570. The downshift of valve unit exhausts high clutch line 210 at exhaust 602 and supplies oil to intermediate line 250. Since low line 270 is exhausted, downshift timing valve unit 630 is closed by the spring 635 and the intermediate oil in line 250 passes through the orifice 636 to slowly engage the intermediate brake. This shift of the intermediate high valve unit 570 also disconnects and vents controlled rear governor line 526 to increase the governor force on the splitter valve unit 490 so that an automatic 6th to 4th ratio would normally occur. However at very low vehicle speeds a 6th to 3rd ratio shift can occur. Since the transmission only stays in 5th ratio at substantially full throttle and thus fairly high speeds on manual downshift, a 5th to 4th ratio shift usually occurs, though a 5th to 3rd shift is possible at low speeds.

A manual downshift from drive range to low range is made by moving manual drive unit 427 from D to LO position to provide a 6th or 5th to 2nd or 1st ratio shift. The controls function in the same way as in the manual downshift from intermediate range to low range to establish second ratio and the normal low range control between second and first ratios. The low range oil in line 434 moves low intermediate valve 533 to supply low line 270 and disconnect supply line 559 for the intermediate and high lines 250 and 210 and moves relay valve 531 to hold splitter valve 491 in splitter high during the shift interval. If, when a drive range to low range shift is made, the transmission is in 3rd or 4th ratios and the intermediate brake engaged, the intermediate exhaust is connected by lines 250 and 559 and valve 533 to exhaust control valve 565 which provides fast exhaust and little overlap at low throttle and slow exhaust and more overlap at high throttle as in an intermediate to low range shift, but if the transmission is in 5th or 6th ratios and the high clutch engaged, the high clutch exhausts freely via line 210 and intermediate high valve unit 570 to exhaust 602 to reduce overlap to permit the engine to speed up.

REVERSE

The transmission is placed in reverse drive by positioning the manual valve 428 (FIG. 8) in reverse "R" position with the vehicle at rest.

With the engine running and the transmission in neutral the front pump 106 supplies oil to the main 340 and secondary 356 lines of the system as more fully explained above under Neutral operation. The main line 340 regulated by pressure control unit 341 supplies oil for reverse operation of the transmission via orificed line 439 to fill the reverse line 310 and reverse motor at a low pressure limited by valve 438 and via ratio change line 425 and splitter valve unit 490 to splitter low line 150 to engage splitter low ratio and via ratio change line 425, orificed line 560 and low intermediate valve unit 530 to fill the low line 270 at a low pressure limited by valve 558. The secondary line 356 is connected by the lockup shift valve unit 445 and converter inlet line 100 to supply the converter to provide converter drive.

The manual valve in reverse position connects high, intermediate and low range lines 433, 432 and 434 to exhaust 437 to disengage high, intermediate and low ratios in the three speed unit and disconnects the reverse line 310 from exhaust 436 and valve 438 and connects line 310 to ratio change line 425 to quickly engage reverse. With the reverse and splitter low brakes engaged, reverse drive is established. The reverse brake is quickly engaged because the motor was filled by orificed make-up line 439 and valve 438 which limited the pressure to a valve insufficient to engage the brake. Since low motor cylinder 303 is similarly filled with low pressure oil by orificed line 560 and valve 558, the low brake can be quickly engaged. Thus by moving the manual valve between low and reverse range, quick shifts between forward and reverse may be made to rock the vehicle for traction under adverse road conditions.

Since the rear pump 321 rotates backward in reverse, it does not supply oil to the rear pump line 329 and will not disable plug 497 and spring 502 to condition the splitter valve unit 490 for an upshift. Also, since front governor oil in line 220 is blocked by land $d$ of low intermediate valve 533 and the rear governor 309 is ineffective due to reverse rotation of shaft 185 and throttle pressure in line 408 act down on the splitter valve 491, the valve 491 cannot be upshifted and only one ratio is provided in reverse. At speeds normally encountered in reverse, the lockup valve unit 445 will not engage lockup clutch 70. Main line pressure will be increased by the pressure control unit 341 with increasing throttle pressure in line 408.

HYDRODYNAMIC BRAKE CONTROL

The brake is controlled by the valve unit 690 (FIG. 9). When the manual control mechanism is moved to apply the brake, the valve 691 moves to the left to the open position compressing spring 693. This movement of the valve 691 to the apply position, due to the tapered shoulder 706 of land $a$ gradually permits oil under pressure to flow in increasing volume from the cooler outlet line 714 and secondary line 356 to brake inlet line 180 which is connected to brake chamber 175 approximately midway between the inner and outer radii of the chamber. The outlet line 181 connects a tangential opening in the outer wall of the brake chamber 175 between land $b$ and $c$ and when the valve 691 is in the brake applied position, to cooler inlet line 703. Then the oil from the brake is cooled in cooler 711 and returned by cooler outlet line 714 to secondary line 356, which will supply any additional oil requirements from pumps 106 and 321, to valve unit 690 and brake inlet line 180.

The brake capacity is regulated by variably positioning the valve 691 or by completely opening and closing the valve to regulate the volume of oil in the brake chamber to regulate the braking effort. A vehicle employing this transmission provides down-hill hydraulic braking in all ratios but normally the transmission automatically upshifts as described above to 6th ratio in high range, to 4th ratio intermediate range, and to 2nd ratio in low range. Since the braking effort of a hydrodynamic brake increases approximately with the cube function of the speed, the brake will limit the vehicle speed to low value in low range, an intermediate value in intermediate range and a higher value in high range. Thus the operator can, after determining the vehicle load and the steepness of the grade, select the proper range to provide the braking effort required to provide a safe speed. This brake in combination with this transmission provides three ranges of hydrodynamic brake control which will enable an operator to descend grades without using the vehicle service or emergency friction brakes to provide greater safety and extend the life of the friction brakes.

Since the churn brake will absorb more torque than is delivered by the engine, the brake outlet pressure, which is proportional to the torque absorbed by the brake, is connected to regulator unit 341 to increase the line pressure for tighter engagement of the ratio clutches. The brake outlet pressure in line 181 acts down on land $a$ of valve 343 and up on plug 346 to reduce the pressure increasing effect of throttle pressure and lockup clutch line pressure as the brake pressure increases to prevent an excessive pressure rise. When the brake is applied and the transmission in splitter high, the normal operation, the higher splitter high pressure acts up on valve 343, preventing any action by the lower brake pressure on plug 347 acting up on valve 343, and the brake pressure acting down on valve 343 provides a gradually increasing line pressure with increasing brake pressure of the type shown by curve 801, (FIG. 12). When splitter high line 170 and lockup feed line 395 are exhausted so main line pressure is not reduced, the brake pressure on land $a$ would provide a steep pressure increase with increasing brake pressure of the type shown by curve 803 (FIG. 12). In order to provide a gradual increase in main line pressure similar to the above splitter high increase of the type shown by curve 802 (FIG. 12), the brake line 181 is also connected to act up on plug 347 and valve 343. When valve unit 690 shuts off the oil supply to the brake, the rotating blades 173 centrifuge the oil out of the chamber to outlet line 181, valve unit 690, and exhaust 704 to sump.

At the speeds normally encountered in hydrodynamic braking the lockup valve unit 445 engages the lockup clutch 70 so full engine braking is simultaneously available.

MODIFIED DOWNSHIFT TIMING VALVE

The downshift timing valve 630 (FIG. 6) in the control system may be modified as shown in FIG. 10. The downshift timing valve unit 725 has a valve member 726 having equal diameter lands $a$ and $b$ located in a bore 727 which is closed at both ends. Since this valve is at times free, unlike the other valves are always positioned by a spring or hydraulic forces, it is preferably positioned transversely of the vehicle so acceleration or deceleration will not move the valve. Valve unit 725 is connected to the intermediate clutch line 250 in the same way as time valve unit 630. Port 731 is connected to the portion of intermediate line 250 leading to the intermediate high shift valve unit 570 and port 732 is connected to the portion of line 250 leading to the intermediate motor. An orifice 636 connects the portions of line 250 to by-pass the valve unit 725. When the valve is open line 250 is thus freely connected through the valve to quickly apply intermediate and when the valve is closed, line 250 is connected through the orifice 636 to slowly apply intermediate. The high clutch line 210 is connected to act on land $a$ to move the valve 726 to the closed position and the low clutch line 270 is connected to act on land $b$ to move the valve 726 to the opened position.

The valve 726 is opened when the low clutch is engaged and remains opened until the high clutch is engaged and is closed when the high clutch is engaged and remains closed until low is engaged. Thus on upshift from low to intermediate ratio, in the three speed unit, the intermediate brake is quickly applied and on downshift from high to intermediate ratio the intermediate brake is slowly applied. When started in intermediate ratio valve 726 may be in either position depending on whether high or low ratio was last engaged but this is immaterial since there is no soft timing to be controlled. Though valve unit 725 may be opened or closed when the intermediate brake is exhausted it has no effect because intermediate exhaust control valve unit 670 provides a slower exhaust.

OVERDRIVE GEARING

The overdrive gearing arrangement illustrated in FIG. 11 is particularly adapted for use with diesel engines which are slower than conventional otto cycle automotive engines. The diesel engine (not shown) is connected to drive the rotary impeller housing 736 which drives the torque converter impeller 737. The impeller hydrokinetically drives the turbine 738 which is fixed on and drives the converter output shaft 739. The stator elements 741 are mounted on ground sleeve 742 and preferably have one-way brakes as shown in FIG. 1. The impeller housing 736 is also connected by a hydrauliclly actuated lockup clutch 743 to the converter output shaft 739.

The splitter gear unit 744 has an input carrier 746 driven by the converter output shaft 739. The carrier 746 has pinions 747 meshing with the reaction sun gear 748 and the output ring gear 749. The sun gear 748 is stopped to provide high or overdrive by the hydraulically actuated high brake 751. The sun gear 748 is locked to the carrier 746 by the hydraulically actuated low or direct drive clutch 752 to establish low in the splitter unit. The low clutch 752 may be replaced by a one-way clutch as shown in application Serial Number 396,272 filed December 4, 1953 by Howard W. Christenson, now Patent 3,073,179.

The output ring gear 749 of the splitter gear drives the intermediate shaft 753 which drives a three speed unit similar to the above three speed unit. The intermediate shaft 753 drives low sun 756 which meshes with pinions 757 on the output carrier 758 on output shaft 759. The pinions mesh with low reaction ring gear 761 which is stopped by low brake 762 for low ratio in this unit. The ring gear 761 is formed as a part of a carrier assembly 763. The intermediate sun gear 766 is fixed to intermediate shaft 753 and drives pinions 767 mounted on the carrier 763. In intermediate ratio the hydraulically actuated intermediate brake 768 stops the intermediate ring gear 769 so that carrier 763 rotates ring gear 761 to drive the output shaft 759 at intermediate speed. The intermediate shaft 753 is also connected by hydraulically actuated high clutch 776 which locks up the gear unit for high or direct drive. The reverse carrier 777 carries pinions 778 meshing with reverse sun gear 779 fixed to carrier 763 and reverse reaction ring gear 781 which is stopped by the hydraulically actuated reverse brake 782 to provide reverse drive. As in the underdrive transmission, the overdrive transmission (FIG. 11) having an overdrive splitter gear providing splitter low and high and a three ratio unit providing low, intermediate, high and reverse provides six forward ratios and reverse. The above-described hydraulic control system may be used to control the overdrive transmission.

The overdrive transmission has a hydrodynamic brake rotor 786 located between the fixed vanes 787 on the transmission housing. The rotor is mounted on the intermediate shaft 753 which connects the overdrive splitter gear unit and the three ratio unit and is the fastest rotating element in the drive train to provide a hydrodynamic brake of maximum capacity. The same brake and integrated transmission controls may be used with this brake and transmission.

MODIFIED THROTTLE CONTROL

When this transmission as shown in FIGS. 1 to 9 or with the modified gearing of FIG. 11 is employed with an engine having a maximum speed governor as shown in FIG. 11 to limit the engine speed to a safe value, a throttle valve unit 401′, FIG. 8a, providing three ranges of pressure, a part throttle range, a downshift range and a positive downshift range may be employed. Throttle valve unit 401′ is the same with numbers primed as the above described throttle valve unit 401 but the length of land 419a′ is reduced to provide a larger space between lands 419a′ and b′ of downshift valve 411′. The throttle valve unit 401′ provides, on movement of lever 414′ to move valve 411′, a part throttle range from O′ throttle opening to a part throttle opening P′, i.e., ⅝ to ⅞ throttle opening supplying regulated throttle pressure for line 408′, a downshift pressure range between the part throttle opening, i.e. ⅝ to ⅞ throttle to full throttle F′ supplying downshift pressure for line 418′ and an upshift inhibiting range at the full throttle detent point supplying a higher pressure in line 418′. A similar control is attained by increasing the length of valve 419 between land a and b and of the bore between ports 416 and 422 which would provide a part throttle range from zero to substantially full throttle to supply regulated throttle pressure to line 408′, a downshift range at full throttle supplying high throttle pressure to downshift line 418′, and an upshift inhibiting range with movement beyond full throttle permitted by a lost motion connection to supply a higher downshift pressure to line 418′. The throttle valve unit 401′ supplies in the part throttle range, a pressure varying from zero at closed throttle to a moderate pressure with increasing throttle, in the downshift range, a high pressure and in the upshift inhibiting range a still higher pressure.

The throttle pressure in the part throttle range and the downshift range would function in the transmission control system as fully explained above. The upshift inhibiting pressure being higher than the downshift pressure raises the upshift and the downshift points of all automatic shifts to a higher engine speed. The upshift inhibiting pressure value is selected so that it raises the upshift point of all ratios above the maximum governed engine speed and thus inhibits an upshift or holds the transmission in a lower ratio when the engine is driving the vehicle. If the transmission had automatically upshifted the upshift inhibiting pressure will provide a positive downshift since the engine speed is limited by the governor below the shift point with this range of throttle pressure. The downshift point of the automatic shifts controlled by speed and throttle pressure are also raised and occur at a higher speed in the upshift inhibiting range.

These relationships are diagrammatically illustrated in the curve in FIG. 13 of the pressure output of the transmission governor, either front or rear, plotted as a function of engine speed in r.p.m. and throttle pressure or throttle opening with the upshift and downshift points for the three ranges of throttle pressure for any ratio change.

In order to facilitate reference to the drawing, the location of parts has been indicated by terms; such as, upper, lower, right, left, etc. but it will be understood that this is not a limitation since the location of the valves is not important. The above-described preferred embodiments are illustrative of the invention, which may be practiced in several modified forms within the terms of the appended claims.

What is claimed is:

1. In a transmission for a vehicle having an engine, in combination, an input element, an output element, drive means including a first fluid device for establishing a high ratio driving connection between said input and output elements and a second fluid device for establishing a lower ratio driving connection between said input and output elements, a source of fluid under pressure, a shift valve operative in a first position to connect said first motor to exhaust and to connect said second fluid device to said source of fluid under pressure, said shift valve being operative in a second position to connect said first fluid device to said source of fluid under pressure and to connect said second fluid device to an exhaust passage, a regulating valve operative to supply fluid under pressure varying in accordance with the torque demand on the vehicle engine, an exhaust control valve controlling the flow of fluid to exhaust through said exhaust passage, means subject to the pressure of the fluid supplied by said regulating valve for urging said exhaust control valve to the closed position, and means subject to the pressure of the fluid in said exhaust passage for urging said exhaust control valve to the open position.

2. In a transmission for a vehicle having an engine, in combination, an input element, an output element, drive means including a first fluid device for establishing a high ratio driving connection between said input and output elements and a second fluid device for establishing a lower ratio driving connection between said input and output elements, a source of fluid under pressure, a shift valve operative in a first position to connect said first fluid device to exhaust and to connect said second fluid device to said source of fluid under pressure, said shift valve being operative in a second position to connect said first fluid device to said source of fluid under pressure and to connect said second fluid device to an exhaust passage, a regulating valve operative to supply fluid under pressure varying in accordance with the torque demand on the vehicle engine, and means subject to the pressure of the fluid supplied by said regulating valve for restricting said exhaust passage, and to the pressure in said first fluid device for opening said exhaust passage.

3. In a transmission for a vehicle having an engine, in combination, an input element, an output element, drive means including a first fluid device for establishing a high ratio driving connection between said input and output elements and a second fluid device for establishing a lower ratio driving connection between said input and output elements, a source of fluid under pressure, a shift valve operative in a first position to connect said first fluid device to exhaust and to connect said second fluid device to said source of fluid under pressure, said shift valve being operative in a second position to connect said first fluid device to said source of fluid under pressure and to connect said second fluid device to an exhaust passage, a regulating valve operative to supply fluid under pressure varying in accordance with the torque demand on the vehicle engine, an exhaust control valve comprising a valve element movable between a supply position in which it connects said exhaust passage to a source of fluid under pressure and a release position in which it connects said exhaust passage to exhaust, means subject to the pressure of the fluid in said exhaust passage for urging said valve element to its release position, and means subject to the pressure of the fluid supplied by said regulating valve for urging said valve element to its supply position.

4. In a transmission for a vehicle having an engine, in combination, an input element, an output element, drive means including a first fluid device for establishing a high ratio driving connection between said input and output elements and a second fluid device for establishing a lower ratio driving connection between said input and output elements, a source of fluid under pressure, a shift valve operative in a first position to connect said first motor to exhaust and to connect said second motor to said source of fluid under pressure, said shift valve being operative in a second position to connect said first fluid device to said source of fluid under pressure and to connect said second motor to an exhaust passage, a regulating valve operative to supply fluid under pressure varying in accordance with the torque demand on the vehicle engine, an exhaust control valve comprising a valve element movable between a supply position in which it connects said exhaust passage to a source of fluid under pressure and a release position in which it connects said exhaust passage to exhaust, means subject to the pressure of the fluid in said exhaust passage for urging said valve element to its release position, and means subject to the pressure of the fluid supplied by said regulating valve for urging said valve element to its supply position and means subject to the pressure of the fluid in said first fluid device for urging said valve element to its release position.

5. In a transmission for a vehicle having an engine, in combination, an input element, an output element, drive means including a first fluid device for establishing a high ratio drive and a second fluid device for establishing a lower ratio drive between said input and output shafts, a primary source of fluid under pressure, a shift valve operative in a first position to connect said first fluid device to exhaust and to connect said second fluid device to said primary source, said shift valve being operative in a second position to connect said first fluid device to said primary source and to connect said second fluid device to an exhaust passage, a regulating valve operative to supply fluid under pressure varying in accordance with the torque demand on the vehicle engine, a supplemental source of fluid under pressure, means for rendering said supplemental source of fluid under pressure effective for a limited time on movement of said shift valve from its first to its second position, an exhaust control valve comprising a valve element movable between a supply position in which said exhaust passage is connected to said supplemental source of fluid under pressure and a release position in which said exhaust passage is connected to exhaust, means subject to the pressure the fluid in said exhaust passage for urging said valve element to its release position, and means subject to the pressure of the fluid supplied by said regulating valve for urging said valve element to its supply position.

6. The invention defined in claim 5 and means subject to the pressure of the fluid in said first motor for also urging said valve element to the release position.

7. A transmission as described in claim 5 and in which the supply of fluid from said supplemental source of fluid under pressure to said exhaust control valve is controlled by said shift valve.

8. A transmission as described in claim 5 and including means to limit the volume of fluid delivered by said supplemental source of fluid under pressure to prevent continuous maintenance of pressure in said exhaust passage even though the exhaust control valve sticks.

9. In a transmission for a vehicle having an engine, in combination, an input element, an output element, drive means including a first fluid device for establishing a high ratio driving connection between said input and output elements and a second fluid device for establishing a lower ratio driving connection between said input and output elements, a source of fluid under pressure, a shift valve operative in a first position to connect said first fluid device to exhaust and to connect said second fluid device to said source, said shift valve being operative in a second position to connect said first fluid device to said source and to connect said second fluid device to an exhaust passage, means to control the pressure in said exhaust passage to obtain the proper degree of overlap during the shift responsive to an engine operating condition.

10. A transmission as described in claim 9 and said means to control the pressure in said exhaust passage also being controlled by the fluid pressure in said first fluid device when said second fluid device is connected to said exhaust passage.

11. In a transmission for a vehicle having an engine, in combination, an input element, an output element, drive means including a first fluid device for establishing a high ratio driving connection between said input and output elements and a second fluid device for establishing a lower ratio driving connection between said input and output elements, a source of fluid under pressure, a shift valve operative in a first position to connect said first fluid device to exhaust and to connect said second fluid device to said source, said shift valve being operative in a second position to connect said first fluid device to said source and to connect said second fluid device to an exhaust passage, a second source of fluid under pressure, and means to control the pressure in said exhaust passage by exhausting said passage to reduce the pressure and by adding fluid from said second source to increase the pressure to regulate the degree of overlap during the shift.

12. A transmission as described in claim 11 in which said second source includes means to limit the volume of fluid available from said second source during each shift to limit the duration of overlap control to the normal shift interval.

13. A transmission as described in claim 11 in which said second source includes means to limit the duration of the supply to the shift period.

14. In combination, an input element, an output element, drive means including a first fluid device for establishing a high ratio driving connection between said elements, a second fluid device for establishing an intermediate ratio driving connection between said elements, and a third friction device for establishing a low ratio driving connection between said elements, valve means for at times supplying fluid under pressure to said first fluid device, and concurrently connecting said second and third fluid devices to exhaust, for at other times supplying fluid under pressure to said second fluid device and concurrently connecting said first and third fluid devices to exhaust, and for still other times supplying fluid under pressure to said third fluid device, and for concurrently connecting said first and second fluid devices to exhaust, a timing valve controlling the rate of flow of fluid to said second motor, said timing valve having a valve element movable from a first position in which said valve restricts the flow of fluid to said second fluid device to a second position in which said valve permits rapid flow of fluid to said second fluid device, means responsive to the pressure of the fluid supplied to said first fluid device for moving said timing valve element to its first position and means responsive to the pressure of the fluid supplied to said third fluid device for moving said timing valve element to its second position.

15. In combination, an input element, an output element, drive means including a first fluid device for establishing a high ratio driving connection between said elements, a second fluid device for establishing an intermediate ratio driving connection between said elements and a third fluid device for establishing a low ratio driving connection between said elements, a first passage connected to said first fluid device, a second passage connected to said second fluid device, a third passage connected to said third fluid device, a source of fluid under pressure, a supply passage, a first control valve operative in a first position to connect said first passage to exhaust and to connect said second passage to said supply passage and operative in a second position to connect said first passage to said supply passage and to connect said second passage to exhaust, a second control valve operative in a first position to connect said supply passage to said source of fluid under pressure and to connect said third passage to exhaust and operative in a second position to connect said supply passage to exhaust and to connect said third passage to said source of fluid under pressure, a timing valve controlling the rate of flow of fluid through said second passage, means responsive to fluid under pressure in said first passage to condition said timing valve to restrict flow of fluid through said second passage, and means responsive to fluid under pressure in said third supply passage to condition said timing valve to permit rapid flow of fluid through said second passage.

16. In combination, an input element, an output element, drive means including a first fluid device for establishing a high ratio driving connection between said elements, a second fluid device for establishing an intermediate ratio driving connection between said elements, and a third friction device for establishing a low ratio driving connection between said elements, a first passage connected to said first motor, a second passage connected to said second motor, a third passage connected to said third motor, a source of fluid under pressure, a supply passage, a first control valve operative in a first position to connect said first passage to exhaust and to connect said second passage to said supply passage and operative in a second position to connect said first passage to said supply passage and to connect said second passage to exhaust, a second control valve operative in a first position to connect said supply passage to said source of fluid under pressure and to connnect said third passage to exhaust and operative in a second position to connect said supply passage to exhaust and to connect said third passage to said source of fluid under pressure, and timing means responsive to the opposing forces of fluid in said first and third passages for controlling the rate of flow of fluid through said second passage.

17. In combination, an input element, an output element, drive means including a first fluid device for establishing a high ratio driving connection between said elements, a second fluid device for establishing an intermediate ratio driving connection between said elements, and a third fluid device for establishing a low ratio driving connection between said elements, a first passage connected to said first fluid device, a second passage connected to said second fluid device, a third passage connected to said third fluid device, a source of fluid under pressure, a supply passage, a first control valve operative in a first position to connect said first passage to exhaust and to connect said second passage to said supply passage and operative in a second position to connect said first passage to said supply passage and to connect said second passage to exhaust, a second control valve operative in a first position to connect said supply passage to said source of fluid under pressure and to connect said third passage to exhaust and operative in a second position to connect said supply passage to exhaust and to connect said third passage to said source of fluid under pressure, restriction in said second passage, and valve means responsive to the fluid in one of said passages for controlling a by-pass extending around said restriction.

18. In combination, an input element, an output element, drive means including a first fluid device for establishing a high ratio driving connection between said elements, a second fluid device for establishing an intermediate ratio driving connection between said elements and a third fluid device for establishing a low ratio driving connection between said elements, a first passage connected to said first motor, a second passage connected to said second motor, a third passage connected to said third motor, a source of fluid under pressure, valve means for selectively connecting said first, second and third passages to said source of fluid under pressure and to exhaust the other passages, said valve means being operative to connect only one of said passages to said source at one time and to concurrently connect the other two passages to exhaust, and timing valve means responsive to the pressure of the fluid in said first and third passages for controlling the rate of flow of fluid through said second passage.

19. In a transmission for a vehicle having an engine, in combination, an input element, an output element, multi-ratio torque transmitting means including a first fluid motor operable to establish a low ratio connection between said elements, a second fluid motor operable to establish an intermediate ratio connection between said elements, a third fluid motor operable to establish a high ratio connection between said elements, a valve means to selectively control the operation of said first, second, and third motors to establish low, intermediate and high ratios having a first position to quickly establish said low ratio, a second position occurring after said first position to quickly establish said intermediate ratio, a third position to quickly establish high ratio, a fourth position occurring after said third position to slowly establish intermediate ratio.

20. The combination defined in claim 19 and control valve means to slowly disestablish intermediate ratio.

21. The combination defined in claim 19 and control valve means to control the disestablishment of intermediate ratio at one rate when high ratio is established and at another rate when low ratio is established.

22. The combination defined in claim 19 and control valve means to control the disestablishment of intermediate ratio, when engaging high ratio, responsive to an engine operating condition and the establishment of high ratio and a second control valve means to control the disestablishment of intermediate ratio, when engaging low ratio, responsive to an engine operating condition.

23. In combination, an input element, an output element, drive means including a first fluid device for establishing a high ratio drive between said elements, a second fluid device for establishing an intermediate ratio drive between said elements, and a third fluid device for establishing a low ratio drive between said elements, a first passage connected to said first fluid device, a second passage connected to said second fluid device, a third passage connected to said third device, a source of fluid under pressure, a supply passage, a shift value biased to a first position and movable therefrom to a second position, means responsive to the rate of rotation of one of said elements for moving said shift valve from its first to its second position, said shift valve being operative in said first position to connect said first passage to exhaust and to connect said second passage to said supply passage and being operative in said second position to connect said first passage to said supply passage and to connect said second passage to exhaust, and a manual valve controlling said supply and third passages and having a neutral position from which said manual valve is movable to a first and a second forward position, means operative when said manual valve is in said neutral position to connect said supply and third passage to exhaust, means operative when said manual valve is in one of said forward positions to connect said source to said supply passage and to connect said third passage to exhaust, and means operative when said manual valve is in the other of said forward positions to connect said source to said third passage and to connect said supply passage to exhaust.

24. A device as described in claim 23 and in which the manual valve has a third forward position in which said supply passage is connected to said source and said third passage is connected to exhaust and in which means is effective to hold said shift valve in its first position.

25. In combination, an input element, an output element, drive means including a first fluid device for establishing a high ratio drive between said elements, a second fluid device for establishing an intermediate ratio drive between said elements, and a third fluid device for establishing a low ratio drive between said elements, a first passage connected to said first fluid device, a second passage connected to said second fluid device, a third passage connected to said third fluid device, a source of fluid under pressure, a supply passage, a shift valve biased to a first position and movable therefrom to a second position, means responsive to the rate of rotation of one of said elements for moving said shift valve from its first to its second position, said shift valve being operative in said first position to connect said first passage to exhaust and to connect said second passage to said supply passage and being operative in said second position to connect said first passage to said supply passage and to connect said second passage to exhaust, a control valve biased to a first position and movable therefrom to a second position, a control chamber, means operative on the supply of fluid to said control chamber to move said control valve from its first to its second position, a control passage, said control valve in said first position connecting said control passage to said supply passage and to connect said third passage to exhaust and in said second position connecting said supply passage to exhaust and to connect said third passage to said control passage, and a manual valve having a neutral position from which said manual valve is movable to a first and a second forward positions, and said manual valve in said neutral position connecting said control passage and said control chamber to exhaust, in one of said forward positions connecting said control passage to said source and to connect said control chamber to exhaust, and in the other of said forward posiitons connecting said control passage and said control chamber to said source.

26. In a vehicle transmission, in combination, an input element, an intermediate element, an output element, front gear means having a slow and fast drive connecting said input and intermediate elements including a first motor operated by fluid to engage said slow drive and a second motor operated by fluid to engage said fast drive, a rear gear means having a low and high drive connecting said intermediate and output elements, including a third motor operated by fluid to engage said low drive device, a fourth motor operated by fluid to engage said high drive, a source of fluid under pressure, a first and a second shift valve each having a downshift and an upshift position, said first shift valve selectively connecting said source in downshift position to said first motor and in upshift position to said second motor, said second shift valve selectively connecting said source in downshift position to said third motor and in upshift position to said fourth motor, governor means supplying governor fluid at a pressure varying in accordance with the speed of said elements, means subject to said governor pressure for moving said first shift valve from its downshift to its upshift position, means subject to said governor pressure for moving said second shift valve from its downshift to its upshift position, a governor chamber, means operative only when said second shift valve is in its upshift position for supplying governor pressure to said governor chamber, and means responsive to the pressure of the fluid in said governor chamber for opposing movement of said first shift valve to its upshift position.

27. In a vehicle transmission, in combination, an input element, an intermediate element, an output element, front gear means having a slow and a fast drive connecting said input and intermediate elements, including a first motor operated by fluid to engage said slow drive and a second motor operated by fluid to engage said fast drive, rear gear means having a low and a high drive connecting said intermediate and output elements, including a third motor operated by fluid to engage said low drive and a fourth motor operated by fluid to engage said high drive, a source of fluid under pressure, said first and second shift valves each having a downshift and an upshift position, first shift valve selectively connecting said source in downshift position to said first motor and in upshift position to said second motor, said second shift valve selectively connecting said source in downshift position to said third motor and in upshift position to said fourth motor, a first governor supplying a first governor fluid at a pressure varying in accordance with the speed of said output element, a second governor supplying a second governor fluid at a pressure varying in accordance with the speed of said intermediate element, means subject to said first governor pressure for moving said first shift valve from its downshift to its upshift position, means subject to said first governor pressure for moving said second shift valve from its downshift to its upshift position, and means subject to said second governor pressure for moving said second shift value from its downshift to its upshift position.

28. In a vehicle transmission, in combination, an input element, an intermediate element, an output element, front gear means having a slow and a fast drive connecting said input and intermediate elements, including a first motor operated by fluid to engage said slow drive and a second motor operated by fluid to engage said fast drive, rear gear means having a low, intermediate and a high drive connecting said intermediate and output elements, including a third motor operated by fluid to engage said low drive, a fourth motor operated by fluid to engage said intermediate drive, and a fifth motor operated by fluid to engage said high drive, a source of fluid under pressure, a first shift valve selectively connecting said source to said first or second motors, a supply passage, a second shift valve for selectively connecting to said supply passage said fourth or fifth motors, and manually controlled means for selectively connecting said source to said supply passage or to said third motor.

29. In a vehicle transmission, in combination, an input element, an intermediate element, an output element, front gear means having a slow and a fast drive connecting said input and intermediate element including a first motor operated by fluid to engage said slow drive and a second motor operated by fluid to engage said fast drive, rear gear means having a low, intermediate and high drive connecting said intermediate and output elements, including a third motor operated by fluid to engage said low drive, a fourth motor operated by fluid to engage said intermediate drive, and a fifth motor operated by fluid to engage said high drive, a source of fluid under pressure, a first shift valve movable between an upshift and a downshift position for selectively connecting said source in downshift position to said first motor and in upshift position to said second motor, a supply passage, a second shift valve movable between an upshift and a downshift position for selectively connecting in downshift position said fourth motor and in upshift position said fifth motor to said source, a governor supplying governor fluid at a pressure varying in accordance with the speed of said output shaft, means subject to said governor fluid for moving said first shift valve from said downshift to said upshift position, means subject to said governor fluid for moving said second shift valve from said downshift to an upshift position, manually controlled means for selectively connecting said source to said supply passage and to said third servo, a control chamber, means controlled by said second shift valve for supplying governor fluid to said control chamber, and means responsive to the pressure of the fluid in said control chamber for opposing movement of said first shift valve from its downshift to its upshift position.

30. In a vehicle transmission, in combination, an input element, an intermediate element, an output element, front gear means having a slow and a fast drive connecting said input and intermediate element, including a first motor operated by fluid to engage said slow drive and a second motor operated by fluid to engage said fast drive, rear gear means having a low, intermediate and high drive connecting said intermediate and output elements, including a third motor operated by fluid to engage said low drive, a fourth motor operated by fluid to engage said intermediate drive, a fifth motor operated by fluid to engage said high drive, a source of fluid under pressure, a first shift valve movable between an upshift and a downshift position for selectively connecting said source in downshift position to said first motor and in upshift position to said second motor, a supply passage, a second shift valve movable between an upshift and a downshift position for selectively connecting said supply passage in downshift position to said fourth motor and in upshift position to said fifth motor, a first governor supplying a first governor fluid at a pressure varying in accordance with the speed of said output shaft, a second governor supplying a second governor fluid at a pressure varying in accordance with the speed of said output element, means subject to said first governor fluid for moving said first shift valve from said downshift to said upshift position, means subject to said second governor fluid for moving said second shift valve from said downshift to said upshift position, a manually controlled valve having a neutral position from which said valve is movable to a first or a second forward position, means effective when said manual valve is in its neutral position to connect said third motor and said supply passage to exhaust, means effective when said manual valve is in one of its forward positions to connect said the other of its forward positions to connect said supply passage, means effective when said manual valve is in the other of its forward position to connect said supply passage to exhaust and said source to said third motor, a control chamber, means operative on movement of said manual valve to said other forward position to temporarily supply second governor fluid to said control chamber, and means responsive to the pressure of fluid in said control chamber for urging said first shift valve to its upshift position.

31. In combination, an input element, an intermediate element, an output element, first gear means including a first fluid motor providing a fast ratio connection and a second fluid motor providing a slow ratio connection between said input and intermediate elements, second gear means having a third fluid motor providing a fast ratio connection and a fourth fluid motor providing a slow ratio connection between said intermediate and output shafts, the ratio change in said second gear means being greater than that in the first planet unit, shift valve means governed in accordance with the rate of rotation of one of said elements, said shift valve means being biased to a downshift position and movable therefrom to an upshift position and in said downshift position engaging said first motor and in said upshift position engaging said second motor, manually controlled valve means having a neutral position and being movable therefrom to a first or a second forward position, said manual valve means in its neutral position disengaging said third and fourth motors in one of its forward positions engaging said third motor and releasing said fourth motor, said manual valve means in said other forward position engaging said fourth motor and releasing said third motor, and means operative on movement of said manual valve means to said other forward position to momentarily urge said shift valve means to its upshift position.

32. In a transmission for a vehicle having an engine, in combination, an input element, an output element, means providing a fast drive and a slow drive between said elements, including a first motor operated by fluid to engage said fast drive, and a second motor operated by fluid to engage said slow drive, a source of fluid under pressure, a discharge passage, shift valve means having a first position and movable therefrom to a second position, means for moving said shift valve means, said shift valve means in said first position connecting said second motor to said source and connecting said first motor to exhaust and in said second position connecting said second motor to said discharge passage and connecting said first motor to said source, means governed in accordance with the torque demand on said vehicle engine for regulating release of fluid from said discharge passage, a control chamber, means for supplying fluid from said discharge passage to said control chamber, and means responsive to the pressure of the fluid in said control chamber for moving said shift valve means from its first to its second position.

33. In a transmission for a vehicle having an engine, in combination, an input element, an output element, means including a fluid device for establishing a driving connection between said elements, a source of fluid under pressure, a discharge passage, shift valve means having a first position and movable therefrom to a second position, means for moving said shift valve means, said shift valve means in said first position connecting said fluid device to said source and in said second position connecting said fluid device to said discharge passage, control valve means governed in accordance with the torque demand on said vehicle engine for controlling the rate of release of fluid from said discharge passage, a control chamber, means for supplying fluid from said discharge passage to said control chamber, and means responsive to the pressure of the fluid in said control chamber for moving said shift valve means from its first to its second position.

34. In a transmission for a vehicle having an engine, in combination, an input element, an output element, means including a fluid device for establishing driving connection between said shafts, a source of fluid under pressure, a discharge passage, shift valve means having a first position and movable therefrom to a second position, means for moving said shift valve, said shift valve

53 means in said first position connecting said fluid device to said source and in said second position connecting said fluid device to said discharge passage, means for retarding the rate of release of fluid from said discharge passage, a control chamber, means for supplying fluid from said discharge passage to said control chamber, and means responsive to the pressure of the fluid in said control chamber for moving said shift valve means from its first to its second position.

35. In a transmission for a vehicle having an engine, in combination, an input element, an output element, means including a first and second fluid device for establishing a first and second driving connection between said elements, a source of fluid under pressure, a discharge passage, an exhaust, a shift valve biased to a first position and movable therefrom to a second position, means for moving said shift valve from its first to its second position, said shift valve in said first position connecting said first fluid device to said source and said second fluid device to said exhaust and in said second position connecting said first fluid device to said discharge passage and said second fluid device to said source, means to restrict the rate of release of fluid from said discharge passage, a first control chamber, means for supplying fluid from said discharge passage to said first control chamber, a second control chamber, means connecting said second fluid device to said second chamber, and means responsive to the pressure of the fluid in said first and second control chamber for moving said shift valve from its first to its second position.

36. In a transmission for a vehicle having an engine, in combination, an input element, an output element, means including a fluid device for establishing driving connection between said elements, a source of fluid under pressure, a discharge passage, a shift valve biased to a first position and movable therefrom to a second position, means for moving said shift valve from its first to its second position, said shift valve being effective in its first position to actuate said motor to engage said friction device and being effective in its second position to actuate said motor to disengage said friction device, means to retard the disengagement of said friction device, and means controlled by said last named means to move said shift valve from its first to its second position.

37. The invention defined in claim 36 and said means to retard the disengagement of said friction device being controlled in accordance with the torque demand on the vehicle engine.

38. In combination, a transmission having fluid means to establish a drive ratio, a source of fluid under pressure, an exhaust passage, valve means to connect said fluid means to said source or to said exhaust passage, a supply of make-up fluid, means to limit the volume and duration of said supply, and exhaust control valve means controlling said exhaust passage to permit exhaust, and to connect said supply to increase the pressure in said exhaust passage.

39. In combination, a multiratio transmission having fluid means to establish three ratios, control means to actuate said fluid means to establish each of said ratios, and timing means controlling the actuation time of said fluid means to provide a fast establishment of one of said ratios after a second ratio has been established and a slow establishment of said one of said ratios after a third ratio has been established.

40. In combination with an engine having a throttle, a multiratio transmission having fluid means to establish three ratios, control means to actuate said fluid means to selectively establish each of said ratios, throttle means responsive to a certain position of the engine throttle providing a throttle control, and timing means controlling the actuation time of said fluid means to normally provide a slow establishment of one of said ratios and to provide a fast establishment of said one of said ratios when said throttle control is provided after a second ratio has been established.

54

41. In combination, a multiratio transmission having a rotating element and a first and second fluid means to establish a first and second ratio, a source of fluid under pressure, shift valve means to connect said source in a first position to said first fluid means, and in a second position to said second fluid means, a spring to normally hold said valve in said first position, governor means responsive to the speed of said transmission element connected to disable said spring at one speed to provide a rateless shift valve means, means to control said shift valve for a shift from said first to said second position including said governor means to shift said shift valve means at a speed higher than said one speed.

42. In a multiratio transmission, an input element, an output element, a multiratio drive connecting said input and output elements including a first multiratio unit including first and second motors operated by fluid to respectively establish low and high ratios and a second multiratio unit including third and fourth motors operable by fluid to respectively establish low range and high range ratios, a fluid supply, a governor responsive to the speed of one of said shafts, a first shift valve means biased to a downshift position and urged by said governor to an upshift position, said first shift valve being effective in said downshift position to connect said fluid supply to said first motor and in said upshift position to connect said fluid supply to said second motor, second shift valve means movable between a downshift position connecting said fluid supply to said third motor and an upshift position connecting said fluid supply to said fourth motor, said second shift valve in said downshift position controlling the action of said governor on said first shift valve to provide an upshift in low range from first to second ratio, said second shift valve during movement from said downshift to said upshift position inhibiting downshift of said first shift valve for a short interval, said second shift valve in said upshift position modifying the governor action on said first shift valve to provide a downshift when said second shift valve is upshifted to high range to provide third ratio and on further increase of speed to provide an upshift of said first shift valve for fourth ratio, and said second shift valve on movement from said upshift to said downshift position inhibiting downshift of said first shift valve for an interval.

43. The invention defined in claim 42, said second shift valve on movement from said upshift to said downshift position inhibiting downshift of said first shift valve for a longer interval than on movement from said downshift to said upshift position.

44. The invention defined in claim 42, a second governor providing a stronger force at lower shaft speeds, said second shift valve connecting said second governor to inhibit movement of said first shift valve during movement of said shift valve between said downshift and said upshift positions.

45. In combination, a multiratio transmission having a first unit having fluid means to establish a slow and a fast drive and a second unit having fluid means to establish a low and a high drive to provide four ratios, a source of fluid under pressure, first shift valve means having a downshift position establishing said slow drive and upshift position establishing said fast drive, second shift valve means having a downshift position establishing said low drive and an upshift position establishing said high drive, automatic means to control said first shift valve means at a first and a second shift point, and means responsive to said second shift valve means in downshift position to control said first shift valve at said first point and in upshift position at said second shift point.

46. In combination, a multiratio transmission having a first unit having fluid means to establish a slow and a fast drive and a second unit having fluid means to establish a low and a high drive to provide four ratios, a source of fluid under pressure, first shift valve means having a downshift position establishing said slow drive and an upshift position establishing said fast drive, first control means to control the position of said first shift valve means, second shift valve means having a downshift position establishing said low drive and an upshift position establishing said high drive, second control means to control the position of said second shift valve and overcontrol means to render said first control means ineffective and to control the position of said first shift valve means during the period when said second shift valve is being shifted and to terminate said control substantially when said second shift valve has completed the shift.

47. In combination, a multiratio transmission having a first unit having fluid means to establish a slow and a fast drive and a second unit having fluid means to establish a low, intermediate and a high drive and each of said low, intermediate and high drives being operative in combination with each of said slow and fast drives to provide six ratios, a source of fluid under pressure, first shift valve means having a downshift position establishing said slow drive and upshift position establishing said fast drive, second shift valve means having a downshift position establishing said low drive and an upshift position establishing said intermediate drive, and a third shift valve means having a downshift position establishing said intermediate drive and an upshift position establishing said high drive.

48. The invention defined in claim 47 and means controlled by said second and third shift valves to provide said first shift valve with a first shift point while said second unit is in low drive to provide first and second ratios, a second shift point while said second unit is in intermediate drive to provide third and fourth ratios, and a third shift point while said second unit is in high drive to provide fifth and sixth ratios.

49. In combination, a multiratio transmission having a first and second fluid means to establish a forward and a reverse ratio, a source of fluid under pressure, control valve means including a first and second discharge passage and selectively connecting said source to said first fluid means and said second fluid means to said second discharge passage and connecting said source to said second fluid means and said first fluid means to said first discharge passage, restricted passage means to connect said source to said first and second fluid means to provide make-up fluid to replace leakage, and low pressure relief valve means in said first and second discharge passages to maintain low pressure fluid in the first and second fluid means when connected by said control valve means to fill the connected fluid means but insufficient to actuate said connected fluid means.

50. In combination, a multiratio transmission having a first and second fluid means to establish a first and a second ratio, a source of fluid under pressure, control valve means including a first and second discharge passage and selectively connecting said source to said first fluid means and said second fluid means to said second discharge passage and connecting said source to said second fluid means and said first fluid means to said first discharge passage, restricted passage means to connect said source to said first and second fluid means to provide make-up fluid to replace leakage, and low pressure relief valve means in said first and second discharge passages to maintain low pressure fluid in the first and second fluid means when connected by said control valve means to fill the connected fluid means but insufficient to actuate said connected fluid means.

51. In combination, a transmission having fluid means to establish a ratio, a source of fluid high pressure, control valve means including a discharge passage, said control means operatively connecting said source to said fluid means and disconnecting said fluid means from said discharge passage in a first position said fluid means to said discharge passage and disconnecting said source from said fluid means in a second position, restricted passage means to connect said source to said fluid means to provide make-up fluid to replace leakage, and low pressure relief valve means in said discharge passage to maintain low pressure fluid in said fluid means when connected by said control valve means to said discharge passage to fill said fluid means but at said low pressure insufficient to actuate said fluid means.

52. In combination, an engine having a maximum speed governor and a throttle control movable in a first, second and third throttle range, a multiratio transmission driven by said engine and having fluid means to establish a low and a high ratio drive, a source of fluid under pressure, shift valve means connecting said source to said fluid motor means in one position to establish low drive and in another position to establish high drive, a transmission governor providing a governor pressure varying with transmission output related speed, throttle valve means providing a low variable throttle pressure in said first range, an intermediate throttle pressure in said second range and a high throttle pressure in said third range, means to control said shift valve means in response to said governor pressure and said throttle pressure to provide an upshift or a downshift in said first throttle range over a low range of transmission speeds, in said second throttle range, at a higher transmission speed and in said third throttle range at a still higher speed, and said upshift speed in said third throttle range being above the maximum engine speed to inhibit an upshift.

53. In combination, an engine having a maximum speed governor and a throttle control movable in a first, second and third throttle range, a multiratio transmission driven by said engine and having fluid means to establish a low and a high ratio drive, a source of fluid under pressure, shift valve means connecting said source to said fluid motor means in one position to establish low drive and in another position to establish high drive, a transmission governor responsive to transmission output related speed, means to control said shift valve means in response to said transmission governor and said throttle control to provide an upshift or a downshift in said first throttle range over a low range of transmission speeds, in said second throttle range, at a higher transmission speed and in said third throttle range at a still higher speed, and said upshift speed in said third throttle range being above the maximum engine speed to inhibit an upshift.

54. In combination, an engine having a maximum speed governor and a throttle control movable in a first and second throttle range, a multiratio transmission driven by said engine and having fluid means to establish a low and a high ratio drive, a source of fluid under pressure, shift valve means connecting said source to said fluid motor means in one position to establish low drive and in another position to establish high drive, a transmission governor responsive to transmission output related speed, means to control said shift valve means in response to said transmission governor and said throttle control to provide an upshift or a downshift in said first throttle range over a low range of transmission speeds, and in said second throttle range at a still higher speed, and said upshift speed in said second throttle range being above the maximum engine speed to inhibit an upshift.

55. In combination, an engine having a maximum speed governor and a throttle control movable from a minimum to a maximum position, a multiratio transmission driven by said engine and having fluid means to establish a low and a high ratio drive, a source of fluid under pressure, shift valve means connecting said source to said fluid motor means in one position to establish low drive and in another position to establish high drive, a transmission governor responsive to transmission output related speed, means to control said shift valve means in response to said transmission governor and said throttle control to provide an upshift or a downshift in said first throttle range over a range of transmission speeds, and said upshift speed at said maximum position being above the maximum engine speed to inhibit an upshift.

56. In combination, an engine having a maximum speed governor and a movable throttle control, a multiratio transmission driven by said engine and having fluid means to establish a low and a high ratio drive, a source of fluid under pressure, shift valve means connecting said source to said fluid motor means in one position to establish low drive and in another position to establish high drive, a transmission governor responsive to transmission output related speed, means to control said shift valve means in response to said transmission governor to provide an upshift or a downshift, and said upshift speed under control of said throttle control being above the maximum engine speed to inhibit an upshift.

57. In a transmission for a vehicle having an engine, in combination, an input element, an output element, multiratio torque transmitting means including a first fluid motor operable to establish a low ratio connection between said elements, a second fluid motor operable to establish an intermediate ratio connection between said elements, a third fluid motor operable to establish a high ratio connection between said elements, and valve means to selectively operate said first, second and third motors to establish low, intermediate and high ratios having a first position to quickly establish said low ratio, a second position to establish said intermediate ratio and a third position to establish said high ratio and including means to establish said intermediate ratio quickly on movement from said first to said second positions and to slowly establish said intermediate ratio on movement from said third to said second position.

58. In combination, an input element, an intermediate element, and output element, a hydraulic torque converter having an input member driven by said input element and an output member driving said intermediate element, lockup clutch means including a fluid motor effective when engaged to connect said input element to said intermediate element, means including a fluid device for establishing driving connection between said intermediate and output elements, a source of fluid under pressure, a regulator valve controlling release of fluid from said source to regulate the pressure of said source, said regulator valve having a valve element movable between a closed and an open position, biasing means yieldingly urging said valve element to the closed position, means responsive to the pressure of the fluid in said source for moving said valve element to the open position, control means including a control chamber, said control means being operatively connected to said valve element and operative on the supply of fluid under pressure to said control chamber to urge said valve element to the open position, first valve means for supplying fluid from said source to said fluid device, a cut-off valve normally operative in a first position and movable from said first position to a second position, said first valve means being operative when supplying fluid to said fluid device to move said cut-off valve from said first to said second position, second valve means for supplying fluid from said source to said cut-off valve and to said control chamber, said cut-off valve being connected to said motor, and said cut-off valve in said first position connecting said second valve means to said motor and in said second position connecting said motor to exhaust.

59. The invention defined in claim 58 and said regulator valve having additional means to vary the regulated pressure, and said cut-off valve being connected in said first position to supply fluid to said motor and to actuate said additional means to vary the regulated pressure.

60. The invention refined in claim 58 and said regulator valve having additional means to increase the regulated pressure, and said cut-off valve being connected in said first position to supply fluid to said motor and to actuate said additional means to vary the regulated pressure.

61. In combination, an input element, an intermediate element, and output element, a hydraulic torque converter having an input member driven by said input element and an output member driving said intermediate element, lockup clutch means including a fluid motor effective when engaged to connect said input element to said intermediate element, means including a fluid device for establishing driving connection between said intermediate and output elements, a source of fluid under pressure, a regulator valve controlling release of fluid from said source to regulate the pressure of said source, said regulator valve having a valve element movable between a closed and an open position, biasing means yieldingly urging said valve element to the closed position, means responsive to the pressure of the fluid in said source for moving said valve element to the open position, said regulator valve having a first control means to increase the regulated pressure and a second control means to reduce the regulated pressure, first valve means for supplying fluid from said source to said fluid device, a cut-off valve normally operative in a first position and movable from said first position to a second position, said first valve means being operative when supplying fluid to said fluid device to move said cut-off valve from said first to said second position, second valve means having a first and second position, said second valve means and said cut-off valve connected in series to supply fluid from said source to said motor in said first position and to vent said motor when either valve is in said second position, and said second valve means being operative in one position to actuate one of said first and second control means and said cut-off valve being operative in one position to actuate said other control means.

62. In combination, an input element, an output element, a hydraulic torque converter having an input member driven by said input element and an output member, lockup clutch means including a fluid motor effective when engaged to connect said input element to said output element, means including a fluid device for establishing driving connection between said output member and output elements, a source of fluid under pressure, a regulator valve controlling release of fluid from said source to regulate the pressure of said source, said regulator valve having a valve element movable between a closed and an open position, biasing means yieldingly urging said valve element to the closed position, means responsive to the pressure of the fluid in said source for moving said valve element to the open position, control means operatively connected to said valve element operative on the supply of fluid under pressure to said control means to urge said valve element to the open position, first valve means for supplying fluid from said source to said fluid device, a cut-off valve normally operative in a first position and movable from said first position to a second position, said first valve means being operative when supplying fluid to said fluid device to move said cut-off valve from said first to said second position, second valve means for supplying fluid from said source to said cut-off valve and to said control chamber, said cut-off valve being connected to said motor, and said cut-off valve in said first position connecting said second valve means to said motor and in said second position connecting said motor to exhaust.

63. The invention defined in claim 62 and said regulator valve having additional means to vary the regulated pressure, and said cut-off valve being connected in said first position to supply fluid to said motor and to actuate said additional means to vary the regulated pressure.

64. In combination, an input element, an output element, a hydraulic torque converter having an input member driven by said input element and an output member, lockup clutch means including a fluid motor effective when engaged to connect said input element to said output element, means including a fluid device for establishing driving connection between said output member and output elements, a source of fluid under pressure, a regulator valve controlling release of fluid from said source to regulate the pressure of said source, said regulator valve having a valve element movable between a closed and an open position, biasing means yieldingly urging said valve element to the closed position, means responsive to the pressure of the fluid in said source for moving said valve element to the open position, said regulator valve having a first control means to increase the regulated pressure and a second control means to reduce the regulated pressure, first valve means for supplying fluid from said source to said fluid device, a cut-off valve normally operative in a first position and movable from said first position to a second position, said first valve means being operative when supplying fluid to said fluid device to move said cut-off valve from said first to said second position, second valve means having a first and second position, said second valve means and said cut-off valve connected in series to supply fluid from said source to said motor in said first position and to vent said motor when either valve is in said second position, and said second valve means being operative in one position to actuate one of said first and second control means and said cut-off valve being operative in one position to actuate said other control means.

65. In a transmission mechanism, the combination of a drive shaft, a driven shaft, a first power transmitting gearing driven by said drive shaft providing a plurality of drive ratios therethrough, a second power transmitting gearing connected to be driven by said first gearing and to drive said driven shaft and providing low and high drive ratios therethrough, means for automatically changing the drive through said first gearing between various drive ratios thereof, said last-named means including a governor driven by said driven shaft and providing an output pressure that varies with changes in driven shaft speed, means for connecting said governor output pressure with said drive changing means for said high speed ratio drive in said second gearing, means for providing a governor varied pressure that is increased with respect to said first-named governor output pressure, and means for connecting said increased governor pressure with said drive changing means for the low drive ratio through said second gearing.

66. In a transmission mechanism, the combination of a drive shaft, a driven shaft, a first power transmitting gearing driven by said drive shaft providing a plurality of drive ratios therethrough, a second power transmitting gearing connected to be driven by said first gearing and adapted to drive said driven shaft and providing a plurality of different drive ratios therethrough, first control means for automatically upshifting said first gearing from lower to higher speed ratios, and second control means for automatically upshifting said second gearing from lower to higher speed ratios, said two last-named control means including a governor driven by a rotatable part of the transmission mechanism tending to cause the upshifting in both of said gearings as the speed of said rotatable part increases, said last named means also including a device for limiting the effectiveness of said governor so that said second control means operates to upshift said second gearing after said first control means has shifted said first gearing to its highest speed ratio.

67. In a transmission mechanism for an automotive vehicle having a throttle controlled driving engine, the combination of an accelerator for the driving engine, a drive shaft, a driven shaft, a first power transmitting gearing driven by said drive shaft providing a plurality of drive ratios therethrough, a second power transmitting gearing connected to be driven by said first gearing and to drive said driven shaft and providing relative low and high drive ratios therethrough, means for automatically upshifting and downshifting said first gearing between relatively low and relatively high speed ratios, means for automatically upshifting and downshifting said second gearing between its said low and high speed ratios, said automatic means each including a shift valve for changes between consecutive speed ratios, a hydraulic governor driven by said driven shaft and providing a fluid pressure effective on said shift valves tending to move them in an upshifting direction and means under the control of said accelerator for providing a fluid throttle pressure that increases with engine throttle opening effective on said valves tending to move them in the opposite direction, said automatic means being so constructed and arranged that said first-named automatic means is operative to complete its upshifting action and said second automatic means is subsequently effective to upshift said second-named gearing, the shift valve in said first-named automatic means which is effective for completing a low speed ratio through said first gearing when the valve is in its downshifted position having a land for blocking said throttle pressure from said shift valve for said second gearing when the valve for said first gearing is in its upshifted position so that said shift valve for said second gearing functions to be moved by said throttle pressure in a downshifting direction only after said first automatic means downshifts said first gearing to its low speed ratio.

68. In a transmission mechanism for an automotive vehicle having a driving engine with a throttle, the combination of an accelerator for controlling the engine throttle, a drive shaft, a driven shaft, a first power transmitting gearing driven by said drive shaft providing a plurality of drive ratios therethrough, a second power transmitting gearing connected to be driven by said first gearing and to drive said driven shaft and providing realtively low and high drive ratios therethrough, means for automatically upshifting said first gearing from a relatively low speed ratio to a relatively high speed ratio, means for subsequently automatically upshifting said second gearing, means under the control of said accelerator for downshifting said first and second gearings from their respective high speed ratios to their low speed ratios and an interlock mechanism for rendering said accelerator control means ineffective on said first-named automatic means for said first gearing until after said second gearing has been downshifted under the control of said accelerator.

69. In a transmission for an automotive vehicle having a driving engine with a throttle, the combination of an accelerator for controlling the engine throttle, a drive shaft, a driver shaft, a first power transmitting gearing driven by said drive shaft providing a plurality of drive shaft, a driven shaft, a first power transmitting gearing connected to be driven by said first gearing and to drive said driven shaft and providing a plurality of different drive ratios therethrough, means for automatically upshifting said first gearing between relatively low and high speed ratios, means for automatically upshifting the drive through said second gearing between relatively low and high speed ratios thereof, each of said two last-named means including a shift valve movable between upshifted and downshifted positions, a hydraulic governor driven by said driven shaft for applying fluid pressure to said valves tending to move them from their downshifted to their upshifted positions as the speed of said driven shaft increases and valve means under the control of said accelerator for supplying fluid pressure to said first-named valves tending to move them from their upshifted positions to their downshifted positions, and interlock means under the control of said shift valve for said second gearing for blocking application of fluid pressure under the control of said accelerator to said shift valve for said first gearing until said shift valve for said second gearing is in its downshifted position.

70. In a transmission mechanism, the combination of a drive shaft, a driven shaft, a power transmitting gearing providing a plurality of forward drive ratios and a reverse drive between said drive and driven shafts, means for automatically upshifting said gearing from a relatively low forward ratio to a relatively high forward ratio, said means including a hydraulic governor driven by a rotatable part of the transmission mechanism and providing a governor pressure that increases with the speed of said rotatable part to cause an upshift with such increase in governor pressure, a selector valve for conditioning said gearing for its forward or reverse drives, and another selector valve under the control of said first-named selector valve for effectively disconnecting said governor with respect to said automatic means when said first-named selector valve is moved into its reverse drive position.

71. In transmission mechanism for an automotive vehicle, the combination of a drive shaft, a driven shaft, means for providing a high speed power train between said shafts, a control element for causing changes between said power trains and having a low speed drive position and a high speed drive position, a hydraulic governor driven from said driven shaft and providing a governor fluid pressure that increases with driven shaft speed and effective on said control element tending to hold the control element from movement from its high speed position to its low speed position, an accelerator for the vehicle, an additional manual control, said control element having large and small lands, a fluid pressure source providing an operating pressure of a predetermined value, valve means under the control of said accelerator for connecting said pressure source and said small land and applying said predetermined operating pressure on said small land when the accelerator is moved to an open throttle position tending to move the control element from its high speed position to its low speed position against the action of said governor pressure, and valve means under the control of said additional manual control for connecting said pressure source and said large land and applying said predetermined operating pressure on said large land tending to move said control element from its high speed position to its low speed position against said governor pressure and causing such movement due to said large land at a higher speed of said driven shaft as compared to the speed at which said small land is effective to move said control element to its low speed position.

72. In a transmission mechanism for an automotive vehicle, the combination of a drive shaft; a driven shaft; means for providing a power train between said shafts and including a friction engaging device for completing the power train; a fluid pressure operated motor for engaging the friction device; a source of fluid pressure; an accelerator controlling a throttle for the vehicle; first valve means under the control of said accelerator for providing a throttle pressure that increases with throttle opening; second valve means having two operative positions and effectively disposed between said motor and said pressure source, in a first position restricting the flow of fluid between said source and said motor, and in a second position providing a substantially unrestricted flow of fluid; a spring acting on said valve means and tending to hold said valve means in its first position; and means for applying throttle pressure to said second valve means for tending to move said valve means in opposition to said spring from its first position when the accelerator is in a closed throttle position to its second position when the accelerator is in an open throttle position.

73. In transmission mechanism, the combination of a drive shaft, an intermediate shaft, a friction clutch for connecting said shafts, fluid pressure actuated means for operating said clutch, a driven shaft, a transmission providing a plurality of different drives connecting said intermediate and driven shaft, a control element for changing the drives through said transmission, a source of fluid under pressure, means under the control of said control element for effectively changing a connection between said source of fluid and said fluid pressure actuated means for disengaging said clutch when said control element is moves in a direction to change the drive through the transmission, and means under the control of said control element for maintaining the fluid from said source at a predetermined high pressure prior to movement of said control element and for changing the said fluid pressure from said source to a predetermined low pressure when said control element is moved to change the drive.

74. In transmission mechanism, the combination of a drive shaft, an intermediate shaft, a friction clutch for connecting said shafts, fluid pressure actuated means for operating said clutch, a drive shaft, a transmission providing a plurality of different drives connecting said intermediate and said driven shafts, a control element movable for changing the drives through said transmission, a source of fluid under pressure, a selector valve under the control of said control element and movable from one position to supply fluid pressure from said source to said fluid pressure actuated means for causing engagement of said clutch to another position blocking flow of fluid from said source to said fluid pressure actuated means and allowing disengagement of said clutch when said control element is moved in a direction to change the drive, and a regulator valve under the control of said control element maintaining the fluid pressure from said source at a predetermined high pressure prior to movement of said control element and for changing the fluid pressure from said source to a predetermined low pressure when said control element is moved to change the drive.

75. In a control system for an automatic power transmission mechanism having gear elements capable of forming a torque delivery path from an engine to a driven member, first and second fluid pressure operated servos adapted to control the relative motion of said gear elements to condition said mechanism for operation in either of two speed ratios, conduit structure having portions extending to each servo and including a flow restricting orifice, fluid pressure distributing control means for energizing one servo and releasing the other and for releasing said one servo and energizing said other servo in timed relationship, engine torque demand responsive valve means forming a part of said control means for alternately directing fluid flow in portions of said conduit structure through said orifice under one condition of engine torque demand and for accommodating free flow of fluid around said orifice under another condition of engine torque demand during a shift from one ratio to another, and a valve controlled bypass passage forming a part of said conduit structure for accommodating a unidirectional transfer of fluid around said torque demand responsive valve means during a shift from said other ratio to said one ratio.

76. In a control system for an automatic power transmission mechanism having gear elements capable of forming a torque delivery path from an engine to a driven member, first and second fluid pressure operated servos adapted to control the relative motion of said gear elements to condition said mechanism for operation in either of two speed ratios, control means for alternately energizing and releasing said servos in timed relationship to effect a shift from one speed ratio to another, an engine torque demand responsive valve means forming a part of said control means for altering the rate at which said servos are energized and de-energized during a shift from one speed ratio to another, including fluid delivery passage structure communicating with one of said servos and a unidirectional fluid flow restricting means disposed therein for changing the rate of transfer of fluid through said passage structure in one direction relative to the rate of transfer of fluid therethrough in the opposite direction when the engine torque demand is changed whereby the time interval required to shift from a relatively high speed ratio to a relatively low speed ratio with a reduced engine torque demand is changed relative to the time required to accomplish a corresponding shift with an increased engine torque demand.

References Cited by the Examiner

UNITED STATES PATENTS 2,239,657    4/1941    Stadlin _____ 137—53

(Other references on following page)

UNITED STATES PATENTS

| | | | |
|---|---|---|---|
| 2,601,627 | 6/1952 | Price | 192—4 |
| 2,617,257 | 11/1952 | Douglas | 60—52 |
| 2,653,543 | 9/1953 | Mott | 103—5 |
| 2,655,054 | 10/1953 | Kelley | 74—710.5 |
| 2,691,940 | 10/1954 | McFarland | 103—4 |
| 2,693,813 | 11/1954 | Tucker | 137—269 |
| 2,727,602 | 12/1955 | Saives | 192—4 |
| 2,736,407 | 2/1956 | Smirl | 192—3.2 |
| 2,738,689 | 3/1956 | Dodge | 74—754 X |
| 2,740,303 | 4/1956 | Bock et al. | 74—754 X |
| 2,750,018 | 6/1956 | Dundore | 192—3.2 |
| 2,757,552 | 8/1956 | English | 74—472 |
| 2,770,148 | 11/1956 | Wayman | 74—472 |
| 2,788,678 | 4/1957 | Sheppard | 74—645 |
| 2,791,913 | 5/1957 | Slack | 74—472 |
| 2,845,817 | 8/1958 | Polomski | 74—754 X |
| 3,022,676 | 2/1962 | Duffy | 74—472 |

DAVID J. WILLIAMOWSKY, *Primary Examiner.*

DON A. WAITE, BROUGHTON G. DURHAM, SAMUEL SPINTMAN, *Examiners.*

H. B. ROCKMAN, H. A. WILLIAMSON, J. SHUSTER, *Assistant Examiners.*